US011962771B2

(12) United States Patent
Zhang et al.

(10) Patent No.: US 11,962,771 B2
(45) Date of Patent: Apr. 16, 2024

(54) SYNTAX CONSTRAINTS IN PARAMETER SET SIGNALING OF SUBPICTURES

(71) Applicants: Beijing Bytedance Network Technology Co., Ltd., Beijing (CN); Bytedance Inc., Los Angeles, CA (US)

(72) Inventors: Kai Zhang, San Diego, CA (US); Zhipin Deng, Beijing (CN); Hongbin Liu, Beijing (CN); Li Zhang, San Diego, CA (US); Jizheng Xu, San Diego, CA (US)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/723,089

(22) Filed: Apr. 18, 2022

(65) Prior Publication Data

US 2022/0256148 A1    Aug. 11, 2022

Related U.S. Application Data

(63) Continuation of application No. PCT/CN2020/121767, filed on Oct. 19, 2020.

(30) Foreign Application Priority Data

Oct. 18, 2019  (WO) ............... PCT/CN2019/111807

(51) Int. Cl.
*H04N 19/70* (2014.01)
*H04N 19/117* (2014.01)
(Continued)

(52) U.S. Cl.
CPC ......... *H04N 19/119* (2014.11); *H04N 19/117* (2014.11); *H04N 19/132* (2014.11);
(Continued)

(58) Field of Classification Search
CPC .. H04N 19/119; H04N 19/132; H04N 19/176; H04N 19/70
See application file for complete search history.

(56) References Cited

U.S. PATENT DOCUMENTS

| 6,047,112 A | 4/2000 | Wise et al. |
|---|---|---|
| 8,988,531 B2 | 3/2015 | Zhou |

(Continued)

FOREIGN PATENT DOCUMENTS

| AU | 201627393 A1 | 7/2018 |
|---|---|---|
| CN | 1593065 A | 3/2005 |

(Continued)

OTHER PUBLICATIONS

Boyce, Jill, "AHG15: On Interoperability Point Signalling," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0276, 2019.

(Continued)

*Primary Examiner* — Hesham K Abouzahra
(74) *Attorney, Agent, or Firm* — Perkins Coie LLP

(57) ABSTRACT

An example method of video processing includes performing a conversion between a picture of a video and a bitstream representation of the video. The picture includes one or more sub-pictures, and the bitstream representation conforms to a format rule that specifies that a length of a syntax element is equal to Ceil(Log 2(SS)) bits. SS is greater than 0, and the syntax element indicating a horizontal or a vertical position of a top-left corner of a coding tree unit of a sub-picture of the picture.

18 Claims, 19 Drawing Sheets

1200 performing a conversion between a picture of a video and a bitstream representation of the video, where the picture comprises one or more sub-pictures, and the bitstream representation conforms to a format rule that specifies that a length of a syntax element is equal to Ceil(Log2(SS)) bits, where SS is greater than 0, and the syntax element indicating a horizontal or a vertical position of a top-left corner of a coding tree unit of a sub-picture of the picture

— 1210

(51) Int. Cl.
*H04N 19/119* (2014.01)
*H04N 19/132* (2014.01)
*H04N 19/176* (2014.01)
*H04N 19/186* (2014.01)
*H04N 19/46* (2014.01)
*H04N 19/82* (2014.01)

(52) U.S. Cl.
CPC ......... *H04N 19/176* (2014.11); *H04N 19/186* (2014.11); *H04N 19/46* (2014.11); *H04N 19/70* (2014.11); *H04N 19/82* (2014.11)

(56) References Cited

U.S. PATENT DOCUMENTS

| | | |
|---|---|---|
| 9,525,861 B2 | 12/2016 | Zhang et al. |
| 9,743,066 B2 | 8/2017 | Zhang et al. |
| 9,912,966 B2 | 3/2018 | Hannuksela |
| 9,924,168 B2 | 3/2018 | Zhang et al. |
| 10,057,594 B2 | 8/2018 | Xiu et al. |
| 10,097,846 B2 | 10/2018 | Deshpande |
| 10,165,252 B2 | 12/2018 | An et al. |
| 10,200,709 B2 | 2/2019 | Chen et al. |
| 10,455,231 B2 | 10/2019 | Xu et al. |
| 10,483,493 B2 | 11/2019 | Sargent et al. |
| 10,523,964 B2 | 12/2019 | Chuang et al. |
| 10,523,967 B2 | 12/2019 | Lee et al. |
| 10,587,859 B2 | 3/2020 | An et al. |
| 10,757,417 B2 | 8/2020 | Zhang et al. |
| 10,798,385 B2 | 10/2020 | Lee et al. |
| 10,805,639 B2 | 10/2020 | Lee et al. |
| 10,819,891 B2 | 10/2020 | Wang et al. |
| 10,841,609 B1 | 11/2020 | Liu et al. |
| 10,880,547 B2 | 12/2020 | Xu et al. |
| 10,904,565 B2 | 1/2021 | Chuang et al. |
| 11,095,898 B2 | 8/2021 | Lim et al. |
| 11,095,917 B2 | 8/2021 | Zhang et al. |
| 11,109,061 B2 | 8/2021 | Chen et al. |
| 11,128,884 B2 | 9/2021 | Liu et al. |
| 11,146,810 B2 | 10/2021 | Chen et al. |
| 11,212,523 B2 | 12/2021 | Chiu et al. |
| 11,343,529 B2 | 5/2022 | Zhang et al. |
| 11,470,309 B2 | 10/2022 | Zhang et al. |
| 11,496,733 B2 | 11/2022 | Zhang et al. |
| 11,523,108 B2 | 12/2022 | Zhang et al. |
| 11,523,109 B2 | 12/2022 | Li et al. |
| 11,533,513 B2 | 12/2022 | Zhang et al. |
| 11,539,950 B2 | 12/2022 | Zhang et al. |
| 11,546,593 B2 | 1/2023 | Zhang et al. |
| 11,553,177 B2 | 1/2023 | Zhang et al. |
| 11,627,313 B2 | 4/2023 | Zhang et al. |
| 2004/0008766 A1 | 1/2004 | Wang et al. |
| 2004/0177383 A1 | 9/2004 | Martinolich et al. |
| 2005/0019006 A1 | 1/2005 | Suh et al. |
| 2008/0204472 A1 | 8/2008 | Maertens et al. |
| 2008/0267297 A1 | 10/2008 | Sampedro et al. |
| 2008/0273597 A1 | 11/2008 | Kovalenk et al. |
| 2012/0294353 A1 | 11/2012 | Fu et al. |
| 2013/0089145 A1 | 4/2013 | Guo et al. |
| 2013/0101018 A1 | 4/2013 | Chong et al. |
| 2013/0101035 A1* | 4/2013 | Wang ............. H04N 19/174 375/E7.243 |
| 2013/0182774 A1 | 7/2013 | Wang et al. |
| 2013/0202051 A1 | 8/2013 | Zhou et al. |
| 2013/0266075 A1 | 10/2013 | Wang et al. |
| 2013/0294524 A1 | 11/2013 | Van Der Auwera et al. |
| 2013/0322531 A1 | 12/2013 | Chen et al. |
| 2013/0336406 A1 | 12/2013 | Zhang et al. |
| 2014/0003504 A1 | 1/2014 | Ugur et al. |
| 2014/0003535 A1 | 1/2014 | Haque et al. |
| 2014/0192892 A1 | 7/2014 | Van Der Auwera et al. |
| 2014/0198844 A1 | 7/2014 | Hsu et al. |
| 2014/0218473 A1 | 8/2014 | Hannuksela et al. |
| 2014/0301441 A1 | 10/2014 | Wang et al. |
| 2014/0301476 A1 | 10/2014 | Deshpande |
| 2015/0010050 A1 | 1/2015 | Chen et al. |
| 2015/0010091 A1 | 1/2015 | Hsu et al. |
| 2015/0103924 A1 | 4/2015 | Misra et al. |
| 2015/0195577 A1 | 7/2015 | Hannuksela |
| 2015/0215631 A1 | 7/2015 | Zhou et al. |
| 2015/0341655 A1 | 11/2015 | Joshi et al. |
| 2015/0341664 A1 | 11/2015 | Zhang et al. |
| 2016/0100189 A1 | 4/2016 | Pang et al. |
| 2016/0100196 A1 | 4/2016 | Wu et al. |
| 2016/0105690 A1 | 4/2016 | Denoual et al. |
| 2016/0165248 A1 | 6/2016 | Lainema et al. |
| 2016/0173887 A1 | 6/2016 | Deshpande |
| 2016/0234522 A1 | 8/2016 | Lu et al. |
| 2016/0316215 A1 | 10/2016 | Minoo et al. |
| 2016/0381385 A1 | 12/2016 | Ugur |
| 2017/0006302 A1 | 1/2017 | Lee et al. |
| 2017/0006304 A1 | 1/2017 | Miyoshi |
| 2017/0064339 A1 | 3/2017 | Van Der Auwera et al. |
| 2017/0237999 A1 | 9/2017 | Lin et al. |
| 2017/0272758 A1 | 9/2017 | Lin et al. |
| 2017/0289566 A1 | 10/2017 | He et al. |
| 2017/0295369 A1 | 10/2017 | Nakagami |
| 2018/0091829 A1 | 3/2018 | Liu et al. |
| 2018/0098090 A1 | 4/2018 | Lin et al. |
| 2018/0184083 A1 | 6/2018 | Panusopone et al. |
| 2018/0192072 A1 | 7/2018 | Chen et al. |
| 2018/0199057 A1 | 7/2018 | Chuang et al. |
| 2018/0310017 A1 | 10/2018 | Chen et al. |
| 2018/0343463 A1 | 11/2018 | Xiu et al. |
| 2018/0376126 A1 | 12/2018 | Hannuksela |
| 2019/0058884 A1 | 2/2019 | Zhou |
| 2019/0058896 A1 | 2/2019 | Huang et al. |
| 2019/0082191 A1 | 3/2019 | Chuang et al. |
| 2019/0104319 A1 | 4/2019 | Zhang et al. |
| 2019/0116376 A1 | 4/2019 | Chen et al. |
| 2019/0138889 A1 | 5/2019 | Jiang et al. |
| 2019/0158865 A1 | 5/2019 | Park et al. |
| 2019/0208234 A1 | 7/2019 | Van Brandenburg et al. |
| 2019/0246143 A1 | 8/2019 | Zhang et al. |
| 2019/0273937 A1 | 9/2019 | Yu et al. |
| 2020/0221117 A1 | 7/2020 | Liu et al. |
| 2020/0221122 A1 | 7/2020 | Ye et al. |
| 2020/0228827 A1 | 7/2020 | Hannuksela |
| 2020/0252619 A1 | 8/2020 | Zhang et al. |
| 2020/0296405 A1 | 9/2020 | Huang et al. |
| 2020/0329246 A1 | 10/2020 | Yu et al. |
| 2020/0382795 A1 | 12/2020 | Zhang et al. |
| 2020/0396453 A1 | 12/2020 | Zhang et al. |
| 2021/0029351 A1 | 1/2021 | Zhang et al. |
| 2021/0029362 A1 | 1/2021 | Liu et al. |
| 2021/0029378 A1 | 1/2021 | He et al. |
| 2021/0044818 A1 | 2/2021 | Furht et al. |
| 2021/0044838 A1 | 2/2021 | Chen et al. |
| 2021/0058637 A1 | 2/2021 | Zhang et al. |
| 2021/0076029 A1 | 3/2021 | Han et al. |
| 2021/0076050 A1 | 3/2021 | Zhang et al. |
| 2021/0084295 A1 | 3/2021 | Chen et al. |
| 2021/0084340 A1 | 3/2021 | Li et al. |
| 2021/0092393 A1 | 3/2021 | Chao et al. |
| 2021/0136363 A1 | 5/2021 | Jang |
| 2021/0136407 A1 | 5/2021 | Aono et al. |
| 2021/0136422 A1 | 5/2021 | Huang et al. |
| 2021/0185347 A1 | 6/2021 | Liu et al. |
| 2021/0195177 A1 | 6/2021 | Zhang et al. |
| 2021/0211707 A1 | 7/2021 | Liu et al. |
| 2021/0211713 A1 | 7/2021 | Zhang et al. |
| 2021/0211714 A1 | 7/2021 | Zhang et al. |
| 2021/0219001 A1 | 7/2021 | Jang |
| 2021/0227250 A1 | 7/2021 | Liu et al. |
| 2021/0235109 A1 | 7/2021 | Liu et al. |
| 2021/0243467 A1 | 8/2021 | Zhang et al. |
| 2021/0243468 A1 | 8/2021 | Zhang et al. |
| 2021/0266530 A1 | 8/2021 | Liu et al. |
| 2021/0266560 A1 | 8/2021 | Jang |
| 2021/0266577 A1 | 8/2021 | Zhang et al. |
| 2021/0266584 A1 | 8/2021 | Zhang et al. |
| 2021/0266585 A1 | 8/2021 | Liu et al. |
| 2021/0266591 A1 | 8/2021 | Zhang et al. |
| 2021/0274208 A1 | 9/2021 | Zhang et al. |
| 2021/0274209 A1 | 9/2021 | He et al. |

(56) References Cited

U.S. PATENT DOCUMENTS

| | | |
|---|---|---|
| 2021/0274213 A1 | 9/2021 | Xiu et al. |
| 2021/0281865 A1 | 9/2021 | Liu et al. |
| 2021/0281875 A1 | 9/2021 | Liu et al. |
| 2021/0289209 A1 | 9/2021 | Lee et al. |
| 2021/0337184 A1 | 10/2021 | Meng et al. |
| 2021/0337228 A1 | 10/2021 | Wang et al. |
| 2021/0352302 A1 | 11/2021 | Zhang et al. |
| 2021/0352315 A1 | 11/2021 | Zhang et al. |
| 2021/0368198 A1 | 11/2021 | Zhang et al. |
| 2021/0368199 A1 | 11/2021 | Zhang et al. |
| 2021/0368203 A1 | 11/2021 | Zhang et al. |
| 2021/0385481 A1 | 12/2021 | Liu et al. |
| 2021/0385482 A1 | 12/2021 | Liu et al. |
| 2021/0392367 A1 | 12/2021 | Zhang et al. |
| 2021/0409730 A1 | 12/2021 | Wang et al. |
| 2022/0007048 A1 | 1/2022 | He et al. |
| 2022/0014735 A1 | 1/2022 | Chen et al. |
| 2022/0053207 A1 | 2/2022 | Deshpande |
| 2022/0060695 A1 | 2/2022 | Zhang et al. |
| 2022/0060696 A1 | 2/2022 | Zhang et al. |
| 2022/0060718 A1 | 2/2022 | Zhang et al. |
| 2022/0070442 A1 | 3/2022 | Jang |
| 2022/0094909 A1 | 3/2022 | Hannuksela et al. |
| 2022/0132148 A1 | 4/2022 | Wang et al. |
| 2022/0159246 A1 | 5/2022 | Zhang et al. |
| 2022/0166971 A1 | 5/2022 | Zhang et al. |
| 2022/0166985 A1 | 5/2022 | Zhang et al. |
| 2022/0174322 A1 | 6/2022 | Zhang et al. |
| 2022/0217342 A1* | 7/2022 | Hannuksela ......... H04N 19/174 |
| 2022/0239912 A1 | 7/2022 | Zhang et al. |
| 2022/0239926 A1 | 7/2022 | Jhu et al. |
| 2022/0248007 A1 | 8/2022 | Misra et al. |
| 2022/0256146 A1 | 8/2022 | Zhang et al. |
| 2022/0256195 A1 | 8/2022 | Zhang et al. |
| 2022/0272332 A1 | 8/2022 | Lai et al. |
| 2022/0272378 A1 | 8/2022 | Samuelsson et al. |
| 2022/0303571 A1 | 9/2022 | Zhang et al. |

FOREIGN PATENT DOCUMENTS

| | | |
|---|---|---|
| CN | 1609957 A | 4/2005 |
| CN | 1750659 A | 3/2006 |
| CN | 101668219 A | 3/2010 |
| CN | 101990103 A | 3/2011 |
| CN | 105144720 A | 12/2012 |
| CN | 103202016 A | 7/2013 |
| CN | 103891292 A | 6/2014 |
| CN | 103891293 A | 6/2014 |
| CN | 103975596 A | 8/2014 |
| CN | 104041033 A | 9/2014 |
| CN | 104054347 A | 9/2014 |
| CN | 104641648 A | 5/2015 |
| CN | 104702963 A | 6/2015 |
| CN | 104756495 A | 7/2015 |
| CN | 104823449 A | 8/2015 |
| CN | 104885464 A | 9/2015 |
| CN | 105027567 A | 11/2015 |
| CN | 105074819 A | 11/2015 |
| CN | 105393536 A | 3/2016 |
| CN | 105556975 A | 5/2016 |
| CN | 105684448 A | 6/2016 |
| CN | 106464893 A | 2/2017 |
| CN | 106664424 A | 5/2017 |
| CN | 107211156 A | 9/2017 |
| CN | 107801039 A | 3/2018 |
| CN | 108028929 A | 5/2018 |
| CN | 108781284 A | 11/2018 |
| CN | 108781294 A | 11/2018 |
| CN | 109076214 A | 12/2018 |
| CN | 109076216 A | 12/2018 |
| CN | 109076218 A | 12/2018 |
| CN | 109600611 A | 4/2019 |
| CN | 109691102 A | 4/2019 |
| CN | 109996072 A | 7/2019 |
| CN | 110097889 A | 8/2019 |
| CN | 110140355 A | 8/2019 |
| CN | 110662036 A | 1/2020 |
| CN | 110677678 A | 1/2020 |
| EP | 1672930 A3 | 11/2010 |
| EP | 3468190 A1 | 4/2019 |
| EP | 3942823 A1 | 1/2022 |
| GB | 201815444 | 11/2018 |
| GB | 201902829 | 4/2019 |
| GB | 201911952 | 10/2019 |
| JP | 2015015575 A | 1/2015 |
| JP | 2017520162 A | 7/2017 |
| JP | 6280679 B2 | 2/2018 |
| JP | 2020017970 A | 1/2020 |
| KR | 2040056342 A | 5/2014 |
| KR | 1020150057591 A | 5/2015 |
| KR | 20180128955 A | 12/2018 |
| KR | 20180129584 A1 | 12/2018 |
| KR | 20200126813 A | 11/2020 |
| RU | 2686559 C2 | 4/2019 |
| WO | 2014106692 A1 | 7/2014 |
| WO | 2015008479 A1 | 1/2015 |
| WO | 2015038877 A1 | 3/2015 |
| WO | 2015056941 A1 | 4/2015 |
| WO | 2015142556 A2 | 9/2015 |
| WO | 2016100424 A1 | 6/2016 |
| WO | 2016127889 A1 | 6/2016 |
| WO | 2016120468 A1 | 8/2016 |
| WO | 2017083784 A1 | 5/2017 |
| WO | 2017137444 A1 | 8/2017 |
| WO | 2018099269 A1 | 6/2018 |
| WO | 2018113658 A1 | 6/2018 |
| WO | 2019008174 A1 | 1/2019 |
| WO | 2019010156 A1 | 1/2019 |
| WO | 2019145262 A1 | 1/2019 |
| WO | 2019073112 A1 | 4/2019 |
| WO | 2019078169 A1 | 4/2019 |
| WO | 2019132577 A1 | 7/2019 |
| WO | 2019194507 A1 | 10/2019 |
| WO | 2019194568 A1 | 10/2019 |
| WO | 2019222060 A1 | 11/2019 |
| WO | 2020003273 A1 | 1/2020 |
| WO | 2020146582 A1 | 7/2020 |
| WO | 2020222588 A1 | 11/2020 |
| WO | 2021049586 A1 | 3/2021 |
| WO | 2021052794 A1 | 3/2021 |

OTHER PUBLICATIONS

Boyce et al. "Sub-Pictures and Sub-Picture Sets with Level Derivation," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0555, 2019.

Bross et al. "Versatile Video Coding (Draft 4)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M1001, 2019.

Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2001, 2019.

Bross et al. "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P2001, 2019.

Chen et al. "AHG17: [SYS-VVC] Signalling Subpicture Coded Video Sequence," Joint Video Experts Team (JVET) of ITU-T SG 16 WP 3 and ISO/IEC JTC 1/SC 29/WG 11 14th Meeting: Geneva, Switzerland, Mar. 19-27, 2019, document JVET-N0073, 2019.

Chen et al. "AHG17/AHG12: On Signalling the Subpicture IDs," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0141, 2019.

Chen et al. "AHG17/AHG12: On Signalling of Subpicture Structure in the SPS," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0143, 2019.

(56) References Cited

OTHER PUBLICATIONS

Chen et al. "AHG17/AHG12: On Associating Slices with a Subpicture," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0144, 2019.
Choi et al. "AHG17: On Decoded Picture Buffer Management for VVC," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0154, 2019.
Choi et al. "AHG8/AHG12: On Sub-Picture Partitioning Support with Layers," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0334, 2019.
Choi et al. AHG8/AHG17: On Signaling Reference Picture Resampling, Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0219, 2019.
Fu et al. "CE4-Related: Quadtree-Based Merge Estimation Region for VVC," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0350, 2019.
Gao et al. "Simplified GEO without Multiplication and Minimum Blending Mask Storage (Harmonization of JVET-P0107, JVET-P0264 and JVET-P0304)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0084, 2019.
Hannuksela et al. "AHG12: On Grouping of Tiles," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0261, 2019.
Hannuksela et al. "AHG12: Summary of HLS Proposals on Subpictures," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0693, 2019.
He et al. "AHG12: On Picture and Sub-Picture Signaling," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0182, 2019.
Misra et al. "Cross-Component Adaptive Loop Filter for Chroma," Joint Video Experts Team (JVET) of ITU-T SG 16 WP 3 and ISO/IEC JTC 1/SC 29/WG 1115th Meeting: Gothenburg, SE, Jul. 3-12, 2019, document JVET-O0636, 2019.
Misra et al. "CE5-related: On the Design of CC-ALF," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P1008, 2019.
Sullivan et al. "Meeting Report of the 15th Meeting of the Joint Video Experts Team (JVET), Gothenburg, SE, Jul. 3-12, 2019," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2000, 2019.
Wang et al. "AHG12: Sub-Picture-Based Coding for WC," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0107, 2019.
Wang et al. "AHG12: Harmonized Proposal for Sub-Picture-based Coding for VVC," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0826, 2019.
Wang et al. "AHG12: Sub-Picture Based Motion-Constrained Independent Regions," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0141, 2019.
Wennersten et al. "Encoder-Only GOP-Based Temporal Filter," Joint Collaborative Team on Video Coding (JCT-VC) of ITU-T SG 16 WP 3 and ISO/IEC JTC 1/SC 29/WG 11 35th Meeting: Geneva, CH, Mar. 22-27, 2019, document JCTVC-AI0023, 2019.

Xu et al. "Non-CE8: On IBC Reference Buffer Design," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0472, 2019.
Zhang et al.a "CE4: History-Based Motion Vector Prediction (Test 4.4.7)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0266, 2018.
Zhang et al. "CE4-Related: Restrictions on History-Based Motion Vector Prediction," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0272, 2019.
Zhu et al. "CE8-related: Palette Mode Coding," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0258, 2019.
http://phenix.it-sudparis.eu/jvet/doc_end_user/current_document.php?id=5755.
https://vcgit.hhi.fraunhofer.de/jvet/VVCSoftware_VTM/tags/VTM-5.0.
International Search Report and Written Opinion from International Patent Application No. PCT/CN2020/108142 dated Oct. 28, 2020 (9 pages).
International Search Report and Written Opinion from International Patent Application No. PCT/CN2020/108159 dated Nov. 12, 2020 (9 pages).
International Search Report and Written Opinion from International Patent Application No. PCT/CN2020/108175 dated Nov. 18, 2020 (10 pages).
International Search Report and Written Opinion from International Patent Application No. PCT/CN2020/108182 dated Nov. 16, 2020 (11 pages).
International Search Report and Written Opinion from International Patent Application No. PCT/CN2020/119931 dated Jan. 12, 2021 (10 pages).
International Search Report and Written Opinion from International Patent Application No. PCT/CN2020/119932 dated Dec. 30, 2020 (9 pages).
International Search Report and Written Opinion from International Patent Application No. PCT/CN2020/121767 dated Jan. 27, 2021 (12 pages).
International Search Report and Written Opinion from International Patent Application No. PCT/CN2020/121768 dated Jan. 8, 2021 (13 pages).
International Search Report and Written Opinion from International Patent Application No. PCT/CN2020/139389 dated Mar. 24, 2021 (9 pages).
International Search Report and Written Opinion from International Patent Application No. PCT/CN2021/071008 dated Apr. 12, 2021 (13 pages).
International Search Report and Written Opinion from International Patent Application No. PCT/CN2021/071360 dated Apr. 18, 2021 (10 pages).
Non Final Office Action from U.S. Appl. No. 17/665,242 dated Apr. 15, 2022.
Non Final Office Action from U.S. Appl. No. 17/665,220 dated May 24, 2022.
Non Final Office Action from U.S. Appl. No. 17/665,275 dated May 25, 2022.
Non Final Office Action from U.S. Appl. No. 17/711,294 dated Jun. 7, 2022.
Non Final Office Action from U.S. Appl. No. 17/711,319 dated Jun. 8, 2022.
Senanayake et al. "High Performance Hardware Architectures for Intra Block Copy and Palette Coding for HEVC Screen Content Coding Extension," 2017 IEEE, 978-1-5090-4825-0/17/$31.00.
Examination Report from Indian Patent Application No. 202247039697 dated Oct. 12, 2022 (7 pages).
Notice of Allowance from U.S. Appl. No. 17/665,220 dated Sep. 29, 2022.
Non Final Office Action from U.S. Appl. No. 17/723,175 dated Oct. 12, 2022.

(56) References Cited

OTHER PUBLICATIONS

Non Final Office Action from U.S. Appl. No. 17/861,728 dated Sep. 26, 2022.
Chen et al. "AHG8: Adaptive Resolution Change," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0303, 2019.
Chen et al. "AHG8: Integrated Specification Text for Reference Picture Resampling," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O1164, 2019.
Hendry et al. "HG8: Support for Reference Picture Resampling—Handling of Picture Size Signalling, Conformance Windows, and DPB Management," Joint Video Experts Team (JVET) of ITU-T SG 16 WP3 and ISO/IEC JTC 1/SC 29/WG 11 15th Meeting: Gothernburg, SE, Jul. 3-12, 2019, document JVET-O0133, 2019.
Hsiang et al. "AHG9/AHG12: Modifications Related to Subpicture Signalling and RPR," Joint Video Experts Team (JVET) of ITU-T SG 16 WP3 and ISO/IEC JTC 1/SC 29/WG 11 17th Meeting Brussels, BE, Jan. 7-17, 2020, document JVET-Q0290, 2020.
Nishi et al. "AHG9: Constraint About Usage of Reference Picture Resampling and Subpictures," Joint Video Experts Team (JVET) of ITU-T SG 16 WP3 and ISO/IEC JTC 1/SC 29/WG 11 17th Meeting Brussels, BE, Jan. 7-17, 2020, document JVET-Q0043, 2020.
Samuelsson et al. "AHG 8: Adaptive Resolution Change (ARC) High-Level Syntax (HLS)," Joint Video Experts Team (JVET) of ITU-T SG 16 WP 3 and ISO/IEC JTC 1/SC 29/WG 11 15th Meeting, Gothenburg, SE Jul. 3-12, 2019, document JVET-O0204, 2019.
Extended European Search Report from European Patent Application No. 20852929.7 dated Sep. 26, 2022 (15 pages).
Examination Report from Indian Patent Application No. 202247007118 dated Jul. 6, 2022 (7 pages).
Examination Report from Indian Patent Application No. 202247022804 dated Sep. 8, 2022 (6 pages).
Examination Report from Indian Patent Application No. 202247023112 dated Aug. 18, 2022 (6 pages).
Choi et al. "AHG12: on Sub-Picture Partitioning," Joint Video Experts Teams (JVET) of ITU-T SG 16 WP 3 and iSO/IEC JTC 1/SC 29/WG 11 14th Meeting, Geneva, CH, Mar. 19-27, 2019, document JVET-N0055, 2019.
Fan et al. "CE6-2.3-Related: Reduced 8×8 Matrices for LFNST," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0545, 2019.
Huang et al. "AHG16: Merge Estimation Region with Constrain in HMVP Update," Joint Video Experts Team (JVET) of ITU-T SG 16 WP 3 and ISO/IEC JTC 1/SC 29/WG 11 17th Meeting, Brussels, Jan. 6-17, 2020, document JVET-Q0297, 2020.
Suehring et al. "AHG9: Subpicture Location Signalling Bugfix," Joint Experts Team (JVET) of ITU-T SG 16 WP 3 and ISO/IEC JTC 1/SC 29/WG 11 17th Meeting, Brussels, BE, Jan. 7-17, 2020, document JVET-Q0787,2020.
Sullivan et al. "Meeting Report of the 17th Meeting of the Joint Video Experts Team (JVET), Brussels, BE, Jan. 7-17, 2020," Joint Video Experts Team (JVET) of ITU-T SG 16 WP 3 and ISO/IEC JTC 1/SC 29/WG 11 17th Meeting, Brussels, BE Jan. 7-17, 2020, document JVET-Q2000, 2020.
"Text of DIS ISO/IEC 23008-2:201x: High Efficiency Coding and Media Delivery in Heterogeneous Environment—Part 2: High Efficiency Video Coding," (4th Edition). 122 MPEG Meeting Apr. 16-20, 2018, San Diego, Motion Picture Expert Group or ISO/IEC JTC1/SC 29/WG 11, No. n17661, May 11, 2018, XP030024288, retrieved from the internet May 11, 2018.
Wang et al. "AHG12: A Summary of Proposals on Subpicture ID Signalling," Joint Video Experts Team (JVET) of ITU-T SG 16 WP 3 and iSO/IEC JTC 1/SC 29/WG 11 17th Meeting, Brussels, BE Jan. 7-17, 2020, document JVET-Q0590, 2020.
Xu et al. "Bitstream Conformance with a Virtual IBC Buffer Concept," Joint Video Experts Team (JVET) of ITU-T SG 16 WP 3 and iSO/IEC JTC 1/SC 29/WG 11 15th Meeting, Gothenburg, SE Jul. 3-12, 2019, document JVET-O1170, 2019.
Ye et al. "CE8: Palette Predictor List Enhancement (Test 8.2.6)," Joint Video Experts Team (JVET) of ITU-T SG WP 3 and ISO/IEC JTC 1/SC 29/WG 11 13th Meeting, Marrakech, MA, Jan. 9-18, 2019, document JVET-M0457, 2019.
Extended European Search Report from European Patent Application No. 20871705.8 dated Oct. 31, 2022 (10 pages).
Extended European Search Report from European Patent Application No. 20876854.9 dated Oct. 31, 2022 (13 pages).
Extended European Search Report from European Patent Application No. 21738561.6 dated Dec. 22, 2022 (12 pages).
Extended European Search Report from European Patent Application No. 20852734.1 dated Jan. 20, 2023 (8 pages).
Chen et al. "CE4: Affine Merge Enhancement with Simplification (Test 4.2.2)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0368, 2018.
Alshin, et al. "Bi-Directional Optical Flow for Improving Motion Compensation," Dec. 8-10, 2010, 28th Picture Coding Symposium, PCS2010, Nagoya, Japan, pp. 422-425.
Bross et al. "Versatile Video Coding (Draft 3)," Joint Video Experts Team (JVET)of ITU-T SG 16 WP 3 and ISO/IEC JTC 1/SC 29/WG 1112th Meeting: Macao, CN, Oct. 3-12, 2018, document JVET-L1001, 2018.
Bross et al. "Versatile Video Coding (Draft 5)," Joint Video Experts Team (JVET)of ITU-T SG 16 WP 3 and ISO/IEC UTC 1/SC 29/WG 1114th Meeting: Geneva, CH, Mar. 19-27, 2019, document JVET-N1001, 2019.
Bross et al. "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, document JVET-Q2001 vD vE, 2020.
Chen et al. "Algorithm Description of Joint Exploration Test Model 7 (JEM 7)," Joint Video Exploration Team (JVET)of ITU-T SG 16 WP 3 and ISO/IEC JTC 1/SC 29/WG 11, 7th Meeting: Torino, IT, Jul. 13-21, 2017, document JVET-G1001, 2017.
Chen et al. "Crosscheck of JVET-L0142 (CE4: Simplification of the Common Base for Affine Merge (Test 4.2.6))." Joint Video Experts Team (JVET)of ITU-T SG 16 WP 3 and ISO/IEC JTC 1/SC 29/WG 1112th Meeting: Macao, CN, Oct. 3-12, 2018, document JVET-L0632, 2018.
Chen et al. "Algorithm Description for Versatile Video Coding and Test Model 6 (VTM 6)," Joint Video Experts Team JVET) of ITU-T SG 16 WP 3 and ISO/IEC JTC 1/SC 29/WG 11 15th Meeting: Gothenburg, SE, Jul. 3-12, 2019, document JVET-O2002, 2019.
Chen et al. "Algorithm description for Versatile Video Coding and Test Model 8 (VTM 8)," Joint Video Experts Team JVET) of ITU-T SG 16 WP 3 and ISO/IEC JTC 1/SC 29/WG 11 17th Meeting: Brussels, BE, Jan. 7-17, 2020, document JVET-Q2002, 2020.
Han et al. "CE4.1.3: Affine Motion Compensation Prediction," Joint Video Exploration Team (JVET)of ITU-T SG 16 WP 3 and ISO/IEC JTC 1/SC 29/WG 1111th Meeting: Ljubljana, SI, Jul. 10-18, 2018, document JVET-K0337, 2018.
Hie et al. "AHG12: On Subpicture Grid Syntax," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0129, 2019.
Huang et al. "CE4.2.5: Simplification of Affine Merge List Construction and Move ATMVP to Affine Merge List," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0278, 2018.
"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.
"Information Technology—High Efficiency Coding and Media Delivery in Heterogeneous Environments—Part 2: High Efficiency Video Coding" Apr. 20, 2018, ISO/DIS 23008, 4th Edition.

(56) References Cited

OTHER PUBLICATIONS

Lai et al. "CE4.3.4: Removal of AMVR Flag Constraint," Joint Video Experts Team (JVET)of ITU-T SG 16 WP 3 and ISO/IEC JTC 1/SC 29/WG 1111th Meeting: Ljubljana, SI, Jul. 10-18 2018, document JVET-K0247, 2018.

LaRoche et al. "CE2: On Subblock Merge Index Coding (Test CE2.2.2)," Joint Video Experts Team (JVET)of ITU-T SG 16 WP 3 and ISO/IEC JTC 1/SC 29/WG 1113th Meeting: Marrakech, MA, Jan. 9-18, 2019, document JVET-M0381, 2019.

Lee et al. "CE4: Simplification of the Common Base for Affine Merge (Test 4.2.6)," Joint Video Experts Team (JVET)of ITU-T SG 16 WP 3 and ISO/IEC JTC 1/SC 29/WG 1112th Meeting: Macau, CN, Oct. 8-12, 2018, document JVET-L0142, 2018.

Lee et al. "Cross-check of JCTVC-L0279 on Motion Data Compression," Joint Collaborative Team on Video Coding JCT-VC)of ITU-T SG 16 WP 3 and ISO/IEC JTC 1/SC 29/WG 1112th Meeting: Geneva, CH, Jan. 14-23, 2013, document JCTVC-L0368, 2013.

Lee et al. "CE2-related: Simplification of Subblock-Based Temporal Merging Candidates," Joint Video Experts Team JVET)of ITU-T SG 16 WP 3 and ISO/IEC JTC 1/SC 29/WG 1113th Meeting: Marrakech, MA, Jan. 9-18 2019, document JVET-M0240, 2019.

Li et al. "Non-CE4: On Prediction Refinement with Optical Flow," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0553, 2019.

Li, Guichun. "Crosscheck of JVET-N0236 (CE2-Related: Prediction Refinement with Optical Flow for Affine Mode)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-M0651, 2019.

Liao et al. "CE10.3.1.b: Triangular Prediction Unit Mode," Joint Video Exploration Team (JVET)of ITU-T SG 16 WP 3 and ISO/IEC JTC 1/SC 29/WG 1112th Meeting: Macao, CN, Oct. 3-12, 2018, document JVET-L0124, 2018.

Liu et al. "CE4-related: Adaptive Motion Vector Resolution for Affine Inter Mode," Joint Video Experts Team (JVET)of ITU-T SG 16 WP 3 and ISO/IEC JTC 1/SC 29/WG 1112th Meeting: Macao, CN, Oct. 3-12, 2018, document JVET-L0332, 2018.

Liu et al. "CE2: Adaptive Motion Vector Resolution for Affine Inter Mode (Test 2.1.2)," Joint Video Experts Team JVET)of ITU-T SG 16 WP 3 and ISO/IEC JTC 1/SC 29/WG 1113th Meeting: Marrakech, MA, Jan. 9-18, 2019. document JVET-M0246, 2019.

Luo et al. "CE2-Related: Prediction Refinement with Optical Flow for Affine Mode," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0236, 2019.

Luo et al. "CE4: Prediction Refinement with Optical Flow for Affine Mode (Test 2.1)," Joint Video Experts Team (JVET) of ITU-T SG 16 WP3 and ISO/IEC JTC 1/SC 29/WG 11 15th Meeting: Gothenburg, SE, Jul. 3-12, 2019, document JVET-O0070, 2019.

Petersson et al. "AHG9: On Picture Header Modifications," Joint Video Experts Team (JVET of ITU-T SG 16 WP 3 and ISO/IEC JTC 1/SC 29/WG 1117th Meeting: Brussels, BE, Jan. 7-17, 2020, document JVET-Q0270, 2020.

Rosewarne et al. "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/WG1125th Meeting: Chengdu, CN, Oct. 14-21, 2016, document JCTVC-Y1002, 2016.

Zhang et al. "CE2-Related: Early Awareness of Accessing Temporal Blocks in Sub-Block Merge List Construction," Joint Video Experts Team (JVET)of ITU-T SG 16 WP 3 and ISO/IEC JTC 1/SC 29/WG 1113th Meeting: Marrakech, MA, Jan. 9-18, 2019, document JVET-M0273, 2019.

Zhang et al. "AHG12: Cleanups on Syntax Design of Sub-Pictures," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0377, 2019.

JEM-7.0: https://jvet.hhi.fraunhofer.de/svn/svn_HMJEMSoftware/tags/ HM-16.6-JEM-7.0.

VTM software: https://vcgit.hhi.fraunhofer.de/jvet/VVCSoftware_VTM.git.

Extended European Search Report from European Patent Application No. 20810559.3 dated May 19, 2022 (7 pages).

Extended European Search Report from European Patent Application No. 20809576.0 dated May 19, 2022 (7 pages).

Extended European Search Report from European Patent Application No. 21774361.6 dated Mar. 22, 2023 (8 pages).

Examination Report from Indian Patent Application No. 202247055012 dated Jan. 25, 2023 (7 pages).

International Search Report and Written Opinion from International Patent Application No. PCT/CN2020/091537 dated Jul. 29, 2020 (8 pages).

International Search Report and Written Opinion from International Patent Application No. PCT/CN2020/091538 dated Aug. 19, 2020 (10 pages).

International Search Report and Written Opinion from International Patent Application No. PCT/CN2020/091539 dated Aug. 21, 2020 (9 pages).

International Search Report and Written Opinion from International Patent Application No. PCT/CN2020/091540 dated Jul. 30, 2020 (10 pages).

International Search Report and Written Opinion from International Patent Application No. PCT/CN2020/133271 dated Mar. 8, 2021 (10 pages).

International Search Report and Written Opinion from International Patent Application No. PCT/CN2021/082242 dated Jun. 22, 2021 (11 pages).

International Search Report and Written Opinion from International Patent Application No. PCT/CN2021/082243 dated Jun. 21, 2021 (13 pages).

Non Final Office Action from U.S. Appl. No. 17/521,012 dated Jan. 24, 2022.

Non Final Office Action from U.S. Appl. No. 17/521,043 dated Feb. 4, 2022.

Non Final Office Action from U.S. Appl. No.17/520,975 dated Mar. 3, 2022.

Final Office Action from U.S. Appl. No. 17/521,012 dated May 6, 2022.

Non Final Office Action from U.S. Appl. No. 17/950,443 dated Feb. 16, 2023.

Non Final Office Action from U.S. Appl. No. 17/950,411 dated Mar. 13, 2023.

Li et al. "AHG12: Modification for Subpicture," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0171, 2019. (cited in JP2022-520358 NOA mailed Jun. 27, 2023).

Non Final Office Action from U.S. Appl. No. 17/861,728 dated Apr. 20, 2023.

Hannuksela et al. "AHG12: Signalling of Subpicture IDs and Layout," Joint Video Experts Team (JVET) of ITU-T SG 16 WP 3 and ISO/IEC JTC 1/SC 29/WG 1116th Meeting: Geneva, CH, Oct. 1-11, 2019, document JVET-P1026, 2019. (cited in CN202080069970 OA1 mailed Oct. 24, 2023).

Joshi et al. "Screen Content Coding Test Model 2 (SCM 2)," Joint Collaborative Team on Video Coding (JCT-VC) of ITU-T SG 16 WP 3 and ISO/IEC JTC 1/SC 29/WG 11 17th Meeting: Valencia, ES, Mar. 27- Apr. 4, 2014, document JCTVC-R1014, 2014. (cited in KR10-2022-7002901 OA1 mailed Oct. 24, 2023).

Wenger et al. "[AHG19] On Signaling of Adaptive Resolution Change," Joint Video Experts Team (JVET) of ITU-T SG 16 WP 3 and ISO/IEC JTC 1/SC 29/WG 11 14th Meeting: Geneva, CH, Mar. 19-27, 2019, document JVET- N0052, 2019. (cited in RU2022103362 OA mailed Nov. 23, 2023)

Misra et al. "CE5-2.1, CE5-2.2: Cross Component Adaptive Loop Filter," Joint Video Experts Team (JVET) of ITU-T SG 16 WP 3 and ISO/IEC JTC 1/SC 29/WG 11 16th Meeting: Geneva, CH, 1-11 Oct. 2019, document JVET-P0080, 2019. (cited in EP23214125.9 EESR mailed Feb. 6, 2024).

Norkin et al. "BoG Report on CE5 Loop Filtering Related Contributions," Joint Video Experts Team (JVET) of ITU-T SG 16 WP 3

(56) References Cited

OTHER PUBLICATIONS and ISO/IEC JTC 1/SC 29/WG 11 16th Meeting: Geneva, CH, Oct. 1-11, 2019, document JVET-P1033, 2019. (cited in EP23214125.9 EESR mailed Feb. 6, 2024).
Segall et al. "BoG Report on CE5 Related Contributions," Joint Video Experts Team (JVET) of ITU-T SG 16 WP3 and ISO/IEC JTC 1/SC 29/WG 11 17th Meeting, Brussels, BE, Jan. 7-17, 2020, document JVET-Q0780, 2020. (cited in EP23214125.9 EESR mailed Feb. 6, 2024).
"Test Model 6 of Versatile Video Coding (VTM 6)127. MPEG Meeting; Jul. 8, 2019-Jul. 12, 2019; Gothenburg; (Motion Picture Expert Group or ISO/IEC JTC1/SC29/WG11), No. n18693 (Oct. 7, 2019), Retrieved from the Internet: URL: http://phenix.int-evry.fr/mpeg/doc_end _user/documents/127_Gothenburg/wg11/w18693.zip w18693.docx paragraph [ 0 3 . 7 ]" (cited in EP23214125.9 EESR mailed Feb. 6, 2024).
Wang et al. "Non-CE5: Suggested Text for CC-ALF Padding Process with Raster Scan Slices," Joint Video Experts Team (JVET) of ITU-T SG 16 WP 3 and ISO/IEC JTC 1/SC 29/WG 11 17th Meeting, Brussels, BE, Jan. 7-17, 2020, document JVET-Q0310, 2020. (cited in EP23214125.9 EESR mailed Feb. 6, 2024).
Wang et al. "Non-CE5: On CC-ALF Paddling for ALF Virtual Boundaries," Joint Video Experts Team (JVET) of ITU-T SG 16 WP 3 and ISO/IEC JTC 1/SC 29/WG 11 17th Meeting, Brussels, BE, Jan. 7-17, 2020, document JVET-Q0311, 2020. (cited in EP23214125.9 EESR mailed Feb. 6, 2024).
Zhou et al. "JVET-AHG Report: Implementation Studies (AHG16)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0016, 2019.(cited in EP23214125.9 EESR mailed Feb. 6, 2024).
Extended European Search Report from European Patent Application No. 23214125.9 dated Feb. 6, 2024 (17 pages).

\* cited by examiner

SYNTAX CONSTRAINTS IN PARAMETER SET SIGNALING OF SUBPICTURES

CROSS REFERENCE TO RELATED APPLICATIONS

This application is a continuation of International Patent Application No. PCT/CN2020/121767, filed on Oct. 19, 2020, which claims the priority to and benefits of International Patent Application No. PCT/CN2019/111807, filed on Oct. 18, 2019. For all purposes under the law, the entire disclosure of the aforementioned applications is incorporated by reference as part of the disclosure of this application.

TECHNICAL FIELD

This document is related to video and image coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments for in which sub-picture based coding or decoding is performed.

In one example aspect a method of video processing is disclosed. The method includes performing a conversion between a picture of a video and a bitstream representation of the video. The picture comprises one or more sub-pictures, and the bitstream representation conforms to a format rule that specifies that a length of a syntax element is equal to Ceil(Log 2(SS)) bits. SS is greater than 0, and the syntax element indicating a horizontal or a vertical position of a top-left corner of a coding tree unit of a sub-picture of the picture.

In another example aspect a method of video processing is disclosed. The method includes performing a conversion between a picture of a video and a bitstream representation of the video, wherein the picture comprises one or more sub-pictures. The bitstream representation conforms to a format rule that specifies that different sub-pictures have different identifiers.

In another example aspect a method of video processing is disclosed. The method includes determining, for a video block in a first video region of a video, whether a position at which a temporal motion vector predictor is determined for a conversion between the video block and a bitstream representation of the current video block using an affine mode is within a second video region; and performing the conversion based on the determining.

In another example aspect, another method of video processing is disclosed. The method includes determining, for a video block in a first video region of a video, whether a position at which an integer sample in a reference picture is fetched for a conversion between the video block and a bitstream representation of the current video block is within a second video region, wherein the reference picture is not used in an interpolation process during the conversion; and performing the conversion based on the determining.

In another example aspect, another method of video processing is disclosed. The method includes determining, for a video block in a first video region of a video, whether a position at which a reconstructed luma sample value is fetched for a conversion between the video block and a bitstream representation of the current video block is within a second video region; and performing the conversion based on the determining.

In another example aspect, another method of video processing is disclosed. The method includes determining, for a video block in a first video region of a video, whether a position at which a check regarding splitting, depth derivation or split flag signaling for the video block is performed during a conversion between the video block and a bitstream representation of the current video block is within a second video region; and performing the conversion based on the determining.

In another example aspect, another method of video processing is disclosed. The method includes performing a conversion between a video comprising one or more video pictures comprising one or more video blocks, and a coded representation of the video, wherein the coded representation complies with a coding syntax requirement that the conversion is not to use sub-picture coding/decoding and a dynamic resolution conversion coding/decoding tool or a reference picture resampling tool within a video unit.

In another example aspect, another method of video processing is disclosed. The method includes performing a conversion between a video comprising one or more video pictures comprising one or more video blocks, and a coded representation of the video, wherein the coded representation complies with a coding syntax requirement that a first syntax element subpic_grid_idx[i][j] is not larger than a second syntax element max_subpics_minus1.

In yet another example aspect, the above-described method may be implemented by a video encoder apparatus that comprises a processor.

In yet another example aspect, the above-described method may be implemented by a video decoder apparatus that comprises a processor.

In yet another example aspect, these methods may be embodied in the form of processor-executable instructions and stored on a computer-readable program medium.

These, and other, aspects are further described in the present document.

DETAILED DESCRIPTION

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This document is related to video coding technologies. Specifically, it is related to palette coding with employing base colors based representation in video coding. It may be applied to the existing video coding standard like HEVC, or the standard (Versatile Video Coding) to be finalized. It may be also applicable to future video coding standards or video codec.

2. Initial Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards [1,2]. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 The Region Constraint in TMVP and Sub-Block TMVP in VVC

Figure 1:
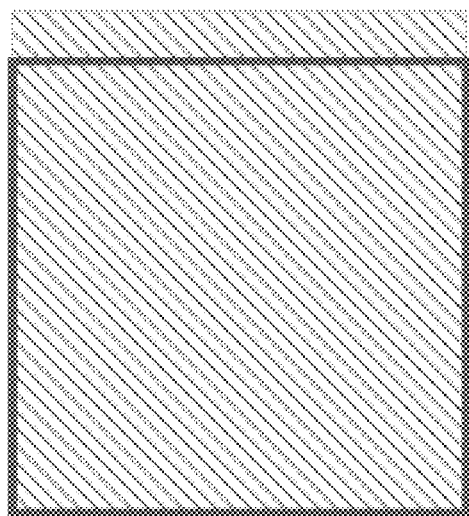
FIG. 1 shows an example of region constraint in temporal motion vector prediction (TMVP) and sub-block TMVP.

FIG. 1 illustrates example region constraint in TMVP and sub-block TMVP. In TMVP and sub-block TMVP, it is constrained that a temporal MV can only be fetched from the collocated CTU plus a column of 4×4 blocks as shown in FIG. 1.

2.2 Example Sub-Picture

In some embodiments, sub-picture-based coding techniques based on flexible tiling approach can be implemented. Summary of the sub-picture-based coding techniques includes the following:

(1) Pictures can be divided into sub-pictures.

(2) The indication of existence of sub-pictures is indicated in the SPS, along with other sequence-level information of sub-pictures.

(3) Whether a sub-picture is treated as a picture in the decoding process (excluding in-loop filtering operations) can be controlled by the bitstream.

(4) Whether in-loop filtering across sub-picture boundaries is disabled can be controlled by the bitstream for each sub-picture. The DBF, SAO, and ALF processes are updated for controlling of in-loop filtering operations across sub-picture boundaries.

(5) For simplicity, as a starting point, the sub-picture width, height, horizontal offset, and vertical offset are signalled in units of luma samples in SPS. Sub-picture boundaries are constrained to be slice boundaries.

(6) Treating a sub-picture as a picture in the decoding process (excluding in-loop filtering operations) is specified by slightly updating the coding_tree unit( ) syntax, and updates to the following decoding processes:

The derivation process for (advanced) temporal luma motion vector prediction

The luma sample bilinear interpolation process

The luma sample 8-tap interpolation filtering process

The chroma sample interpolation process (7) Sub-picture IDs are explicitly specified in the SPS and included in the tile group headers to enable extraction of sub-picture sequences without the need of changing VCL NAL units.

(8) Output sub-picture sets (OSPS) are proposed to specify normative extraction and conformance points for sub-pictures and sets thereof.

2.3 Example Sub-Pictures in Versatile Video Coding Sentience Parameter Set RBSP Syntax

| | Descriptor |
|---|---|
| seq_parameter_set_rbsp( ) { | |
|   sps_decoding_parameter_set_id | u(4) |
|   sps_video_parameter_set_id | u(4) |
|   ... | |
|   pic_width_max_in_luma_samples | ue(v) |
|   pic_height_max_in_luma_samples | ue(v) |
|   subpics_present_flag | u(1) |
|   if( subpics_present_flag ) { | |
|     max_subpics_minus1 | u(8) |
|     subpic_grid_col_width_minus1 | u(v) |
|     subpic_grid_row_height_minus1 | u(v) |
|     for( i = 0; i < NumSubPicGridRows; i++ ) | |
|       for( j = 0; j < NumSubPicGridCols; j++ ) | |
|         subpic_grid_idx[ i ][ j ] | u(v) |
|     for( i = 0; i <= NumSubPics; i++ ) { | |
|       subpic_treated_as_pic_flag[ i ] | u(1) |
|       loop_filter_across_subpic_enabled_flag[ i ] | u(1) |
|     } | |
|   } | |
| ... | |
| } | |

$$\text{NumSubPicGridCols} = (\text{pic\_width\_max\_in\_luma\_samples} + \text{subpic\_grid\_col\_width\_minus1}*4+3)/(\text{subpic\_grid\_col\_width\_minus1}*4+4) \quad (7\text{-}5)$$

subpic_grid_row_height_minus1 plus 1 specifies the height of each element of the sub-picture identifier grid in units of 4 samples. The length of the syntax element is Ceil(Log 2(pic_height_max_in_luma_samples/4)) bits. The variable NumSubPicGridRows is derived as follows:

$$\text{NumSubPicGridRows} = (\text{pic\_height\_max\_in\_luma\_samples} + \text{subpic\_grid\_row\_height\_minus1}*4+3)/(\text{subpic\_grid\_row\_height\_minus1}*4+4) \quad (7\text{-}6)$$

subpic_grid_idx[i][j] specifies the sub-picture index of the grid position (i,j). The length of the syntax element is Ceil(Log 2(max_subpics_minus1+1)) bits.

The variables SubPicTop[subpic_grid_idx[i][j]], SubPicLeft[subpic_grid_idx[i][j]], SubPicWidth[subpic_grid_idx[i][j]], SubPicHeight[subpic_grid_idx[i][j]], and NumSubPics are derived as follows:

```
NumSubPics = 0
for( i = 0; i. < NumSubPicGridRows; i++) {
    for( j = 0; j < Num SubPicGridCols; j++) {
        if (i == 0)
        SubPicTop[ subpic_grid_idx[ i ][ j ] ] = 0
            else if( subpic_grid_idx [ i ][ j ] != subpic_grid_idx[ i − 1 ][ j ] ) {
                SubPicTop[ subpic_grid_idx[ i ][ j ] ] = i
        SubPicHeight[ subpic_grid_idx[ i − 1 ][ j ] ] = i − SubPicTop[ subpic_grid_idx[ i − 1 ][ j ] ]
        }
        if ( j == 0)
            SubPicLeft[ subpic_grid_idx[ i ][ j ] ] = 0
            else if (subpic_grid_idx[ i ][ j ] != subpic_grid_idx[ i ][ j − 1 ] ) {
                SubPicLeft[ subpic_grid_idx[ i ][ j ] ] = j
        SubPicWidth[ subpic_grid_idx[ i ][ j ] ] = j − SubPicLeft[ subpic_grid_idx[ i ][ j − 1 ] ]
        }
        if( i == Num SubPicGridRows − 1)
        SubPicHeight[ subpic_grid_idx[ i ][ j ] ] = i − SubPicTop[ subpic_grid_idx[ i − 1 ][ j ] ] + 1
        if (j == NumSubPicGridRows − 1)
        SubPicWidth[ subpic_grid_idx[ i ][ j ] ] = j − SubPicLeft[ subpic_grid_idx[ i ][ j − 1 ] ] + 1
        if( subpic_grid_idx[ i ][ j ] > Num SubPics)
            NumSubPics = subpic_grid_idx[ i ][ j ]
    }
}
``` subpics_present_flag equal to 1 indicates that sub-picture parameters are present in the present in the SPS RB SP syntax. subpics_present_flag equal to 0 indicates that sub-picture parameters are not present in the present in the SPS RB SP syntax.

NOTE 2—When a bitstream is the result of a sub-bitstream extraction process and contains only a subset of the sub-pictures of the input bitstream to the sub-bitstream extraction process, it might be required to set the value of subpics_present_flag equal to 1 in the RB SP of the SPSs.

max_subpics_minus1 plus 1 specifies the maximum number of sub-pictures that may be present in the CVS. max_subpics_minus1 shall be in the range of 0 to 254. The value of 255 is reserved for future use by ITU-T|ISO/IEC.

subpic_grid_col_width_minus1 plus 1 specifies the width of each element of the sub-picture identifier grid in units of 4 samples. The length of the syntax element is Ceil(Log 2(pic_width_max_in_luma_samples/4)) bits. The variable NumSubPicGridCols is derived as follows:

subpic_treated_as_pic_flag[i] equal to 1 specifies that the i-th sub-picture of each coded picture in the CVS is treated as a picture in the decoding process excluding in-loop filtering operations. subpic_treated_as_pic_flag[i] equal to 0 specifies that the i-th sub-picture of each coded picture in the CVS is not treated as a picture in the decoding process excluding in-loop filtering operations. When not present, the value of subpic_treated_as_pic_flag[i] is inferred to be equal to 0.

loop_filter_across_subpic_enabled_flag[i] equal to 1 specifies that in-loop filtering operations may be performed across the boundaries of the i-th sub-picture in each coded picture in the CVS.

loop_filter_across_subpic_enabled_flag[i] equal to 0 specifies that in-loop filtering operations are not performed across the boundaries of the i-th sub-picture in each coded picture in the CVS. When not present, the value of loop_filter_across_subpic_enabled_pic_flag[i] is inferred to be equal to 1.

It is a requirement of bitstream conformance that the following constraints apply:
- For any two sub-pictures subpicA and subpicB, when the index of subpicA is less than the index of subpicB, any coded NAL unit of subPicA shall succeed any coded NAL unit of subPicB in decoding order.
- The shapes of the sub-pictures shall be such that each sub-picture, when decoded, shall have its entire left boundary and entire top boundary consisting of picture boundaries or consisting of boundaries of previously decoded sub-pictures.

The list CtbToSubPicIdx[ctbAddrRs] for ctbAddrRs ranging from 0 to Pic SizeInCtbsY−1, inclusive, specifying the conversion from a CTB address in picture raster scanto a sub-picture index, is derived as follows:

```
for( ctbAddrRs = 0; ctbAddrRs < PicSizeInCtbsY; ctbAddrRs++ ) {
  posX = ctbAddrRs%PicWidthInCtbsY * CtbSizeY
  posY = ctbAddrRs / PicWidthInCtbsY * CtbSizeY
  CtbToSubPicIdx[ ctbAddrRs ] = −1
  for( i = 0; CtbToSubPicIdx[ ctbAddrRs ] < 0 && i < NumSubPics; i++ ) {
    if( ( posX >= SubPicLeft[ i ] * ( subpic_grid_col_width_minus1 + 1 ) * 4 ) &&
      ( posX < ( SubPicLeft[ i ] + SubPicWidth[ i ] ) *
        ( subpic_grid_col_width_minus1 + 1) * 4) &&
      ( posY >= SubPicTop[ i ] *
        ( subpic_grid_row_height_minus1 + 1) * 4) &&
      ( posY < ( SubPicTop[ i ] + SubPicHeight[ i ] ) *
        ( subpic_grid_row_height_minus1 + 1) * 4 ) )
      CtbToSubPicIdx[ ctbAddrRs ] = i
  }
}
``` num_bricks_in_slice_minus1, when pre sent, specifies the number of bricks in the slice minus1. The value of num_bricks_in_slice_minus1 shall be in the range of 0 to NumBricksInPic−1, inclusive. When rect_slice_flag is equal to 0 and single_brick_per_slice_flag is equal to 1, the value of num_bricks_in_slice_minus1 is inferred to be equal to 0. When single_brick_per_slice_flag is equal to 1, the value of num_bricks_in_slice_minus1 is inferred to be equal to 0.

The variable NumBricksInCurrSlice, which specifies the number of bricks in the current slice, and SliceBrickIdx[i], which specifies the brick index of the i-th brick in the current slice, are derived as follows:

Derivation Process for Temporal Luma Motion Vector Prediction

Inputs to this process are:
a luma location (xCb, yCb) of the top-left sample of the current luma coding block relative to the top-left luma sample of the current picture,
a variable cbWidth specifying the width of the current coding block in luma samples,
a variable cbHeight specifying the height of the current co ding block in luma samples,
a reference index refIdxLX, with X being 0 or 1.

Outputs of this process are:
the motion vector prediction mvLXCol in $\frac{1}{16}$ fractional-sample accuracy,
the availability flag availableFlagLXCol.

The variable currCb specifies the current luma coding block at luma location (xCb, yCb).

The variables mvLXCol and availableFlagLXCol are derived as follows:

If slice_temporal_mvp_enabled_flag is equal to 0 or (cbWidth*cbHeight) is less than or equal to 32, both components of mvLXCol are set equal to 0 and availableFlagLXCol is set equal to 0.

Otherwise (slice_temporal_mvp_enabled_flag is equal to 1), the following ordered steps apply:

```
if( rect_slice_flag ) {
  sliceIdx = 0
  while( slice_address != slice_id[ sliceIdx ] )
    sliceIdx++
  NumBricksInCurrSlice = NumBricksInSlice[ sliceIdx ]
  brickIdx = TopLeftBrickIdx[ sliceIdx ]
  for( bIdx = 0; brickIdx <= BottomRightBrickIdx[ sliceIdx ]; brickIdx++ )   (7-92)
    if( BricksToSliceMap[ brickIdx ] = = sliceIdx )
  SliceBrickIdx[ bIdx ++ ] = brickIdx
} else {
  NumBricksInCurrSlice = num_bricks_in_slice_minus1 + 1
  SliceBrickIdx[ 0 ] = slice_address
  for( i = 1; i < NumBricksInCurrSlice ; i++ )
    SliceBrickIdx[ i ] = SliceBrickIdx[ i − 1 ] + 1
}
The variables SubPicIdx, SubPicLeftBoundaryPos, SubPicTopBoundaryPos,
SubPicRightBoundaryPos, and SubPicBotBoundaryPos are derived as follows:
SubPicIdx = CtbToSubPicIdx[ CtbAddrBsToRs[ FirstCtbAddrBs[ SliceBrickIdx[ 0 ] ] ] ]
if( subpic_treated_as_pic_flag[ SubPicIdx ] ) {
SubPicLeftBoundaryPos = SubPicLeft[ SubPicIdx ] * ( subpic_grid_col_width_minus1 + 1) * 4
SubPicRightBoundaryPos = ( SubPicLeft[ SubPicIdx ] + SubPicWidth[ SubPicIdx ] ) *
    ( subpic_grid_col_width_minus1 + 1) * 4
SubPicTopBoundaryPos = SubPicTop[ SubPicIdx ] * ( subpic_grid_row_height_minus1 + 1 )* 4
SubPicBotBoundaryPos = ( SubPicTop[ SubPicIdx ] + SubPicHeight[ SubPicIdx ] ) *
    ( subpic_grid_row_height_minus1 + 1 ) * 4
}
...
```

1. The bottom right collocated motion vector and the bottom and right boundary sample locations are derived as follows:

$$xColBr=xCb+cbWidth \quad (8\text{-}421)$$

$$yColBr=yCb+cbHeight \quad (8\text{-}422)$$

rightBoundaryPos=subpic_treated_aspic_flag[SubPicIdx]?

SubPicRightBoundaryPos:pic_width_in_luma_samples−1 (8-423)

botBoundaryPos=subpic_treated_as_pic_flag[SubPicIdx]?

SubPicBotBoundaryPos:pic_height_in_luma_samples−1 (8-424)

If yCb>>Ctb Log 2SizeY is equal to yColBr>>Ctb Log 2SizeY, yColBr is less than or equal to botBoundaryPos and xColBr is less than or equal to rightBoundaryPos, the following applies:

The variable colCb specifies the luma coding block covering the modified location given by ((xColBr>>3)<<3, (yColBr>>3)<<3) inside the collocated picture specified by ColPic.

The luma location (xColCb, yColCb) is set equal to the top-left sample of the collocated luma coding block specified by colCb relative to the top-left luma sample of the collocated picture specified by ColPic.

The derivation process for collocated motion vectors as specified in clause 8.5.2.12 is invoked with currCb, colCb, (xColCb, yColCb), refIdxLX and sbFlag set equal to 0 as inputs, and the output is assigned to mvlACol and availableFlagLXCol.

Otherwise, both components of mvLXCol are set equal to 0 and available FlagLXCol is set equal to 0.

. . .

Luma Sample Bilinear Interpolation Process

Inputs to this process are:
a luma location in full-sample units $(xInt_L)$,
a luma location in fractional-sample units $(xFrac_L, yFrac_L)$,
the luma reference sample array $refPicLX_L$.

Output of this process is a predicted luma sample value $predSampleLX_L$

The variables shift1, shift2, shift3, shift4, offset1, offset2 and offset3 are derived as follows:

$$shift1=BitDepth_Y-6 \quad (8\text{-}453)$$

$$offset1=1<<(shift1-1) \quad (8\text{-}454)$$

$$shift2=4 \quad (8\text{-}455)$$

$$offset2=1<<(shift2-1) \quad (8\text{-}456)$$

$$shift3=10-BitDepth_Y \quad (8\text{-}457)$$

$$shift4=BitDepth_Y-10 \quad (8\text{-}458)$$

$$offset4=1<<(shift4-1) \quad (8\text{-}459)$$

The variable picW is set equal to pic_width_in_luma_samples and the variable picH is set equal to pic_height_in_luma_samples.

The luma interpolation filter coefficients $fb_L[p]$ for each 1/16 fractional sample position p equal to $xFrac_L$ or $yFrac_L$ are specified in Table 8-10.

The luma locations in full-sample units $(xInt_i, yInt_i)$ are derived as follows for i=0 . . . 1:

If subpic_treated_as_pic_flag[SubPicIdx] is equal to 1, the following applies:

$$xInt_i=Clip3(SubPicLeftBoundaryPos,SubPicRightBoundaryPos,xInt_L+i) \quad (8\text{-}460)$$

$$yInt_i=Clip3(SubPicTopBoundaryPos,SubPicBotBoundaryPos,yInt_L+i) \quad (8\text{-}461)$$

Otherwise (subpic_treated_as_pic_flag[SubPicIdx] is equal to 0), the following applies:

xInt_i=Clip3(0,picW−1,sps_ref_wraparound_enabled_flag?

$$ClipH((sps\_ref\_wraparound\_offset\_minus1+1)*MinCbSizeY,picW,(xInt_L+i)): \quad (8\text{-}462)$$

$$xInt_L+i)$$

$$yInt_i=Clip3(0,picH-1,yInt_L+i) \quad (8\text{-}463)$$

. . .

Derivation Process for Subblock-Based Temporal Merging Candidates

Inputs to this process are:
a luma location (xCb, yCb) of the top-left sample of the current luma coding block relative to the top-left luma sample of the current picture,
a variable cbWidth specifying the width of the current coding block in luma samples,
a variable cbHeight specifying the height of the current coding block in luma samples.
the availability flag availableFlagA$_1$ of the neighbouring coding unit,
the reference index refIdxLXA$_1$ of the neighbouring coding unit with X being 0 or 1,
the prediction list utilization flag predFlagLXA$_1$ of the neighbouring coding unit with X being 0 or 1,
the motion vector in 1/16 fractional-sample accuracy mvLXA$_1$ of the neighbouring coding unit with X being 0 or 1.

Outputs of this process are:
the availability flag a vailableFlagSbCol,
the number of luma coding subblocks in horizontal direction num SbX and in vertical direction numSbY,
the reference indices refIdxL0SbCol and refIdxL1SbCol,
the luma motion vectors in 1/16 fractional-sample accuracy mvL0SbCol[xSbIdx][ySbIdx] and mvL1SbCol[xSbIdx][ySbIdx] with xSbIdx=0 . . . numSbX−1, ySbIdx=0 . . . numSbY−1,
the prediction list utilization flags predFlagL0SbCol[xSbIdx][ySbIdx] and predFlagL1SbCol[xSbIdx][ySbIdx] with xSbIdx=0 . . . numSbX−1, ySbIdx=0 . . . numSbY−1.

The availability flag availableFlagSbCol is derived as follows.

If one or more of the following conditions is true, available FlagSbCol is set equal to 0.
slice_temporal_mvp_enabled_flag is equal to 0.
sps_sbtmvp_enabled_flag is equal to 0.
cbWidth is less than 8.
cbHeight is less than 8.

Otherwise, the following ordered steps apply:
1. The location (xCtb, yCtb) of the top-left sample of the luma coding tree block that contains the current coding block and the location (xCtr, yCtr) of the below-right center sample of the current luma coding block are derived as follows:

| | |
|---|---|
| xCtb=(xCb>>Ctu Log 2Size)<<Ctu Log 2Size | (8-542) |
| yCtb=(yCb>>Ctu Log 2Size)<<Ctu Log 2Size | (8-543) |
| xCtr=xCb+(cbWidth/2) | (8-544) |
| yCtr=yCb+(cbHeight/2) | (8-545) |

2. The luma location (xColCtrCb, yColCtrCb) is set equal to the top-left sample of the collocated luma coding block covering the location given by (xCtr, yCtr) inside ColPic relative to the top-left luma sample of the collocated picture specified by ColPic.
3. The derivation process for subblock-based temporal merging base motion data as specified in clause 8.55.4 is invoked with the location (xCtb, yCtb), the location (xColCtrCb, yColCtrCb), the availability flag availableFlagA$_1$, and the prediction list utilization flag predFlagLXA$_1$, and the reference index refIdxLXA$_1$, and the motion vector mvLXA$_1$, with X being 0 and 1 as inputs and the motion vectors ctrMvLX, and the prediction list utilization flags ctrPredFlagLX of the collocated block, with X being 0 and 1, and the temporal motion vector tempMv as outputs.
4. The variable available FlagSbCol is derived as follows:
   If both ctrPredFlagL0 and ctrPredFlagL1 are equal to 0, available FlagSbCol is set equal to 0.
   Otherwise, availableFlagSbCol is set equal to 1.

When available FlagSbCol is equal to 1, the following applies:
The variables numSbX, numSbY, sbWidth, sbHeight and refIdxLXSbCol are derived as follows:

| | |
|---|---|
| numSbX=cbWidth>>3 | (8-546) |
| numSbY=cbHeight>>3 | (8-547) |
| sbWidth=cbWidth/numSbX | (8-548) |
| sbHeight=cbHeight/numSbY | (8-549) |
| refIdxLXSbCol=0 | (8-550) |

For xSbIdx=0 . . . numSbX−1 and ySbIdx=0 . . . numSbY−1, the motion vectors mvLXSbCol[xSbIdx][ySbIdx] and prediction list utilization flags predFlagLXSbCol[xSbIdx][ySbIdx] are derived as follows:
The luma location (xSb, ySb) specifying the top-left sample of the current coding subblock relative to the top-left luma sample of the current picture is derived as follows:

| | |
|---|---|
| xSb=xCb+xSbIdx*sbWidth+sbWidth/2 | (8-551) |
| ySb=yCb+ySbIdx*sbHeight+sbHeight/2 | (8-552) |

The location (xColSb, yColSb) of the collocated subblock inside ColPic is derived as follows.
   The following applies:
   yColSb=Clip3(yCtb, Min(CurPicHeightInSamplesY−1,yCtb+(1<<Ctb Log 2SizeY)−1), (8-553)

ySb+(tempMv[1]>>4))

If subpic_treated_as_pic_flag[SubPicIdx] is equal to 1, the following applies:
xColSb=Clip3(xCtb, Min(SubPicRightBoundaryPos,xCtb+(1<<Ctb Log 2SizeY)+3), (8-554)

xSb+(tempMv[0]>>4))

Otherwise (subpic_treated_as_pic_flag[SubPicIdx] is equal to 0), the following applies:
xColSb=Clip3(xCtb, Min(CurPicWidthInSamplesY−1,xCtb+(1<<Ctb Log 2SizeY)+3), (8-555)

xSb+(tempMv[0]>>4))

. . .

Derivation Process for Subblock-Based Temporal Merging Base Motion Data
Inputs to this process are:
   the location (xCtb, yCtb) of the top-left sample of the luma coding tree block that contains the current coding block,
   the location (xColCtrCb, yColCtrCb) of the top-left sample of the collocated luma coding block that covers the below-right center sample.
   the availability flag availableFlagA$_1$ of the neighbouring coding unit,
   the reference index refIdxXA$_1$ of the neighbouring coding unit,
   the prediction list utilizationflagpredFlagLXAi of the neighbouring coding unit,
   the motion vector in 1/16 fractional-sample accuracy mvLXA$_1$ of the neighbouring coding unit.
Outputs of this process are:
   the motion vectors ctrMvL0 and ctrMvL1,
   the prediction list utilization flags ctrPredFlagL0 and ctrPredFlagL1,
   the temporal motion vector tempMv.
The variable tempMv is set as follows:

| | |
|---|---|
| tempMv[0]=0 | (8-558) |
| tempMv[1]=0 | (8-559) |

The variable currPic specifies the current picture.
When availableFlagA$_1$ is equal to TRUE, the following applies:
   If all of the following conditions are true, tempMv is set equal to mvLOA$_1$:
      predFlagL0A$_1$ is equal to 1,
      DiffPicOrderCnt(ColPic, RefPicList[0][refIdxL0A$_1$]) is equal to 0,
   Otherwise, if all of the following conditions are true, tempMv is set equal to mvL1A$_1$:
      slice_type is equal to B,
      predFlagL1A$_1$ is equal to 1,
      DiffPicOrderCnt(ColPic, RefPicList[1][refIdxL1A$_1$]) is equal to 0.
The location (xColCb, yColCb) of the collocatedblock inside ColPic is derived as follows.
   The following applies:
   yColCb=Clip3(yCtb, Min(CurPicHeightInSamplesY−1,yCtb+(1<<Ctb Log 2SizeY)−1), (8-560)

yColCtrCb+(tempMv[1]>>4))

If subpic_treated_as_pic_flag[SubPicIdx] is equal to 1, the following applies:
xColCb=Clip3(xCtb, Min(SubPicRightBoundaryPos,xCtb+(1<<Ctb Log 2SizeY)+3), (8-561)

xColCtrCb+(tempMv[0]>>4))

Otherwise (subpic_treated_as_pic_flag[SubPicIdx] is equal to o, the following applies:

xColCb=Clip3(xCtb,

Min(CurPicWidthInSamplesY−1,xCtb+(1<<Ctb Log 2SizeY)+3),     (8-562)

xColCtrCb+(tempMv[0]>>4))

. . .

Luma Sample Interpolation Filtering Process
  Inputs to this process are:
  a luma location in full-sample units (xIntL, yInt$_L$),
  a luma location in fractional-sample units (xFrac$_L$, yFrac$_L$),
  a luma location in full-sample units (xSbInt$_L$, ySbInt$_L$) specifying the top-left sample of the bounding block for reference sample padding relative to the top-left luma sample of the reference picture,
  the luma reference sample array refPicLX$_L$,
  the half sample interpolation filter index hpelIfIdx,
  a variable sb Width specifying the width of the current subblock,
  a variable sb Height specifying the height of the current subblock,
  a luma location (xSb, ySb) specifying the top-left sample of the current subblock relative to the top-left luma sample of the current picture,
  Output of this process is a predicted luma sample value predSampleLX$_L$
  The variables shift1, shift2 and shift3 are derived as follows:
    The variable shift1 is set equal to Min(4, BitDepth$_Y$−8), the variable shift2 is set equal to 6 and the variable shift3 is set equal to Max(2, 14−BitDepth$_Y$).
    The variable picW is set equal to pic_width_in_luma_samples and the variable picH is set equal to pic_height_in_luma_samples.
    The luma interpolation filter coefficients f$_L$[p] for each 1/16 fractional sample position p equal to xFrac$_L$ or yFrac$_L$ are derived as follows:
      If MotionModelIdc[xSb][ySb] is greater than 0, and sbWidth and sbHeight are both equal to 4, the luma interpolation filter coefficients f$_L$[p] are specified in Table 8-12.
      Otherwise, the luma interpolation filter coefficients f$_L$[p] are specified in Table 8-11 depending on hpelIfIdx.
  The luma locations in full-sample units (xInt$_i$, yInt$_i$) are derived as follows for i=0 . . . 7:
    If subpic_treated_as_pic_flag[SubPicIdx] is equal to 1, the following applies:

xInt$_i$=Clip3(SubPicLeftBoundary Pos,SubPicRight-Boundary Pos,xInt$_L$+i−3)     (8-771)

yInt$_i$=Clip3(SubPicTopBoundary Pos,SubPicBot-Boundary Pos,yInt$_L$+i−3)     (8-772)

Otherwise (subpic_treated_as_pic_flag[SubPicIdx] is equal to 0), the following applies:

xInt$_i$=Clip3(0,picW−1,sps_ref_wraparound_enabled_flag?

ClipH((sps_ref_wraparound_offset_minus1+1)
    *MinCbSizeY,picW,xInt$_L$+i−3):     (8-773)

xInt$_L$+i−3)

yInt$_i$=Clip3(0,picH−1,yInt$_L$+i−3)     (8-774)

. . .

Chroma Sample Interpolation Process
  Inputs to this process are:
  a chroma location in full-sample units (xInt$_C$, yInt$_C$),
  a chroma location in 1/32 fractional-sample units (xFrac$_C$, yFrac$_C$),
  a chroma location in full-sample units (xSbIntC, ySbIntC) specifying the top-left sample of the bounding block for reference sample padding relative to the top-left chroma sample of the reference picture,
  a variable sbWidth specifying the width of the current subblock,
  a variable sbHeight specifying the height of the current subblock,
  the chroma reference sample array refPicLX$_C$.
  Output of this process is a predicted chroma sample value predSampleLX$_C$
  The variables shift1, shift2 and shift3 are derived as follows:
    The variable shift1 is set equal to Min(4, BitDepth$_C$−8), the variable shift2 is set equal to 6 and the variable shift3 is set equal to Max(2, 14−BitDepth$_C$).
    The variable picW$_C$ is set equal to pic_width_in_luma_samples/SubWidthC and the variable picH$_C$ is set equal to pic_height_in_luma_samples/Sub HeightC.
    The chroma interpolation filter coefficients f$_C$[p] for each 1/32 fractional sample position p equal to xFrac$_C$ or yFrac$_C$ are specified in Table 8-13.
    The variable xOffset is set equal to (sps_ref_wraparound_offset_minus1+1)*MinCbSizeY)/SubWidthC.
  The chroma locations in full-sample units (xInt$_i$, yInt$_i$) are derived as follows for i=0 . . . 3:
    If subpic_treated_as_pic_flag[SubPicIdx] is equal to 1, the following applies:

xInt$_i$=Clip3(SubPicLeftBoundaryPos/SubWidthC,
    SubPicRightBoundaryPos/SubWidthC,xInt$_L$+i)     (8-785)

yInt=Clip3(SubPicTopBoundaryPos/SubHeightC,
    SubPicBotBoundaryPos/SubHeightC,yInt$_L$+i)     (8-786)

Otherwise (subpic_treated_as_pic_flag[SubPicIdx] is equal to 0), the following applies:

xInti=Clip3(0,picW$_C$−1,sps_ref_wraparound_
    enabled_flag?ClipH(xOffset,picW$_C$,xInt$_C$+i−1):     (8-787)

xInt$_C$+i−1)

yInt$_i$=Clip3(0,picH$_C$−1,yInt$_C$+i−1)     (8-788)

2.4 Example Encoder-Only GOP-Based Temporal Filter

In some embodiments, an encoder-only temporal filter can be implemented. The filtering is done at the encoder side as a pre-processing step. Source pictures before and after the selected picture to encode are read and a block based motion compensation method relative to the selected picture is applied on those source pictures. Samples in the selected picture are temporally filtered using sample values after motion compensation.

The overall filter strength is set depending on the temporal sub layer of the selected picture as well as the QP. Only pictures at temporal sub layers 0 and 1 are filtered and pictures of layer 0 are filter by a stronger filter than pictures of layer 1. The per sample filter strength is adjusted depending on the difference between the sample value in the selected picture and the co-located samples in motion compensated pictures so that small differences between a motion compensated picture and the selected picture are filtered more strongly than larger differences.

GOP Based Temporal Filter

A temporal filter is introduced directly after reading picture and before encoding. Below are the steps described in more detail.

Operation 1: Pictures are read by the encoder

Operation 2: If a picture is low enough in the coding hierarchy, it is filtered before encoding. Otherwise the picture is encoded without filtering. RA pictures with POC % 8==0 are filtered as well as LD pictures with POC % 4==0. AI pictures are never filtered.

The overall filter strength, $s_o$, is set according to the equation below for RA.

$$s_o(n) = \begin{cases} 1.5, & n \bmod 16 = 0 \\ 0.95, & n \bmod 16 \neq 0 \end{cases}$$

where n is the number of pictures read.

For the LD case, $s_o(n)=0.95$ is used.

Operation 3: Two pictures before and/or after the selected picture (referred to as original picture further down) are read. In the edge cases e.g. if is the first picture or close to the last picture, only the available pictures are read.

Operation 4: Motion of the read pictures before and after, relative to the original picture is estimated per 8×8 picture block.

Figure 2:
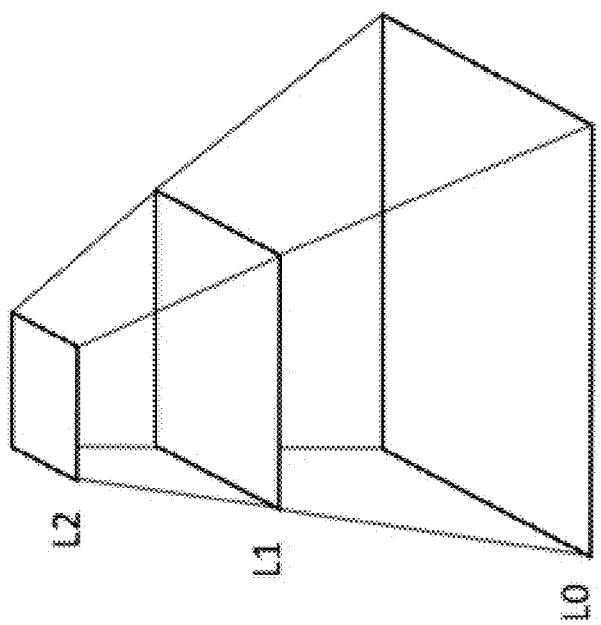
FIG. 2 shows an example of a hierarchical motion estimation scheme.

A hierarchical motion estimation scheme is used and the layers L0, L1 and L2, are illustrated in FIG. 2. Sub sampled pictures are generated by averaging each 2×2 block for all read pictures and the original picture, e.g. L1 in FIG. 1. L2 is derived from L1 using the same sub sampling method.

FIG. 2 shows examples of different layers of the hierarchical motion estimation. L0 is the original resolution. L1 is a sub sampled version of L0. L2 is a sub sampled version of L1.

First, motion estimation is done for each 16×16 block in L2. The squared difference is calculated for each selected motion vector and the motion vector corresponding to the smallest difference is selected. The selected motion vector is then used as initial value when estimating the motion in L1. Then the same is done for estimating motion in L0. As a final step, subpixel motion is estimated for each 8×8 block by using an interpolation filter on L0.

The VTM 6-tap interpolation filter can used:

| 0:  | 0, | 0,  | 64, | 0,  | 0,  | 0 |
|-----|----|-----|-----|-----|-----|---|
| 1:  | 1, | −3, | 64, | 4,  | −2, | 0 |
| 2:  | 1, | −6, | 62, | 9,  | −3, | 1 |
| 3:  | 2, | −8, | 60, | 14, | −5, | 1 |
| 4:  | 2, | −9, | 57, | 19, | −7, | 2 |
| 5:  | 3, | −10,| 53, | 24, | −8, | 2 |
| 6:  | 3, | −11,| 50, | 29, | −9, | 2 |
| 7:  | 3, | −11,| 44, | 35, | −10,| 3 |
| 8:  | 1, | −7, | 38, | 38, | −7, | 1 |
| 9:  | 3, | −10,| 35, | 44, | −11,| 3 |
| 10: | 2, | −9, | 29, | 50, | −11,| 3 |
| 11: | 2, | −8, | 24, | 53, | −10,| 3 |
| 12: | 2, | −7, | 19, | 57, | −9, | 2 |
| 13: | 1, | −5, | 14, | 60, | −8, | 2 |
| 14: | 1, | −3, | 9,  | 62, | −6, | 1 |
| 15: | 0, | −2, | 4,  | 64, | −3, | 1 |

Operation 5: Motion compensation is applied on the pictures before and after the original picture according to the best matching motion for each block, e.g., so that the sample coordinates of the original picture in each block have the best matching coordinates in the referenced pictures.

Operation 6: The samples of the processed one by one for the luma and chroma channels as described in the following steps.

Operation 7: The new sample value, $I_n$, is calculated using the following formula.

$$I_n = \frac{I_o + \sum_{i=0}^{3} w_r(i, a)I_r(i)}{1 + \sum_{i=0}^{3} w_r(i, a)}$$

Where $I_o$ is the sample value of the original sample, $I_r(i)$ is the intensity of the corresponding sample of motion compensated picture i and $w_r(i, \alpha)$ is the weight of motion compensated picture i when the number of available motion compensated pictures is $\alpha$.

In the luma channel, the weights, $w_r(i, \alpha)$, is defined as follows:

$$w_r(i, a) = s_l s_o(n) s_r(i, a) e^{-\frac{\Delta I(i)^2}{2\sigma_l(QP)^2}}$$ Where $s_l = 0.4$ $$s_r(i, 2) = \begin{cases} 1.2, & i = 0 \\ 1.0, & i = 1 \end{cases}$$

$$s_r(i, 4) = \begin{cases} 0.60, & i = 0 \\ 0.85, & i = 1 \\ 0.85, & i = 2 \\ 0.60, & i = 3 \end{cases}$$

For all other cases of i, and $\alpha$: $s_r(i, \alpha)=0.3$ $\sigma_l(QP)=3*(QP-10)$ $\Delta I(i)=I_r(i)-I_o$ For the chroma channels, the weights, $w_r(i, \alpha)$, is defined as follows:

$$w_r(i, a) = s_c s_o(n) s_r(i, a) e^{-\frac{\Delta I(i)^2}{2\sigma_c^2}}$$

Where $s_c=0.55$ and $\sigma_c=30$

Operation 8: The filter is applied for the current sample. The resulting sample value is stored separately.

Operation 9: The filtered picture is encoded.

2.5 Example Picture Partitions (Tiles, Bricks, Slices)

In some embodiments, a picture is divided into one or more tile rows and one or more tile columns. A tile is a sequence of CTUs that covers a rectangular region of a picture.

A tile is divided into one or more bricks, each of which consisting of a number of CTU rows within the tile.

A tile that is not partitioned into multiple bricks is also referred to as a brick. However, a brick that is a true subset of a tile is not referred to as a tile.

A slice either contains a number of tiles of a picture or a number of bricks of a tile.

A sub-picture contains one or more slices that collectively cover a rectangular region of a picture.

Two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of brick raster scan of the slice.

Figure 5:
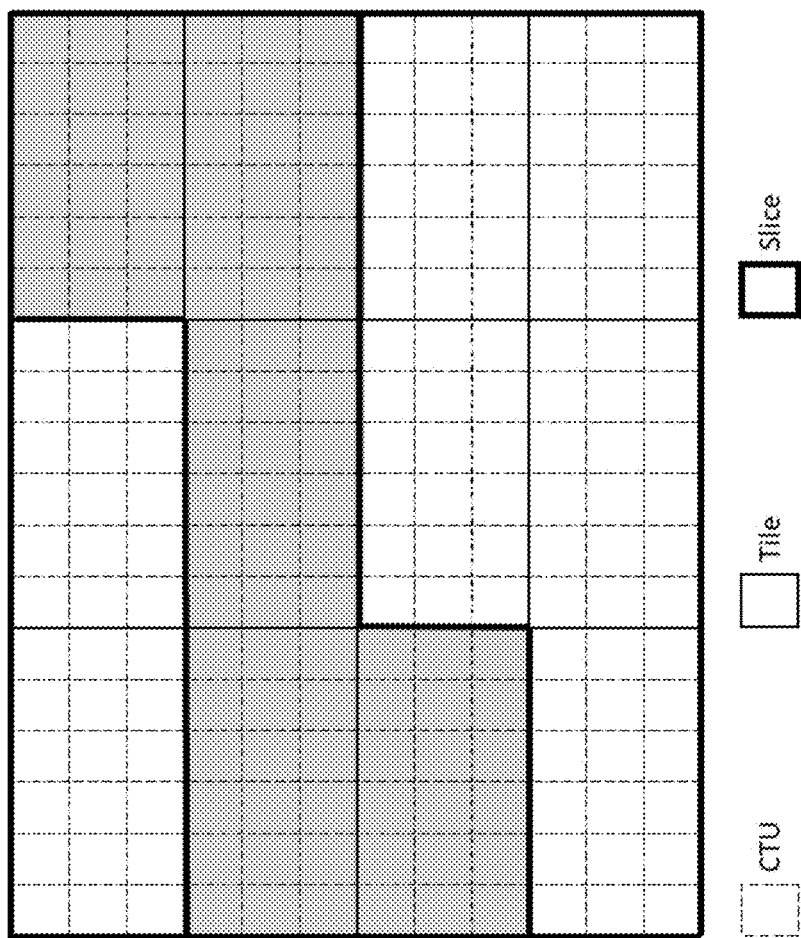
FIG. 5 shows an example of a picture with 18 by 12 luma CTUs that is partitioned into 12 tiles and 3 raster-scan slices (informative).

FIG. 5 shows an example of raster-scan slice partitioning of a picture, where the picture is divided into 12 tiles and 3 raster-scan slices.

Figure 6:
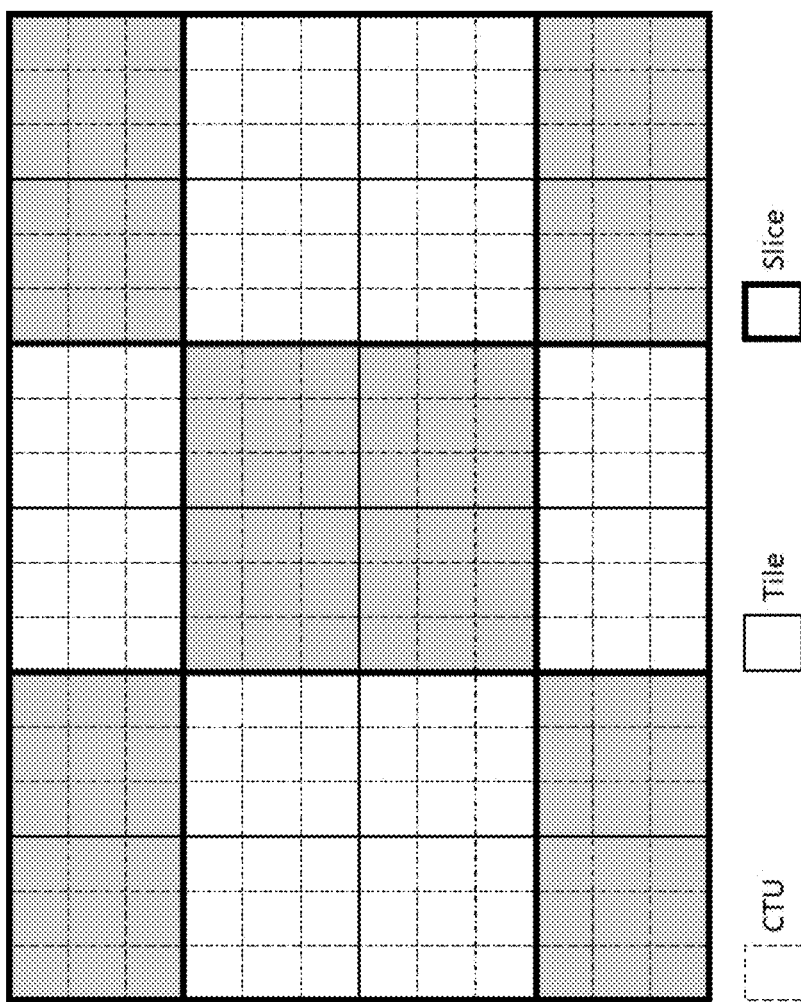
FIG. 6 shows an example of picture with 18 by 12 luma CTUs that is partitioned into 24 tiles and 9 rectangular slices (informative).

FIG. 6 shows an example of rectangular slice partitioning of a picture, where the picture is divided into 24 tiles (6 tile columns and 4 tile rows) and 9 rectangular slices.

Figure 7:
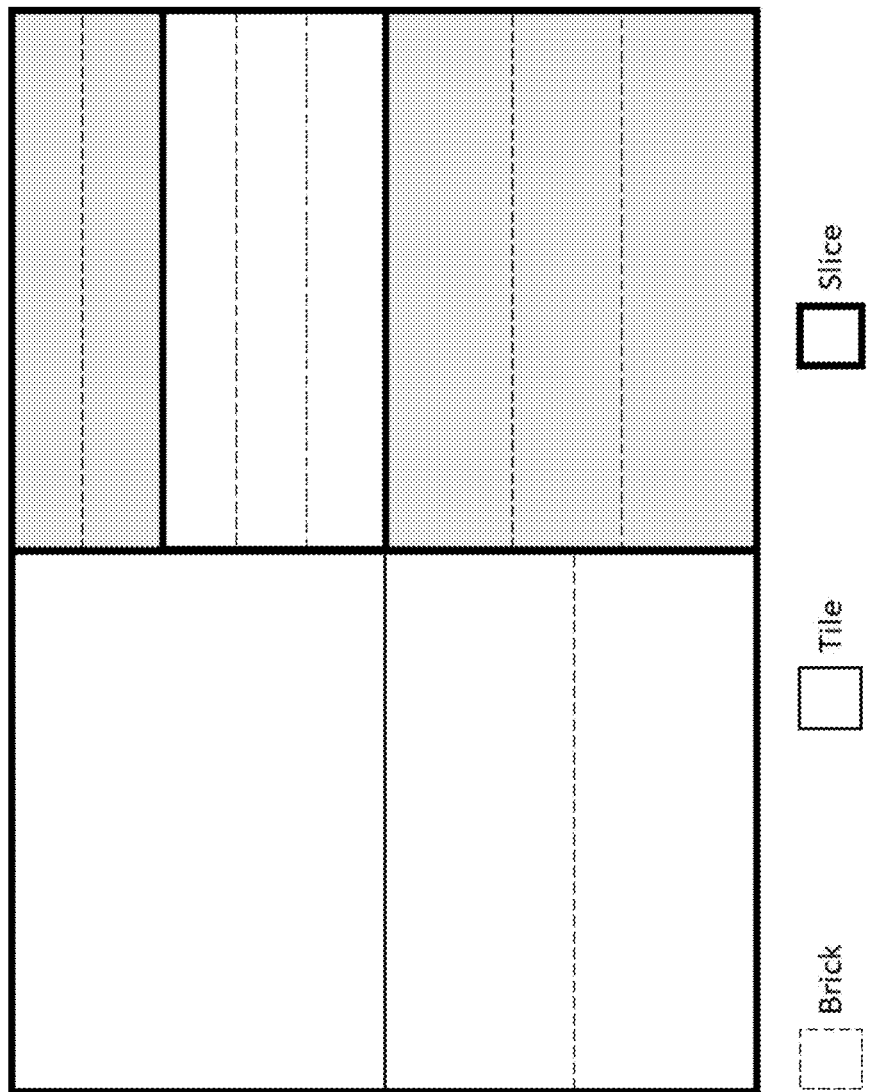
FIG. 7 shows an example of a picture that is partitioned into 4 tiles, 11 bricks, and 4 rectangular slices (informative).

FIG. 7 shows an example of a picture partitioned into tiles, bricks, and rectangular slices, where the picture is divided into 4 tiles (2 tile columns and 2 tile rows), 11 bricks (the top-left tile contains 1 brick, the top-right tile contains 5 bricks, the bottom-left tile contains 2 bricks, and the bottom-right tile contain 3 bricks), and 4 rectangular slices.

Picture Parameter Set RBSP Syntax

| | Descriptor |
|---|---|
| pic_parameter_set_rbsp( ) { | |
| ... | |
|   single_tile_in_pic_flag | u(1) |
|   if( !single_tile_in_pic_flag) { | |
|     uniform_tile_spacing_flag | u(1) |
|     if( uniform_tile_spacing_flag) { | |
|       tile_cols_width_minus1 | ue(v) |
|       tile_rows_height_minus1 | ue(v) |
|     } else { | |
|       num_tile_columns_minus1 | ue(v) |
|       num_tile_rows_minus1 | ue(v) |
|       for( i = 0; i < num_tile_columns_minus1; i++ ) | |
|         tile_column_width_minus1[ i ] | ue(v) |
|       for( i = 0; i < num_file_rows_minus1; i++ ) | |
|         tile_row_height_minus1[ i ] | ue(v) |
|     } | |
|     brick_splitting_present_flag | u(1) |
|     if( uniform_tile_spacing_flag && brick_splitting_present_flag ) | |
|       num_tiles_in_pic_minus1 | ue(v) |
|     for( i = 0; brick_splitting_present_flag && i <= num_tiles_in_pic_minus1 + 1; i++ ) { | |
|       if( RowHeight[ i ] > 1 ) | |
|         brick_split_flag[ i ] | u(1) |
|       if( brick_split_flag[ i ] ) { | |
|         if( RowHeight[ i ] > 2 ) | |
|           uniform_brick_spacing_flag[ i ] | u(1) |
|         if( uniform_brick_spacing_flag[ i ] ) | |
|           brick_height_minus1[ i ] | ue(v) |
|         else { | |
|           num_brick_rows_minus2[ i ] | ue(v) |
|           for( j = 0; j <= num_brick_rows_minus2[ i ]; j++ ) | |
|             brick_row_height_minus1[ i ][ j ] | ue(v) |
|         } | |
|       } | |
|     } | |
|     single_brick_per_slice_flag | u(1) |
|     if( !single_brick_per_slice_flag ) | |
|       rect_slice_flag | u(1) |
|     if( rect_slice_flag && !single_brick_per_slice_flag ) { | |
|       num_slices_in_pic_minus1 | ue(v) |
|       bottom_right_brick_idx_length_minus1 | ue(v) |
|       for( i = 0; i < num_slices_in_pic_minus1; i++ ) { | |
|         bottom_right_brick_idx_delta[ i ] | u(v) |
|         brick_idx_delta_sign_flag[ i ] | u(1) |
|       } | |
|     } | |
|     loop_filter_across_bricks_enabled_flag | u(1) |
|     if( loop_filter_across_bricks_enabled_flag ) | |
|       loop_filter_across_slices_enabled_flag | u(1) |
|   } | |
|   if( rect_slice_flag ) { | |
|     signalled_slice_id_flag | u(1) |
|     if( signalled_slice_id_flag) { | |
|       signalled_slice_id_length_minus1 | ue(v) |
|       for( i = 0; i <= num_slices_in_pic_minus1; i++ ) | |
|         slice_id[ i ] | u(v) |
|     } | |
|   } | |
| ... | |

| | Descriptor |
|---|---|
| slice_header( ) { | |
|   slice_pic_parameter_set_id | ue(v) |
|   if( rect_slice_flag \|\| NumBricksInPic >1) | |
|     slice_address | u(v) |
|   if( !rect_slice_flag && !single_brick_per_slice_flag) | |
|     num_bricks_in_slice_minus1 | ue(v) |
|   non_reference_picture_flag | u(1) |
|   slice_type | ue(v) |
| ... | | single_tile_in_pic_flag equal to 1 specifies that there is only one tile in each picture referring to the PPS.

single_tile_in_pic_flag equal to 0 specifies that there is more than one tile in each picture referring to the PPS.

NOTE In absence of further brick splitting within a tile, the whole tile is referred to as a brick. When a picture contains only a single tile without further brick splitting, it is referred to as a single brick.

It is a requirement of bitstream conformance that the value of single_tile_in_pic_flag shall be the same for all PPSs that are referred to by coded pictures within a CVS.

uniform_tile_spacing_flag equal to 1 specifies that tile column boundaries and likewise tile row boundaries are distributed uniformly across the picture and signalled using the syntax elements tile_cols_width_minus1 and tile_rows_height_minus1. uniform_tile_spacing_flag equal to 0 specifies that tile column boundaries and likewise tile row boundaries may or may not be distributed uniformly across the picture and signalled using the syntax elements num_tile_columns_minus1 and num_tile_rows_minus1 and a list of syntax element pairs tile_column_width_minus1[i] and tile_row_height_minus1[i]. When not present, the value of uniform_tile_spacing_flag is inferred to be equal to 1.

tile_cols_width_minus1 plus 1 specifies the width of the tile columns excluding the right-most tile column of the picture in units of CTBs when unifonrm_tile_spacing_flag is equal to 1. The value of tile_cols_width_minus1 shall be in the range of 0 to PicWidthInCtbsY−1, inclusive. When not present, the value of tile_cols_width_minus1 is inferred to be equal to PicWidthInCtbsY−1.

tile_rows_height_minus1 plus 1 specifies the height of the tile rows excluding the bottom tile row of the picture in units of CTBs when uniform_file_spacing_flag is equal to 1. The value of tile_rows_height_minus1 shall be in the range of 0 to PicHeightInCtbsY−1, inclusive. When not present, the value of tile_rows_height_minus1 is inferred to be equal to PicHeightInCtbsY−1.

num_tile_colurrms_minus1 plus 1 specifies the number of tile columns partitioning the picture when uniform_file_spacing_flag is equal to 0. The value of num_tile_columns_minus1 shall be in the range of 0 to PicWidthInCtbsY−1, inclusive. If single_tile_in_pic_flag is equal to 1, the value of num_tile_columns_minus1 is inferred to be equal to 0. Otherwise, when uniform_tile_spacing_flag is equal to 1, the value of numtile_columnsminus1 is inferred as specified in clause 6.5.1.

num_tile_rowsminus1 plus 1 specifies the number of tile rows partitioning the picture when uniform_file_spacing_flag is equal to 0. The value of num_tile_rows_minus1 shall be in the range of 0 to PicHeightInCtbsY−1, inclusive. If sin gle_tile_in_pic_flag is equal to 1, the value ofnum_tile_rows_minus1 is inferred to be equal to 0. Otherwise, when uniform_tile_spacing_flag is equal to 1, the value of numtile_rowsminus1 is inferred as specified in clause 6.5.1.

The variable NumTilesInPic is set equal to (num_tile_columns_minus1+1)*(num_tile_rows_minus1+1).

When single_tile_in_pic_flag is equal to 0, Num TilesInPic shall be greater than 1.

tile_column width_minus1[i] plus 1 specifies the width of the i-th tile column in units of CTBs.

tile_row_height_minus1[i] plus 1 specifies the height of the i-th row in units of CTBs.

brick_splitting_present_flag equal to 1 specifies that one or more tiles of pictures referring to the PPS may be divided into two or m ore bricks. brick_splitting_present_flag equal to 0 specifies that no tiles of pictures referring to the PPS are divided into two or more bricks.

num_tiles_in_pic_minus1 plus 1 specifies the number of tiles in each picture referring to the PPS. The value of num_tiles_in_pic_minus1 shall be equal to Num TilesInPic−1. When not present, the value of num_tiles_in_pic_minus1 is inferred to be equal to Num TilesInPic−1.

brick_split_flag[i] equal to 1 specifies that the i-th tile is divided into two or more bricks. brick_split_flag[i] equal to 0 specifies that the i-th tile is not divided into two or m ore bricks. When not present, the value of brick_split_flag[i] is inferred to be equal to 0. In some embodiments, PPS parsing dependency on SPS is introduced by adding the syntax condition "if (RowHeight[i]>1)" (e.g., similarly for uniform_brick_spacing_flag[i]).

uniform brick spacing_flag[i] equal to 1 specifies that horizontal brick boundaries are distributed uniformly across the i-th tile and signalled using the syntax element brick_height_minus1[i]. uniform_brick_spacing_flag[i] equal to 0 specifies that horizontal brick boundaries may or may not be distributed unifoimly across i-th tile and signalled using the syntax element num_brick_rows_minus2[i] and a list of syntax elements brick_row_height_minus1[i][j]. When not present, the value of uniform_brick_spacing_flag[i] is inferred to be equal to 1.

brick_height_minus1[i] plus 1 specifies the height of the brick rows excluding the bottom brick in the i-th tile in units of CTBs when uniform_brick_spacing_flag[i] is equal to 1. When present, the value of brick_height_minus1 shall be in the range of 0 to RowHeight[i]−2, inclusive. When not present, the value of brick_height_minus1[i] is inferred to be equal to RowHeight[i]−1.

num_brick_rows_minus2[i] plus 2 specifies the number of bricks partitioning the i-th tile when uniform_brick_spacing_flag[i] is equal to 0. When present, the value of num_brick_rows_minus2[i] shall be in the range of 0 to RowHeight[i]−2, inclusive. If brick_split_flag[i] is equal to 0, the value of num_brick_rows_minus2[i] is inferred to be equal to 1. Otherwise, when uniform_brick_spacing_flag[i] is equal to 1, the value of num_brick_rows_minus2[i] is inferred as specified in 6.5.1.

brick_row_height_minus1[i][j] plus 1 specifies the height of the j-th brick in the i-th tile in units of CTBs when uniform_file_spacing_flag is equal to 0.

The following variables are derived, and, when unifonn_tile_spacing_flag is equal to 1, the values of num_tile_columns_minus1 and num_tile_rows_minus1 are inferred, and, for each i ranging from 0 to Num_TilesInPic−1, inclusive, when uniform_brick_spacing_flag[i] is equal to 1, the value of num_brick_rows_minus2[i] is inferred, by invoking the CTBraster and brick scanning conversion process as specified in clause 6.5.1:

the list RowHeight[j] for j ranging from 0 to num_tile_rows_minus1, inclusive, specifying the height of the j-th the row in units of CTBs, the list CtbAddrRsToBs[ctbAddrRs] for ctbAddrRs ranging from 0 to PicSizeInCtbsY−1, inclusive, specifying the conversion from a CTB address in the CTB raster scan of a picture to a CTB address in the brick scan, the list CtbAddrBsToRs[ctbAddrBs] for ctbAddrBs ranging from 0 to Pic SizeInCtbsY−1, inclusive, specifying the conversion from a CTB address in the brick scan to a CTB address in the CTB raster scan of a picture, the list BrickId[ctbAddrBs] for ctbAddrBs ranging from 0 to Pic SizeInCtbsY−1, inclusive, specifying the conversionfrom a CTB address in brick scanto a brick ID, the list NumCtusInBrick[brickIdx] for brickIdx ranging from 0 to NumBricksInPic−1, inclusive, specifying the conversionfrom a brick indexto the number of CTUs in the brick, the list FirstCtbAddrBs[brickIdx] for brickIdx rangin g from 0 to NumBricksInPic−1, inclusive, specifying the conversion from a brick ID to the CTB address in brick scan of the first CTB in the brick.

single_brick_per_slice_flag equal to 1 specifies that each slice that refers to this PPS includes one brick. single_brick_per_slice_flag is equal to 1, the value of bottom_right_brick_idx_delta[i] is inferred to be equal to 1. The value of the BottomRightBrickIdx[num_slices_in_pic_minus1] is inferred to be equal to NumBricksInPic−1. The length of the bottom_right_brick_idx_delta[i] syntax element is bottom_right_brick_idx_length_minus1+1 bits.

brick_idx_delta_sign_flag[i] equal to 1 indicates a positive sign for delta[i].

sign_bottom_right_brick_idx_delta[i] equal to 0 indicates a negative sign for bottom_right_brick_idx_delta[i]. It is a requirement of bitstream conformance that a slice shall include either a number of complete tiles or only a consecutive sequence of complete bricks of one tile.

The variable TopLeftBrickIdx[i], BottomRightBrickIdx[i], Num BricksInSlice[i] and BricksToSliceMap[j], which specify the brick index of the brick located atthe top leftcorner of the i-th slice, the brick index of the brick located at the bottom right corner of the i-th slice, the number of bricks in the i-th slice and the mapping of bricks to slices, are derived as follows:

```
for( j = 0; i = = 0 && j < NumBricksInPic; j++ )
    BricksToSliceMap[ j ] = −1
NumBricksInSlice[ i ] = 0
BottomRightBrickIdx[ i ] =bottom_right_brick_idx_delta[ i ] ] +( ( i = = 0 ) ? 0:
        ( brick_idx_delta_sign_flag[ i ] ? BottomRightBrickIdx[ i − 1 ] :
−BottomRightBrickIdx[ i−1 ] )
for(j = BottomRightBrickIdx[ i ]; j >= 0; j− − ) {
    if( BrickColBd[ j ] <= BrickColBd[ BottomRightBrickIdx[ i ] ] && (7-43)
        BrickRowBd[ j ] <= BrickRowBd[ BottomRightBrickIdx[ i ] ] &&
        BricksToSliceMap[ j ] = = −1 ) {
        TopLeftBrickIdx[ i ] = j
        NumBrick sInSlice[ i ]++
        BricksToSliceMap[ j ] = i
    }
}
``` single_brick_per_slice_flag equal to 0 specifies that a slice that refers to this PPS may include more than one brick. When not present, the value of single_brick_per_slice_flag is inferred to be equal to 1.

rect_slice_flag equal to 0 specifies that bricks within each slice are in raster scan order and the slice information is not signalled in PPS. rect_slice_flag equal to 1 specifies that bricks within each slice cover a rectangular region of the picture and the slice information is signalled in the PPS. When brick_splitting_present_flag is equal to 1, the value of rect_slice_flag shall be equal to 1. When not present, rect_slice_flag is inferred to be equal to 1.

num_slices_in_pic_minus1 plus 1 specifies the number of slices in each picture referring to the PPS. The value of num_slices_in_pic_minus1 shall be in the range of 0 to NumBricksInPic−1, inclusive. When not present and single_brick_per_slice_flag is equal to 1, the value of num_slices_in_pic_minus1 is inferred to be equal to Num BricksInPic−1.

bottom_right_brick_idx_length_minus1 plus 1 specifies the number of bits used to represent the syntax element bottom_right_brick_idx_delta[i]. The value of bottom_right_brick_idx_length_minus1 shall be in the range of 0 to Ceil(Log 2(NumBricksInPic))−1, inclusive.

bottom_right_brick_idx_delta[i] when i is greater than 0 specifies the difference between the brick index of the brick located at the bottom-right corner of the i-th slice and and the brick index of the bottom-right corner of the (i−1)-th slice. bottom_right_brick_idx_delta[0] specifies the brick index of the bottom right corner of the 0-th slice. When General Slice Header Semantics When present, the value of each of the slice header syntax elements slice_pic_pammeter_set_id, non_reference_picture_flag, colour_plane_id, slice_pic_order_cnt_lsb, recovery_poc_cnt, no_output_of_prior_pics_flag, pic_output_flag, and slice_temporal_mvp_enabled_flag shall be the same in all slice headers of a coded picture.

The variable CuQpDeltaVal, specifying the difference between a luma quantization parameter for the coding unit containing cu_qp_delta_abs and its prediction, is set equal to 0. The variables CuQpOffset$_{Cb}$, CuQpOffset$_{Cr}$, and CuQpOffset$_{CbCr}$, specifying values to be used when determining the respective values of the Qp'$_{Cb}$, Qp'$_{Cr}$, and Qp'$_{CbCr}$ quantization pammeters for the coding unit containing cu_chroma_qp_offset_flag, are all set equal to 0.

slice_pic_parameter_set_id specifies the value of pps_pic_parameter_set_id for the PPS in use. The value of slice_pic_parameter_set_id shall be in the range of 0 to 63, inclusive.

It is a requirement of bitstream conformance that the value of TemporalId of the current picture shall be greater than or equal to the value of TemporalId of the PPS that has pps_pic_parameter_set_id equal to slice_pic_parameter_set_id.

slice_address specifies the slice address of the slice. When not present, the value of slice_address is inferred to be equal to 0.

If rect_slice_flag is equal to 0, the following applies:
    The slice address is the brick ID as specified by Equation (7-59).

The length of slice_address is Ceil(Log 2 (NumBricksInPic)) bits.

The value of slice_address shall be in the range of 0 to NumBricksInPic−1, inclusive.

Otherwise (rect_slice_flag is equal to 1), the following applies:

The slice address is the slice ID of the slice.

The length of slice_address is signalled_slice_id_length_minus1+1 bits.

If signalled_slice_id_flag is equal to 0, the value of slice_address shall be in the range of 0 to num_slices_in_pic_minus1, inclusive. Otherwise, the value of slice address shall be in the range of 0 to $2^{(signalled\_slice\_id\_length\_minus1+1)}-1$, inclusive.

It is a requirement of bitstream conformance that the following constraints apply:

The value of slice_address shall not be equal to the value of slice_address of any other coded slice NAL unit of the same coded picture.

When rect_slice_flag is equal to 0, the slices of a picture shall be in increasing order of their slice_address values.

The shapes of the slices of a picture shall be such that each brick, when decoded, shall have its entire left boundary and entire top boundary consisting of a picture boundary or consisting of boundaries of previously decoded brick(s).

num_bricks_in_slice_minus1, when pre sent, specifies the number of bricks in the slice minus1. The value of num_bricks_in_slice_minus1 shall be in the range of 0 to NumBricksInPic−1, inclusive. When rect_slice_flag is equal to 0 and single_brick_per_slice_flag is equal to 1, the value of num_bricks_in_slice_minus1 is inferred to be equal to 0. When single_brick_per_slice_flag is equal to 1, the value of num_brick s_in_slice_minus1 is inferred to be equal to 0.

The variable NumBricksInCurrSlice, which specifies the number of bricks in the current slice, and SliceBrickIdx[i], which specifies the brick index of the i-th brick in the current slice, are derived a s follows:

```
if( rect_slice_flag) {
    sliceIdx = 0
    while( slice_address != slice_id[ sliceIdx ] )
        sliceIdx++
    NumBricksInCurrSlice = NumBricksInSlice[ sliceIdx ]
    brickIdx= TopLeftBrickIdx[ sliceIdx ]
    for( bIdx = 0; brickIdx <= BottomRightBrickIdx[ sliceIdx ]; brickIdx++ )   (7-92)
        if( BricksToSliceMap[ brickIdx ] = = sliceIdx )
            SliceBrickIdx[ bIdx++ ] = brickIdx
} else {
    NumBricksInCurrSlice = num_bricks_in_slice_minus1 + 1
    SliceBrickIdx[ 0 ]= slice_address
    for( i = 1; i < NumBricksInCurrSlice ; i++ )
        SliceBrickIdx[ i ] = SliceBrickIdx[ i − 1 ] + 1
}
```

The variables SubPicIdx, SubPicLeftBoundaryPos, SubPicTopBoundaryPos, SubPicRightBoundaryPos, and SubPicBotBoundaryPos are derived as follows:

```
SubPicIdx = CtbToSubPicIdx[ CtbAddrBsToRs[ FirstCtbAddrBs[ SliceBrickIdx[ 0 ] ] ] ]
if( subpic_treated_as_pic_flag[ SubPicIdx ] ) {
    SubPicLeftBoundaryPos = SubPicLeft[ SubPicIdx ] * ( subpic_grid_col_width_minus1 + 1 ) * 4
    SubPicRightBoundaryPos = ( SubPicLeft[ SubPicIdx ] + SubPicWidth[ SubPicIdx ] )*
        ( subpic_grid_col_width_minus1 + 1 ) * 4                                          (7-93)
    SubPicTopBoundaryPos = SubPicTop[ SubPicIdx ] * ( subpic_grid_row_height_minus1 + 1 )* 4
    SubPicBotBoundaryPos = ( SubPicTop[ SubPicIdx ] + SubPicHeight[ SubPicIdx ] )*
        ( subpic_grid_row_height_minus1 + 1 ) * 4
}
```

2.6 Example Syntax and Semantics

Sequence Parameter Set RBSP Syntax

| | Descriptor |
|---|---|
| seq_parameter_set_rbsp( ) { | |
|   sps_decoding_parameter_set_id | u(4) |
|   sps_video_parameter_set_id | u(4) |
|   sps_max_sub_layers_minus1 | u(3) |
|   sps_reserved_zero_5bits | u(5) |
|   profile_tier_level( sps_max_sub_layers_minus1 ) | |
|   gdr_enabled_flag | u(1) |
|   sps_seq_parameter_set_id | u(4) |
|   chroma_format_idc | u(2) |
|   if( chroma_format_idc = = 3) | |
|     separate_colour_plane_flag | u(1) |
|   ref_pic_resampling_enabled_flag | u(1) |

-continued

| | Descriptor |
|---|---|
| sps_seq_parameter_set_id | ue(v) |
| chroma_format_idc | ue(v) |
| if( chroma_format_idc = = 3) | |
| separate_colour_plane_flag | u(1) |
| pic_width_max_in_luma_samples | ue(v) |
| pic_height_max_in_luma_samples | ue(v) |
| sps_log2_ctu_size_minus5 | u(2) |
| <u>*subpics_present_flag*</u> | <u>*u(1)*</u> |
|   <u>*sps_num_subpics_minus1*</u> | <u>*u(8)*</u> |
|   <u>*for( i = 0; i <= sps_num_subpics_minus1; i++ ) {*</u> | |
|     <u>*subpic_ctu_top_left_x[ i ]*</u> | <u>*u(v)*</u> |
|     <u>*subpic_ctu_top_left_y[ i ]*</u> | <u>*u(v)*</u> |
|     <u>*subpic_width_minus1[ i ]*</u> | <u>*u(v)*</u> |
|     <u>*subpic_height_minus1[ i ]*</u> | <u>*u(v)*</u> |
|     <u>*subpic_treated_as_pic_flag[ i ]*</u> | <u>*u(1)*</u> |
|     <u>*loop_filter_across_subpic_enabled_flag[ i ]*</u> | <u>*u(1)*</u> |
|   <u>*}*</u> | |
| <u>*}*</u> | |
| <u>*sps_subpic_id_present_flag*</u> | <u>*u(1)*</u> |
| <u>*if(sps_subpics_id_present_flag ) {*</u> | |
|   <u>*sps_subpic_id_signalling_present_flag*</u> | <u>*u(1)*</u> |
|   <u>*if( sps_subpics_id_signalling_present_flag ) {*</u> | |
|     <u>*sps_subpic_id_len_minus1*</u> | <u>*ue(v)*</u> |
|     <u>*for( i = 0; i <= sps_num_subpics_minus1; i++)*</u> | |
|     <u>*sps_subpic_id[i]*</u> | <u>*u(v)*</u> |
|   <u>*}*</u> | |
| <u>*}*</u> | |
| bit_depth_minus8 | ue(v) |
| min_qp_prime_ts_minus4 | ue(v) |
| sps_weighted_pred_flag | u(1) |
| sps_weighted_bipred_flag | u(1) |
| log2_max_pic_order_cnt_lsb_minus4 | u(4) |
| if( sps_max_sub_layers_minus 1 >0 ) | |
|   sps_sub_layer_ordering_info_present_flag | u(1) |
| for( i = ( sps_sub_layer_ordering_info_present_flag ? 0 : sps_max_sub_layers_minus1 ); | |
|     i <= sps_max_sub_layers_minus1; i++ ) { | |
|   sps_max_dec_pic_buffering_minus1[ i ] | ue(v) |
|   sps_max_num_reorder_pics[ i ] | ue(v) |
|   sps_max_latency_increase_plus1[ i ] | ue(v) |
| } | |
| long_term_ref_pics_flag | u(1) |
| inter_layer_ref_pics_present_flag | u(1) |
| sps_idr_rpl_present_flag | u(1) |
| rpl1_same_as_rpl0_flag | u(1) |
| for( i = 0; i < !rpl1_same_as_rpl0_flag ? 2 : 1; i++ ) { | |
|   num_ref_pic_lists_in_sps[ i ] | ue(v) |
|     for( j = 0; j < num_ref_pic_lists_in_sps[ i ]; j++ ) | |
|       ref_pic_list_struct( i,j ) | |
| } | |
| if( ChromaArrayType != 0 ) | |
|   qtbtt_dual_tree_intra_flag | u(1) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
|   sps_log2_diff_max_bt_min_qt_intra_slice_luma | ue(v) |
|   sps_log2_diff_max_tt_min_qt_intra_slice_luma | ue(v) |
| } | |
| if( sps_max_mtt_hierarchy_depth_inter_slice != 0 ) { | |
|   sps_log2_diff_max_bt_min_qt_inter_slice | ue(v) |
|   sps_log2_diff_max_tt_min_qt_inter_slice | ue(v) |
| } | |
| if( qtbtt_dual_tree_intra_flag) { | |
|   sps_log2_diff_min_qt_min_cb_intra slice_chroma | ue(v) |
|   sps_max_mtt_hierarchy_depth_intra_slice_chroma | ue(v) |
|   if( sps_max_mtt_hierarchy_depth_intra_slice_chroma != 0 ) { | |

|  | Descriptor |
|---|---|
|       sps_log2_diff_max_bt_min_qt_intra_slice_chroma | ue(v) |
|       sps_log2_diff_max_tt_min_qt_intra_slice_chroma | ue(v) |
|     } | |
| } | |
| sps_max_luma_transform_size_64_flag | u(1) |
| sps_joint_cbcr_enabled_flag | u(1) |
| if( ChromaArrayType != 0 ) { | |
|   same_qp_table_for_chroma | u(1) |
|   numQp Tables = same_qp_table_for_chroma ? 1 : ( sps_joint_cbcr_enabled_flag ? 3 : 2) | |
|   for( i = 0; i < numQpTables; i++ ) { | |
|     qp_table_start_minus26[ i ] | se(v) |
|     num_points_in_qp_table_minus1[ i ] | ue(v) |
|     for(j = 0;j <= num_points_in_qp_table_minus1[ i ]; j++ ) { | |
|       delta_qp_in_val_minus1[ i ][ j ] | ue(v) |
|       delta_qp_diff_val[ i ][ j ] | ue(v) |
|     } | |
|   } | |
| } | |
| sps_sao_enabled_flag | u(1) |
| sps_alf_enabled_flag | u(1) |
| sps_transform_skip_enabled_flag | u(1) |
| if( sps_transform_skip_enabled_flag ) | |
|   sps_bdpcm_enabled_flag | u(1) |
| if( sps_bdpcm_enabled_flag && chroma_format_idc = = 3 ) | |
|   sps_bdpcm_chroma_enabled_flag | u(1) |
| sps_ref_wraparound_enabled_flag | u(1) |
| if( sps_ref_wraparound_enabled_flag) | |
|   sps_ref_wraparound_offset_minus1 | ue(v) |
| sps_temporal_mvp_enabled_flag | u(1) |
| if( sps_temporal_mvp_enabled_flag) | |
|   sps_sbtmvp_enabled_flag | u(1) |
| sps_amvr_enabled_flag | u(1) |
| sps_bdof_enabled_flag | u(1) |
| if( sps_bdof_enabled_flag) | |
|   sps_bdof_pic_present_flag | u(1) |
| sps_smvd_enabled_flag | u(1) |
| sps_dmvr_enabled_flag | u(1) |
| if( sps_dmvr_enabled_flag) | |
|   sps_dmvr_pic_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| if( ChromaArrayType != 0) | |
|   sps_cclm_enabled_flag | u(1) |
|   if( sps_cclm_enabled_flag && chroma_format_idc = = 1) | |
|     sps_cclm_colocated_chroma_flag | u(1) |
| sps_mts_enabled_flag | u(1) |
| if( sps_mts_enabled_flag) { | |
|   sps_explicit_mts_intra_enabled_flag | u(1) |
|   sps_explicit_mts_inter_enabled_flag | u(1) |
| } | |
| sps_sbt_enabled_flag | u(1) |
| sps_affine_enabled_flag | u(1) |
| if( sps_affine_enabled_flag) { | |
|   sps_affine_type_flag | u(1) |
|   sps_affine_amvr_enabled_flag | u(1) |
|   sps_affine_prof_enabled_flag | u(1) |
|   if( sps_affine_prof_enabled_flag ) | |
|     sps_prof_pic_present_flag | u(1) |
| } | |
| if( chroma_format_idc = = 3 ) { | |
|   sps_palette_enabled_flag | u(1) |
|   sps_act_enabled_flag | u(1) |
| } | |
| sps_bcw_enabled_flag | u(1) |
| sps_ibc_enabled_flag | u(1) |
| sps_ciip_enabled_flag | u(1) |
| if( sps_mmvd_enabled_flag ) | |
|   sps_fpel_mmvd_enabled_flag | u(1) |
| sps_triangle_enabled_flag | u(1) |

| | Descriptor |
|---|---|
| sps_lmcs_enabled_flag | u(1) |
| sps_lfnst_enabled_flag | u(1) |
| sps_ladf_enabled_flag | u(1) |
| if( sps_ladf_enabled_flag ) { | |
|   sps_num_ladf_intervals_minus2 | u(2) |
|   sps_ladf_lowest_interval_qp_offset | se (v) |
|   for( i = 0; i < sps_num_ladf_intervals_minus2 + 1; i++ ) { | |
|     sps_ladf_qp_offset[ i ] | se (v) |
|     sps_ladf_delta_threshold_minus1[ i ] | ue (v) |
|   } | |
| } | |
| sps_scaling_list_enabled_flag | u(1) |
| sps_loop_filter_across_virtual_boundaries_disabled_present_flag | u(1) |
| if( sps_loop_filter_across_virtual_boundaries_disabled_present_flag ) { | |
|   sps_num_ver_virtual_boundaries | u(2) |
|   for( i = 0; i < sps_num_ver_virtual_boundaries; i++ ) | |
|     sps_virtual_boundaries_pos_x[ i ] | u(13) |
|   sps_num_hor_virtual_boundaries | u(2) |
|   for( i =0; i <sps_num_hor_virtual_boundaries; i++ ) | |
|     sps_virtual_boundaries_pos_y[ i ] | u(13) |
| } | |
| general_hrd_parameters_present_flag | u(1) |
| if( general_hrd_parmmeters_present_flag) { | |
|   num_units_in_tick | u (32) |
|   time_scale | u(32) |
|   sub_layer_cpb_parameters_present_flag | u(1) |
|   if( sub_layer_cpb_parameters_present_flag ) | |
|     general_hrd_parameters( 0, sps_max_sub_layers_minus1 ) | |
|   else | |
|     general_hrd_parameters( sps_max_sub_layers_minus1, sps_max_sub_layers_minus1 ) | |
| } | |
| vui_parameters_present_flag | u(1) |
| if( vui_parameters_present_flag ) | |
|   vui_parameters( ) | |
| sps_extension_flag | u(1) |
| if( sps_extension_flag) | |
|   while( more_rbsp_data( ) ) | |
|     sps_extension_data_flag | u(1) |
| rbsp_trailing_bits( ) | |
| } | |

Picture Parameter Set RBSP Syntax

| | Descriptor |
|---|---|
| pic_parameter_set_rbsp( ) { | |
|   pps_pic_parameter_set_id | ue(v) |
|   pps_seq_parameter_set_id | u(4) |
|   pps_seq_parameter_set_id | ue(v) |
|   pic_width_in_luma_samples | ue(v) |
|   pic_height_in_luma_samples | ue(v) |
|   conformance_window_flag | u(1) |
|   if( conformance_window_flag) { | |
|     conf_win_left_offset | ue(v) |
|     conf_win_right_ offset | ue(v) |
|     conf_win_top_offset | ue(v) |
|     conf_win_bottom_offset | ue(v) |
|   } | |
|   scaling_window_flag | u(1) |
|   if( scaling_window_flag) { | |
|     scaling_win_left_offset | ue(v) |
|     scaling_win_right_offset | ue(v) |
|     scaling_win_top_offset | ue(v) |
|     scaling_win_bottom_offset | ue(v) |
|   } | |
|   output_flag_present_flag | u(1) |
|   mixed_nalu_types_in_pic_flag | u(1) |
|   *pps_subpic_id_signalling_present_flag* | *u(1)* |
|   *if(pps_subpics_id_signalling_present_flag){* | |
|     *pps_num_subpics_minus1* | *ue(v)* |
|     *pps_subpic_id_len_minus1* | *ue(v)* |
|     *for(i = 0; i <= pps_num_subpic_minus1;i++)* | |

|  | Descriptor |
|---|---|
| _pps_subpic_id[i]_ | _u(v)_ |
| _**}**_ | |
| no_pic_partition_flag | u(1) |
| if( !no_pic_partition_flag) { | |
|   pps_log2_ctu_size_minus5 | u(2) |
|   num_exp_tile_columns_minus1 | ue(v) |
|   num_exp_tile_rows_minus1 | ue(v) |
|   for( i = 0; i <= num _exp_tile_columns_minus1; i++ ) | |
|     tile_column_width_minus1[ i ] | ue(v) |
|   for( i = 0; i <= num _exp_tile_rows_minus1; i++ ) | |
|     tile_row_height_minus1[ i ] | ue(v) |
|   rect_slice_flag | u(1) |
|   if( rect_slice_flag) | |
|     single_slice_per_subpic_flag | u(1) |
|   if( rect_slice_flag && !single_slice_per_subpic_flag) { | |
|     num_slices_in_pic_minus1 | ue(v) |
|     tile_idx_delta_present_flag | u(1) |
|     for( i = 0; i < num_slices_in_pic_minus1; i++ ) { | |
|       slice_width_in_tiles_minus1[ i ] | ue(v) |
|       slice_height_in_tiles_minus1[ i ] | ue(v) |
|       if( slice_width_in_tiles_minus1[ i ] = = 0 && | |
|         slice_height_in_files_minus1[ i ] = = 0 ) { | |
|         num_ slices_in_tile_minus1[ i ] | ue(v) |
|         num SlicesInTileMinus1 = num_slices_in_tile_minus1[ i ] | |
|         for( j = 0;j < num SlicesInTileMinus1; j++ ) | |
|           slice_height_in_ctu_minus1[ i++ ] | ue(v) |
|       } | |
|       if( tile_idx_delta_present_flag && i < num_slices_in_pic_minus1 ) | |
|         tile_idx_delta[ i ] | se (v) |
|     } | |
|   } | |
|   loop_filter_across_tiles_enabled_flag | u(1) |
|   loop_filter_across_slices_enabled_flag | u(1) |
| } | |
| entropy_coding_sync_enabled_flag | u(1) |
| if( !no_pic_partition_flag || entropy_coding_sync_enabled_flag) | |
|   entry_point_offsets_present_flag | u(1) |
| cabac_init_present_flag | u(1) |
| for( i = 0; i < 2; i ++ ) | |
|   num_ref_idx_default_active_minus1 + ii | ue(v) |
| rpl1_idx_present_flag | u(1) |
| init_qp_minus26 | se(v) |
| _if(sps_transform_skip_enabled_flag)_ | |
| _log2_transform_skip_max_size_minus2_ | _ue(v)_ |
| cu_qp_delta_enabled_flag | u(1) |
| pps_cb_qp_offset | se(v) |
| pps_cr_qp_offset | se(v) |
| pps_joint_cbcr_qp_offset_present_flag | u(1) |
| if( pps_joint_cbcr_qp_offset_present_flag ) | |
|   pps_joint_cbcr_qp_offset_value | se(v) |
| pps_ slice_chroma_qp_offsets_present_flag | u(1) |
| cu_chroma_qp_offset_enabled_flag | u(1) |
| if( cu_chroma_qp_offset_enabled_flag) { | |
|   chroma_qp_offset_list_len_minus1 | ue(v) |
|   for( i = 0; i <= chroma_qp _offset_list_len_minus1; i++ ) { | |
|     cb_qp_offset_list[ i ] | se(v) |
|     cr_qp_offset_list[ i ] | se(v) |
|     if( pps_joint_cbcr_qp_offset_present_flag ) | |
|       joint_cbcr_qp_offset_list[ i ] | se(v) |
|   } | |
| } | |
| pps_weighted_pred_flag | u(1) |
| pps_weighted_bipred_flag | u(1) |
| deblocking_filter_control_present_flag | u(1) |
| if( deblocking_filter_control_present_flag) { | |
|   deblocking_filter_override_enabled_flag | u(1) |
|   pps_deblocking_filter_disabled_flag | u(1) |
|   if( !pps_deblocking_filter_disabled_flag) { | |
|     pps_beta_offset_div2 | se(v) |
|     pps_tc_offset_div2 | se(v) |
|   } | |
| } | |
| constant_slice_header_params_enabled_flag | u(1) |
| if( constant_slice_header_params_enabled_flag) { | |
|   pps_dep_quant_enabled_idc | u(2) |
|   for( i = 0; i < 2; i++ ) | |

|  | Descriptor |
|---|---|
|     pps_ref_pic_list_sps_idc[ i ] | u(2) |
|     pps_mvd_l1_zero_idc | u(2) |
|     pps_collocated_from_l0_idc | u(2) |
|     pps_six_minus_max_num_merge_cand_plus1 | ue(v) |
|     pps_max_num_merge_cand_minus_max_num_triangle_cand_plus1 | ue(v) |
| } | |
| picture_header_extension_present_flag | u(1) |
| slice_header_extension_present_flag | u(1) |
| pps_extension_flag | u(1) |
| if( pps_extension_flag) | |
|     while( more_rbsp_data( )) | |
|         pps_extension_data_flag | u(1) |
| rbsp_trailing_bits( ) | |
| } | |

Picture Header RBSP Syntax

|  | Descriptor |
|---|---|
| picture_header_rbsp( ) { | |
|   non_reference_picture_flag | u(1) |
|   gdr_pic_flag | u(1) |
|   no_output_of_prior_pics_flag | u(1) |
|   if( gdr_pic_flag) | |
|     recovery_poc_cnt | ue(v) |
|   ph_pic_parameter_set_id | ue(v) |
|   *if(sps_subpic_id_present_flag &&!sps_subpic_id_signalling_flag){* | |
|     *ph_subpic_id_signalling_present_flag* | *u(1)* |
|     *if(ph_subpics_id_signalling_present_flag){* | |
|       *ph_subpic_id_len_minus1* | *ue(v)* |
|       *for(i = 0; i <= sps_num_subpics_minus1;i++)* | |
|         *ph_subpic_id[i]* | *u(v)* |
|     *}* | |
|   *}* | |
|   if( !sps_loop_filter_across_virtual_boundaries_disabled_present_flag) { | |
|     ph_loop_filter_across_virtual_boundaries_disabled_present_flag | u(1) |
|     if( ph_loop_filter_across_virtual_boundaries_disabled_present_flag) { | |
|       ph_num_ver_virtual_boundaries | u(2) |
|       for( i = 0; i < ph_num_ver_virtual_boundaries; i++ ) | |
|         ph_virtual_boundaries_pos_x[ i ] | u(13) |
|       ph_num_hor_virtual_boundaries | u(2) |
|       for( i = 0; i < ph_num_hor_virtual_boundaries; i++ ) | |
|         ph_virtual_boundaries_pos_y[ i ] | u(13) |
|     } | |
|   } | |
|   if( separate_colour_plane_flag = = 1 ) | |
|     colour_plane_id | u(2) |
|   if( output_flag_present_flag) | |
|     pic_output_flag | u(1) |
|   pic_rpl_present_flag | u(1) |
|   if( pic_rpl_present_flag) { | |
|     for( i = 0; i < 2; i++ ) { | |
|       if( num_ref_pic_lists_in_sps[ i ] > 0 && !pps_ref_pic_list_sps_idc[ i ] && | |
|         ( i = = 0 || ( i = = 1 && rpl1_idx_present_flag) ) ) | |
|         pic_rpl_sps_flag[ i ] | u(1) |
|       if( pic_rpl_sps_flag[ i ] ) { | |
|         if( num _ref_pic_lists_in_sps[ i ] > 1 && | |
|           ( i = = 0 || ( i = = 1 && rpl1_idx_present_flag) ) ) | |
|           pic_rpl_idx[ i ] | u(v) |
|       } else | |
|         ref_pic_list_struct(i, num _ref_pic_lists_in_sps[ i ] ) | |
|       for(j = 0; j < NumLtrpEntries[ i ][ RplsIdx[ i ] ]; j++ ) { | |
|         if( ltrp_in_slice_header_flag[ i ][ RplsIdx[ i ] ] ) | |
|           pic_poc_lsb_lt[ i ][ j ] | u(v) |
|         pic_delta_poc_msb_present_flag[ i ][ j ] | u(1) |
|         if( pic_delta_poc_msb_present_flag[ i ][ j ] ) | |

-continued

| | Descriptor |
|---|---|
|           pic_delta_poc_msb_cycle_lt[ i ][ i ] | ue(v) |
|         } | |
|       } | |
|   } | |
| if( partition_constraints_override_enabled_flag ) { | |
|   partition_constraints_override_flag | ue(v) |
|   if( partition_constraints_override_flag) { | |
|     pic_log2_diff_min_qt_min_cb_intra_slice_luma | ue(v) |
|     pic_log2_diff_min_qt_min_cb_inter_slice | ue(v) |
|     pic_max_mtt_hierarchy_depth_inter_slice | ue(v) |
|     pic_max_mtt_hierarchy_depth_intra_slice_luma | ue(v) |
|     if( pic_max_mtt_hierarchy_depth_intra_slice_luma != 0 ) { | |
|       pic_log2_diff_max_bt_min_qt_intra_slice_luma | ue(v) |
|       pic_log2_diff_max_tt_min_qt_intra_slice_luma | ue(v) |
|     } | |
|     if( pic_max_mtt_hierarchy_depth_inter_slice != 0 ) { | |
|       pic_log2_diff_max_bt_min_qt_inter_slice | ue(v) |
|       pic_log2_diff_max_tt_min_qt_inter_slice | ue(v) |
|     } | |
|     if( qtbtt_dual_tree_intra_flag) { | |
|       pic_log2_diff_min_qt_min_cb_intra_slice_chroma | ue(v) |
|       pic_max_mtt_hierarchy_depth_intra_slice_chroma | ue(v) |
|       if( pic_max_mtt_hierarchy_depth_intra_slice_chroma != 0 ) { | |
|         pic_log2_diff_max_bt_min_qt_intra_slice_chroma | ue(v) |
|         pic_log2_diff_max_tt_min_qt_intra_slice_chroma | ue(v) |
|       } | |
|     } | |
|   } | |
| } | |
| if( cu_qp_delta_enabled_flag) { | |
|   pic_cu_qp_delta_subdiv_intra_slice | ue(v) |
|   pic_cu_qp_delta_subdiv_inter_slice | ue(v) |
| } | |
| if( cu_chroma_qp_offset_enabled_flag) { | |
|   pic_cu_chroma_qp_offset_subdiv_intra_slice | ue(v) |
|   pic_cu_chroma_qp_offset_subdiv_inter_slice | ue(v) |
| } | |
| if( sps_temporal_mvp_enabled_flag) | |
|   pic_temporal_mvp_enabled_flag | u(1) |
| if(!pps_mvd_l1_zero_idc) | |
|   mvd_l1_zero_flag | u(1) |
| if( !pps_six_minus_max_num_merge_cand_plus1 ) | |
|   pic_six_minus_max_num_merge_cand | ue(v) |
| if( sps_affine_enabled_flag) | |
|   pic_five_minus_max_num_subblock_merge_cand | ue(v) |
| if( sps_fpel_mmvd_enabled_flag) | |
|   pic_fpel_mmvd_enabled_flag | u(1) |
| if( sps_bdof_pic_present_flag) | |
|   pic_disable_bdof_flag | u(1) |
| if( sps_dmvr_pic_present_flag) | |
|   pic_disable_dmvr_flag | u(1) |
| if( sps_prof_pic_present_flag) | |
|   pic_disable_prof_flag | u(1) |
| if( sps_triangle_enabled_flag&& MaxNumMergeCand >= 2 && | |
|     !pps_max_num_merge_cand_minus_max_num_triangle_cand_minus1 ) | |
|   pic_max_num_merge_cand_minus_max_num_triangle_cand | ue(v) |
| if ( sps_ibc_enabled_flag) | |
|   pic_six_minus_max_num_ibc_merge_cand | ue(v) |
| if( sps_joint_cbcr_enabled_flag) | |
|   pic_joint_cbcr_sign_flag | u(1) |
| if( sps_sao_enabled_flag) { | |
|   pic_sao_enabled_present_flag | u(1) |
|   if( pic_sao_enabled_present_flag) { | |
|     pic_sao_luma_enabled_flag | u(1) |
|     if(ChromaArrayType != 0 ) | |
|       pic_sao_chroma_enabled_flag | u(1) |
|   } | |
| } | |
| if( sps_alf_enabled_flag) { | |
|   pic_alf_enabled_present_flag | u(1) |
|   if( pic_alf_enabled_present_flag) { | |
|     pic_alf_enabled_flag | u(1) |
|     if( pic_alf_enabled_flag) { | |
|       pic_num_alf_aps_ids_luma | u(3) |
|       for( i = 0; i < pic_num_alf_aps_ids_luma; i++ ) | |
|         pic_alf_aps_id_luma[ i ] | u(3) |
|       if( ChromaArrayType != 0 ) | |

| | Descriptor |
|---|---|
|       pic_alf_chroma_idc | u(2) |
|       if( pic_alf_chroma_idc ) | |
|         pic_alf_aps_id_chroma | u(3) |
|       } | |
|     } | |
|   } | |
| } | |
| if ( !pps_dep_quant_enabled_flag) | |
|   pic_dep_quant_enabled_flag | u(1) |
| if( !pic_dep_quant_enabled_flag) | |
|   sign_data_hiding_enabled_flag | u(1) |
| if( deblocking_filter_override_enabled_flag) { | |
|   pic_deblocking_filter_override_present_flag | u(1) |
|   if( pic_deblocking_filter_override_present_flag) { | |
|     pic_deblocking_filter_override_flag | u(1) |
|     if( pic_deblocking_filter_override_flag) { | |
|       pic_deblocking_filter_disabled_flag | u(1) |
|       if( !pic_deblocking_filter_disabled_flag) { | |
|         pic_beta_offset_div2 | se (v) |
|         pic_tc_offset_div2 | se (v) |
|       } | |
|     } | |
|   } | |
| } | |
| if( sps_lmcs_enabled_flag) { | |
|   pic_lmcs_enabled_flag | u(1) |
|   if( pic_lmcs_enabled_flag) { | |
|     pic_lmcs_aps_id | u(2) |
|     if( ChromaArrayType != 0 ) | |
|       pic_chroma_residual_scale_flag | u(1) |
|   } | |
| } | |
| if( sps_scaling_list_enabled_flag) { | |
|   pic_scaling_list_present_flag | u(1) |
|   if( pic_scaling_list_present_flag) | |
|     pic_scaling_list_aps_id | u(3) |
| } | |
| if( picture_header_extension_present_flag ) { | |
|   ph_extension_length | ue (v) |
|   for( i = 0; i < ph_extension_length; i++ ) | |
|     ph_extension_data_byte[ i ] | u(8) |
| } | |
| rb sp_trailing_bits( ) | |
| } | | subpics_present_flag equal to 1 indicates that subpicture parameters are present in the present in the SPS RB SP syntax. subpics_present_flag equal to 0 indicates that subpicture parameters are not present in the present in the SPS RB SP syntax.

NOTE 2—When a bitstream is the result of a sub-bitstream extraction process and contains only a subset of the subpictures of the input bitstream to the sub-bitstream extraction process, it might be required to set the value of subpics_present_flag equal to 1 in the RB SP of the SPSs.

sps_num_subpics_minus1 plus 1 specifies the number of subpictures. sps_num_subpics_minus1 shall be in the range of 0 to 254. When not present, the value of sps_num_subpics_minus1 is inferred to be equal to 0.

subpic_ctu_top_left_x[i] specifies horizontal position of top left CTU of i-th subpicture in unit of CtbSizeY. The length of the syntax element is *Ceil(Log2(pic_width_max_in_luma_samples/CtbSizeY) )* bits. When not present, the value of subpic_ctu_top_leftx[i] is inferred to be equal to 0.

subpic_ctu_top_left_y[i] specifies vertical position of top left CTU of i-th subpicture in unit of CtbSizeY. The length of the syntax element is *Ceil(Log2(pic_height_max_in_luma_samples/CtbSizeY) )* bits. When not present, the value of subpic_ctutop_left_y[i] is inferred to be equal to 0.

subpic_width_minus1[i] plus 1 specifies the width of the i-th subpicture in units of CtbSizeY. The length of the syntax element is Ceil(Log 2(pic_width_max_in_luma_samples/CtbSizeY)) bits. When not present, the value of subpic_width_minus1[i] is inferred to be equal to *Ceil(pic_width_max_in_luma_samples/CtbSizeY)* −1.

subpic_height_minus1[i] plus 1 specifies the height of the i-th subpicture in units of CtbSizeY. The length of the syntax element is Ceil(Log 2(pic_height_max_in_luma_samples/CtbSizeY)) bits. When not present, the value of subpic_height_minus1[i] is inferred to be equal to *Ceil( pic_height_max_in_luma_samples/CtbSizeY)* −1.

subpic_treated_as_pic_flag[ ] equal to 1 specifies that the i-th subpicture of each coded picture in the CVS is treated as a picture in the decoding process excluding in-loop filtering operations. subpic_treated_as_pic_flag[i] equal to 0 specifies that the i-th subpicture of each coded picture in the CVS is not treated as a picture in the decoding process excluding in-loop filtering operations. Whennot present, the value of subpic_treated_as_pic_flag[i] is inferred to be equal to 0.

loop_filter_across_subpic_enabled_flag[i] equal to 1 specifies that in-loop filtering operations may be performed across the boundaries of the i-th subpicture in each coded picture in the CVS. loop_filter_across_subpic_enabled_flag[i] equal to 0 specifies that in-loop filtering operations are not performed across the boundaries of the i-th subpicture in each coded picture in the CVS. When not present, the value of loop_filter_across_subpic_enabled_pic_flag[i] is inferred to be equal to 1.

It is a requirement of bitstream conformance that the following constraints apply:

For any two subpictures subpicA and subpicB, when the index of subpicA is less than the index of subpicB, any coded NAL unit of subPicA shall succeed any coded NAL unit of subPicB in decoding order.

The shapes of the subpictures shall be such that each subpicture, when decoded, shall have its entire left boundary and entire top boundary consisting of picture boundaries or consisting of boundaries of previously decoded subpictures.

sps_subpic_id_present_flag equal to 1 specifies that subpicture Id mapping is present in the SPS.

sps_subpic_id_present_flag equal to 0 specifies that subpicture Id mapping is not present in the SPS.

sps_subpic_id_signalling_present_flag equal to 1 specifies that subpicture Id mapping is signalled in the SPS.

sps_subpic_id_signalling_present_flag equal to 0 specifies that subpicture Id mapping is not signalled in the SPS.

When not present, the value of sps_subpic_id_signalling_present_flag is inferred to be equal to 0.

sps_subpic_id_len_minus1 plus 1 specifies the number of bits used to represent the syntax element sps_subpic_id[i]. The value of sps_subpic_id_len_minus1 shall be in the range of 0 to 15, inclusive.

sps_subpic_id[i] specifies that subpicture Id of the i-th subpicture. The length of the sps_subpic_id[i] syntax element is sps_subpic_id_len_minus1+1 bits. When not present, and when sps_subpic_id_present_flag equal to 0, the value of sps_subpic_id[i] is inferred to be equal to i, for each i in the range of 0 to sps_num_subpics_minus1, inclusive ph_pic_parameter_set_id specifies the value of pps_pic_parameter_set_id for the PPS in use. The value of ph_pic_parameter_set_id shall be in the range of 0 to 63, inclusive.

It is a requirement of bitstream conformance that the value of TemporalId of the picture header shall be greater than or equal to the value of TemporalId of the PPS that has pps_pic_parameter_set_id equal to ph_pic_parameter_set_id.

ph_subpic_id_signalling_present_flag equal to 1 specifies that subpicture Id mapping is signalled in the picture header. ph_subpic_id_signalling_present_flag equal to 0 specifies that subpicture Id mapping is not signalled in the picture header.

ph_subpic_id_len_minus1 plus 1 specifies the number of bits used to represent the syntax element ph_subpic_id[i]. The value of pic_subpic_id_len_minus1 shall be in the range of 0 to 15, inclusive.

It is a requirement of bitstream conformance that the value of ph_subpic_id_len_minus1 shall be the same for all picture headers that a rereferred to by coded picture s in a CVS.

ph_subpic_id[i] specifies that subpicture Id of the i-th subpicture. The length of the ph_subpic_id[i] syntax element is ph_subpic_id_len_minus1+1 bits.

The list SubpicIdList[i] is derived as follows:

for (i=0;i<=sps_num_subpics_minus1;i++)

SubpicIdList[i]=sps_subpic_id_present_flag? (7-39)

(sps_subpic_id_signalling_present_flag?sps_subpic_id[i]:

(ph_subpic_id_signalling_present_flag?ph_subpic_id[i]:pps_subpic_id[i])):i

Deblocking Filter Process

General

Inputs to this process are the reconstructed picture prior to deblocking, i.e., the array recPicture$_L$ and, when ChromaArrayType is not equal to 0, the arrays recPicture$_{Cb}$ and recPicture$_{Cr}$.

Outputs of this process are the modified reconstructed picture after deblocking, i.e., the array recPicture$_L$ and, when ChromaArrayType is not equal to 0, the arrays recPicture$_{Cb}$ and recPicture$_{Cr}$.

The vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

NOTE Although the filtering process is specified on a picture basis in this Specification, the filtering process can be implemented on a coding unit basis with an equivalent result, provided the decoder properly accounts for the processing dependency order so as to produce the same output values.

The deblocking filter process is applied to all coding subblock edges and transform block edges of a picture, except the following types of edges:

Edges that are at the boundary of the picture,

Edges that coincide with the boundaries of a subpicture for which - *Edges that coincide with the boundaries of a subpicture for which loop_filter_across_subpic_enables_flag[ SubPicIdx ] is equal to 0,*

Edges that coincide with the virtual boundaries of the picture when pps_loop_filter_across_virtual_boundaries_disabled_flag is equal to 1, Edges that coincide with tile boundaries when loop_filter_across_tiles_enabled_flag is equal to 0, Edges that coincide with slice boundaries when loop_filter_across_slices_enabled_flag is equal to 0, Edges that coincide with upper or left boundaries of slices with slice_deblocking_filter_disabled_flag equal to 1, Edges within slices with slice_deblocking_filter_disabled_flag equal to 1, Edges that do not correspond to 4×4 sample grid boundaries of the luma component, Edges that do not correspond to 8×8 sample grid boundaries of the chroma component, Edges within the luma component for which both sides of the edge have intra_bdpcm_luma_flag equal to 1, Edges within the chroma components for which both sides of the edge have intra_bdpcm_chroma_flag equal to 1, Edges of chroma subblocks that are not edges of the associated transform unit.

. . .

Deblocking Filter Process for One Direction

Inputs to this process are:
the variable tree Type specifying whether the luma (DUAL_TREE_LUMA) or chroma components (DUAL_TREE_CHROMA) are currently processed,
when tree Type is equal to DUAL_TREE_LUMA, the reconstructed picture prior to deblocking, i.e., the array recPicture$_L$,
when ChromaArray Type is not equal to 0 and tree Type is equal to DUAL_TREE_CHROMA, the arrays recPicture$_{Cb}$ and recPicture$_{Cr}$,
a variable edge Type specifying whether a vertical (EDGE_VER) or a horizontal (EDGE_HOR) edge is filtered.

Outputs of this process are the modified reconstructed picture after deblocking, i.e:
when tree Type is equal to DUAL_TREE_LUMA, the array recPicture$_L$,
when ChromaArray Type is not equal to 0 and tree Type is equal to DUAL_TREE_CHROMA, the arrays recPicture$_{Cb}$ and recPicture$_{Cr}$.

The variables firstCompIdx and lastCompIdx are derived as follows:

firstCompIdx=
 (treeType==DUAL_TREE_CHROMA)?1:0         (8-1010)

lastCompIdx=
 (treeType==DUAL_TREE_LUMA||ChromaArmy
 Type==0)?0:2          (8-1011)

For each coding unit and each coding block per colour component of a coding unit indicated by the colour component index cIdx ranging from firstCompIdx to lastCompIdx, inclusive, with coding block width nCbW, coding block height nCbH and location of top-left sample of the coding block (xCb, yCb), when cIdx is equal to 0, or when cIdx is not equal to 0 and edgeType is equal to EDGE_VER and xCb % 8 is equal 0, or when cIdx is not equal to 0 and edge Type is equal to EDGE_HOR and yCb % 8 is equal to 0, the edges are filtered by the following ordered steps:
1. The variable filter Edge Flag is derived as follows:
 If edge Type is equal to EDGE_VER and one or more of the following conditions are true, filter Edge Flag is set equal to 0:
  The left boundary of the current coding block is the left boundary of the picture.
  - *The left boundary of the current coding block is the left or right boundary of the subpicture and loop_filter_across_subpic_enabled_flag[ SubPicIdx ] is equal to 0.*
  The left boundary of the current coding block is the left boundary of the tile and loop_filter_across_tiles_enabled_flag is equal to 0.
  The left boundary of the current coding block is the left boundary of the slice and loop_filter_across_slices_enabled_flag is equal to 0.
  The left boundary of the current coding block is one of the vertical virtual boundaries of the picture and VirtualBoundariesDisabledFlag is equal to 1.
 Otherwise, if edge Type is equal to EDGE_HOR and one or more of the following conditions are true, the variable filterEdgeFlag is set equal to 0:
  The top boundary of the current luma coding block is the top boundary of the picture.
  - *The top boundary of the current coding block is the top or bottom boundary of the subpicture and loop_filter_across_subpic_enabled_flag[ SubPicIdx ] is equal to 0.*
  The top boundary of the current coding block is the top boundary of the tile and loop_filter_across_tiles_enabled_flag is equal to 0.
  The top boundary of the current coding block is the top boundary of the slice and loop_filter_across_slices_enabled_flag is equal to 0.
  The top boundary of the current coding block is one of the horizontal virtual boundaries of the picture and VirtualBoundariesDisabledFlag is equal to 1.
 Otherwise, filter EdgeFlag is set equal to 1.

2.7 Example TPM, HMVP and GEO

TPM (triangular Prediction Mode) in VVC divides a block into two triangles with different motion information.

HMVP (History-based Motion vector Prediction) in VVC maintains a table of motion information to be used for motion vector prediction. The table is updated after decoding an inter-coded block, but it is not updated if the inter-coded block is TPM-coded.

GEO (geometry partition mode) is an extension of TPM. With GEO, a block can be divided by a straight-line into two partitions, which may be or may not be triangles.

2.8 ALF, CC-ALF and Virtual Boundary

ALF (Adaptive Loop-Filter) in VVC is applied after a picture has been decoded, to enhance the picture quality.

Virtual Boundary (VB) is adopted in VVC to make ALF friendly to hardware design. With VB, ALF is conducted in an ALF processing unit bounded by two ALF virtual boundaries.

CC-ALF (cross-component ALF) as filters the chroma samples by referring to the information of luma samples.

3. Examples of Technical Problems Solved by Disclosed Embodiments (1) There are some designs that can violate the sub-picture constrain.
 A. TMVP in the affine constructed candidates may fetch a MV in the collocated picture out of the range of the current sub-picture.
 B. When deriving gradients in Bi-Directional Optical Flow (BDOF) and Prediction Refinement Optical Flow (PROF), two extended rows and two extended columns of integer reference samples are required to be fetched. These reference samples may be out of the range of the current sub-picture.
 C. When deriving the chroma residual scaling factor in luma mapping chroma scaling (LMCS), the accessed reconstructed luma samples may be out of the range of the range of the current sub-picture.
 D. The neighboring block may be out of the range of the current sub-picture, when deriving the luma intra prediction mode, reference samples for intra prediction, reference samples for CCLM, neighboring block availability for spatial neighboring candidates for merge/AMVP/CIIP/IBC/LMCS, quantization parameters, CABAC initialization process, ctxInc derivation using left and above syntax elements, and ctxIncfor the syntax element mtt_split_cu_vertical_flag. The representation of sub-picture may lead to sub-picture with incomplete CTUs. The CTU partitions and CU splitting process may need to consider incomplete CTUs.

(2) The signaled syntax elements related to sub-picture may be arbitrarily large, which may cause an overflow problem.

(3) The representation of sub-pictures may lead to non-rectangular sub-pictures.

(4) Currently the sub-picture and sub-picture grid is defined in units of 4 samples. And the length of syntax element is dependent on the picture height divided by 4. However, since the current pic_width_in_luma_samples and pic_height_in_luma_samples shall be an integer multiple of Max(8, MinCbSizeY), the sub-picture grid may need to be defined in units of 8 samples.

(5) The SPS syntax, pic_width_max_in_luma samples and pic_height_max_in_luma_samples may need to be restricted to be no smaller than 8.

(6) Interaction between reference picture resampling/scalability and sub-picture is not considered in the current design.

(7) In temporal filtering, samples across different sub-pictures may be required.

(8) When signaling the slices, the information could be inferred without signaling in some cases.

(9) It is possible that all the defined slices cannot cover the whole picture or sub-picture.

(1) The IDs of two sub-pictures may be identical.

(11) pic_width_max_in_luma_samples/CtbSizeY may be equal to 0, resulting in a meaningless Log 2( ) operation.

(12) ID in PH is more preferable than in PPS, but less preferable than in SPS, which is inconsistent.

(13) log 2 transform_skip_max_size_minus2 in PPS is parsed depending on sps_transform_skip_enabled_flag in SPS, resulting in a parsing dependency.

(14) loop_filter_across_subpic_enabled_flag for deblocking only consider the current sub-picture, without considering the neighbouring sub-picture.

4. Example Techniques and Embodiments

The detailed listing below should be considered as examples to explain general concepts. These items should not be interpreted in a narrow way. Furthermore, these items can be combined in any manner. Hereinafter, temporal filter is used to represent filters that require samples in other pictures. Max(x, y) returns the larger one of x and y. Min(x, y) returns the smaller one of x and y.

1. The position (named position RB) at which a temporal MV predictor is fetched in a picture to generate affine motion candidates (e.g. a constructed affine merge candidate) must be in a required sub-picture, assuming the top-left corner coordinate of the required sub-picture is (xTL, yTL) and bottom-right coordinate of the required sub-picture is (xBR, yBR).
   a. In one example, the required sub-picture is the sub-picture covering the current block.
   b. In one example, if position RB with a coordinate (x, y) is out of the required sub-picture, the temporal MV predictor is treated as unavailable.
      i. In one example, position RB is out of the required sub-picture if x>xBR.
      ii. In one example, position RB is out of the required sub-picture if y>yBR.
      iii. In one example, position RB is out of the required sub-picture if x<xTL.
      iv. In one example, position RB is out of the required sub-picture if y<yTL.
   c. In one example, position RB, if outside of the required sub-picture, a replacement of RB is utilized.
      i. Alternatively, furthermore, the replacement position shall be in the required sub-picture.
   d. In one example, position RB is clipped to be in the required sub-picture.
      i. In one example, x is clipped as x=Min(x, xBR).
      ii. In one example, y is clipped as y=Min(y, yBR).
      iii. In one example, x is clipped as x=Max(x, xTL).
      iv. In one example, y is clipped as y=Max(y, yTL).
   e. In one example, the position RB may be the bottom right position inside the corresponding block of current block in the collocated picture.
   f. The proposed method may be utilized in other coding tools which require to access motion information from a picture different than the current picture.
   g. In one example, whether the above methods are applied (e.g., position RB must be in a required sub-picture (e.g. to do as claimed in 1.a and/or 1.b)) may depend on one or more syntax elements signaled in VPS/DPS/SPS/PPS/APS/slice header/tile group header. For example, the syntax element may be subpic_treated_as_pic_flag[SubPicIdx], where SubPicIdx is the sub-picture index of sub-picture covering the current block.

2. The position (named position S) at which an integer sample is fetched in a reference not used in the interpolation process must be in a required sub-picture, assuming the top-left corner coordinate of the required sub-picture is (xTL, yTL) and the bottom-right coordinate of the required sub-picture is (xBR, yBR).
   a. In one example, the required sub-picture is the sub-picture covering the current block.
   b. In one example, if position S with a coordinate (x, y) is out of the required sub-picture, the reference sample is treated as unavailable.
      i. In one example, position S is out of the required sub-picture if x>xBR.
      ii. In one example, position S is out of the required sub-picture if y>yBR.
      iii. In one example, position S is out of the required sub-picture if x<xTL.
      iv. In one example, position S is out of the required sub-picture if y<yTL.
   c. In one example, position S is clipped to be in the required sub-picture.
      i. In one example, x is clipped as x=Min(x, xBR).
      ii. In one example, y is clipped as y=Min(y, yBR).
      iii. In one example, x is clipped as x=Max(x, xTL).
      iv. In one example, y is clipped as y=Max(y, yTL).
   d. In one example, whether position S must be in a required sub-picture (e.g. to do as claimed in 2.a and/or 2.b) may depend on one or more syntax elements signaled in VPS/DPS/SPS/PPS/APS/slice header/tile group header. For example, the syntax element may be subpic_treated_as_pic_flag[SubPicIdx], where SubPicIdx is the sub-picture index of sub-picture covering the current block.

e. In one example, the fetched integer sample is used to generate gradients in BDOF and/or PORF.
3. The position (named position R) at which the reconstructed luma sample value is fetched may be in a required sub-picture, assuming the top-left corner coordinate of the required sub-picture is (xTL, yTL) and the bottom-right coordinate of the required sub-picture is (xBR, yBR).
   a. In one example, the required sub-picture is the sub-picture covering the current block.
   b. In one example, if position R with a coordinate (x, y) is out of the required sub-picture, the reference sample is treated as unavailable.
      i. In one example, position R is out of the required sub-picture if x>xBR.
      ii. In one example, position R is out of the required sub-picture if y>yBR.
      iii. In one example, position R is out of the required sub-picture if x<xTL.
      iv. In one example, position R is out of the required sub-picture if y<yTL.
   c. In one example, position R is clipped to be in the required sub-picture.
      i. In one example, x is clipped as x=Min(x, xBR).
      ii. In one example, y is clipped as y=Min(y, yBR).
      iii. In one example, x is clipped as x=Max(x, xTL).
      iv. In one example, y is clipped as y=Max(y, yTL).
   d. In one example, whether position R must be in a required sub-picture (e.g to do as claimed in 4.a and/or 4.b) may depend on one or more syntax elements signaled in VPS/DPS/SPS/PPS/APS/slice header/tile group header. For example, the syntax element may be subpic_treated_as_pic_flag[SubPicIdx], where SubPicIdx is the sub-picture index of sub-picture covering the current block.
   e. In one example, the fetched luma sample is used to derive the scaling factor for the chroma component(s) in LMCS.
4. The position (named position N) at which the picture boundary check for BT/TT/QT splitting, BT/TT/QT depth derivation, and/or the signaling of CU split flag must be in a required sub-picture, assuming the top-left corner coordinate of the required sub-picture is (xTL, yTL) and the bottom-right coordinate of the required sub-picture is (xBR, yBR).
   a. In one example, the required sub-picture is the sub-picture covering the current block.
   b. In one example, if position N with a coordinate (x, y) is out of the required sub-picture, the reference sample is treated as unavailable.
      i. In one example, position N is out of the required sub-picture if x>xBR.
      ii. In one example, position N is out of the required sub-picture if y>yBR.
      iii. In one example, position N is out of the required sub-picture if x<xTL.
      iv. In one example, position N is out of the required sub-picture if y<yTL.
   c. In one example, position N is clipped to be in the required sub-picture.
      i. In one example, x is clipped as x=Min(x, xBR).
      ii. In one example, y is clipped as y=Min(y, yBR).
      iii. In one example, x is clipped as x=Max(x, xTL).
   d. In one example, y is clipped as y=Max(y, yTL). In one example, whether position N must be in a required sub-picture (e.g. to do as claimed in 5.a and/or 5.b) may depend on one or more syntax elements signaled in VPS/DPS/SPS/PPS/APS/slice header/tile group header. For example, the syntax element may be subpic_treated_as_pic_flag[SubPicIdx], where SubPicIdx is the sub-picture index of sub-picture covering the current block.
5. History-based Motion Vector Prediction (HMVP) table may be reset before decoding a new sub-picture in one picture.
   a. In one example, the HMVP table used for IBC coding may be reset
   b. In one example, the HMVP table used for inter coding may be reset
   c. In one example, the HMVP table used for intra coding may be reset
6. The sub-picture syntax elements may be defined in units of N (such as N=8, 32, and etc) samples.
   a. In one example, the width of each element of the sub-picture identifier grid in units of N samples.
   b. In one example, the height of each element of the sub-picture identifier grid in units of N samples.
   c. In one example, N is set to the width and/or height of CTU.
7. The syntax element of picture width and picture height may be restricted to be no smaller than K (K>=8).
   a. In one example, the picture width may need to be restricted to be no smaller than 8.
   b. In one example, the picture height may need to be restricted to be no smaller than 8.
8. A conformance bitstream shall satisfy that sub-picture coding and Adaptive resolution conversion (ARC)/Dynamic resolution conversion (DRC)/Reference picture resampling (RPR) are disallowed to be enabled for one video unit (e.g., sequence).
   a. In one example, signaling of enabling sub-picture coding may be under the conditions of disallowing ARC/DRC/RPR.
      i. In one example, when sub-picture is enabled, such as subpics_present_flag equal to 1, pic_width_in_luma_samples for all pictures for which this SPS is active is equal to max_width_in_luma_samples.
   b. Alternatively, sub-picture coding and ARC/DRC/RPR may be both enabled for one video unit (e.g., sequence).
      i. In one example, a conformance bitstream shall satisfy that the downsampled sub-picture due to ARC/DRC/RPR shall still be in the form of K CTUs in width and M CTUs in height wherein K and M are both integers.
      ii. In one example, a conformance bitstream shall satisfy that for sub-pictures not located at picture boundaries (e.g., right boundary and/or bottom boundary), the downsampled sub-picture due to ARC/DRC/RPR shall still be in the form of K CTUs in width and M CTUs in height wherein K and M are both integers.
      iii. In one example, CTU sizes may be adaptively changed based on the picture resolution.
         1) In one example, a max CTU size may be signaled in SPS. For each picture with less resolution, the CTU size may be changed accordingly based on the reduced resolution.
         2) In one example, CTU size may be signaled in SPS and PPS, and/or sub-picture level.
9. The syntax element subpic_grid_col_width_minus1 and subpic_grid_row_height_minus1 may be constrained.
   a. In one example, subpic_grid_col_width_minus1 must be no larger (or must be smaller) than T1.

b. In one example, subpic_grid_row_height_minus1 must be no larger (or must be smaller) than T2.
c. In one example, in a conformance bit-stream, subpic_grid_col_width_minus1 and/or subpic_grid_row_height_minus1 must follow the constraint such as bullet 3.a or 3.b.
d. In one example, T1 in 3.a and/or T2 in 3.b may depend on profiles/levels/tiers of a video coding standard.
e. In one example, T1 in 3.a may depend on the picture width.
  i. For example, T1 is equal to pic_width_max_in_luma_samples/4 or pic_width_max_in_luma_samples/4+Off. Off may be 1, 2, −1, −2, etc.
f. In one example, T2 in 3.b may depend on the picture width.
  i. For example, T2 is equal to pic_height_max_in_luma_samples/4 or pic_height_max_in_luma_samples/4−1+Off. Off may be 1, 2, −1, −2, etc.

10. It is constrained that a boundary between two sub-pictures must be a boundary between two CTUs.
  a. In other words, a CTU cannot be covered by more than one sub-picture.
  b. In one example, the unit of subpic_grid_col _width_minus1 may be the CTU width (such as 32, 64, 128), instead of 4 as in VVC. The sub-picture grid width should be (subpic_grid_col_width_minus1+1)*CTU width.
  c. In one example, the unit of subpic_grid_col _height_minus1 may be the CTU height (such as 32, 64, 128), instead of 4 as in VVC. The sub-picture grid height should be (subpic_grid_col_height_minus1+1)*CTU height.
  d. In one example, in a conformance bit-stream, the constraint must be satisfied if the sub-picture approach is applied.

11. It is constrained that the shape of a sub-picture must be rectangular.
  a. In one example, in a conformance bit-stream, the constraint must be satisfied if the sub-picture approach is applied.
  b. Sub-picture may only contain rectangular slices. For example, in a conformance bit-stream, the constraint must be satisfied if the sub-picture approach is applied.

12. It is constrained that two sub-pictures cannot be overlapped.
  a. In one example, in a conformance bit-stream, the constraint must be satisfied if the sub-picture approach is applied.
  b. Alternatively, two sub-pictures may be overlapped with each other.

13. It is constrained that any position in the picture must be covered by one and only one sub-picture.
  a. In one example, in a conformance bit-stream, the constraint must be satisfied if the sub-picture approach is applied.
  b. Alternatively, one sample may not belong to any sub-picture.
  c. Alternatively, one sample may belong to more than one sub-pictures.

14. It may be constrained that sub-pictures defined in a SPS mapped to every resolution presented in the same sequence should obey the location and/or size constrained mentioned above.
  a. In one example, the width and height of a sub-picture defined in the SPS mapped to a resolution presented in the same sequence, should be integer multiple times of N (such as 8, 16, 32) luma samples.
  b. In one example, sub-pictures may be defined for certain layer and may be mapped to other layers.
    i. For example, sub-pictures may be defined for the layer with the highest resolution in the sequence.
    ii. For example, sub-pictures may be defined for the layer with the lowest resolution in the sequence.
    iii. Which layer the sub-pictures are defined for may be signaled in SPS/VPS/PPS/slice header.
  c. In one example, when sub-pictures and different resolutions are both applied, all resolutions (e.g., width or/and height) may be integer multiple of a given resolution.
  d. In one example, the width and/or height of a sub-picture defined in the SPS may be integer multiple times (e.g., M) of the CTU size.
  e. Alternatively, sub-pictures and different resolutions in a sequence may not be allowed simultaneously.

15. Sub-pictures may only apply to a certain layer(s)
  a. In one example, sub-pictures defined in a SPS may only apply to the layer with the highest resolution in a sequence.
  b. In one example, sub-pictures defined in a SPS may only apply to the layer with the lowest temporal id in a sequence.
  c. Which layer(s) that sub-pictures may be applied to may be indicated by one or multiple syntax elements in SPS/VPS/PPS.
  d. Which layer(s) that sub-picture cannot be applied to may be indicated by one or multiple syntax elements in SPS/VPS/PPS.

16. In one example, the position and/or dimensions of a sub-picture may be signaled without using subpic_grid_idx.
  a. In one example, the top-left position of a sub-picture may be signaled.
  b. In one example, the bottom-right position of a sub-picture may be signaled.
  c. In one example, the width of sub-picture may be signaled.
  d. In one example, the height of a sub-picture may be signaled.

17. For temporal filter, when performing the temporal filtering of a sample, only samples within the same sub-picture that the current sample belongs to may be used. The required samples may be in the same picture that the current sample belongs to or in other pictures.

18. In one example, whether to and/or how to apply a partitioning method (such as QT, horizontal BT, vertical BT, horizontal TT, vertical TT, or not split, etc.) may depend on whether the current block (or partition) crosses one or multiple boundary of a sub-picture.
  a. In one example, the picture boundary handling method for partitioning in VVC may also be applied when a picture boundary is replaced by a sub-picture boundary.
  b. In one example, whether to parse a syntax element (e.g. a flag) which represents a partitioning method (such as QT, horizontal BT, vertical BT, horizontal TT, vertical TT, or not split, etc.) may depend on whether the current block (or partition) crosses one or multiple boundary of a sub-picture.

19. Instead of splitting one picture into multiple sub-pictures with independent coding of each sub-picture, it is proposed to split a picture into at least two sets of sub-regions, with the first set including multiple sub-pictures and the second set including all the remaining samples.
   a. In one example, a sample in the second set is not in any sub-pictures.
   b. Alternatively, furthermore, the second set may be encoded/decoded based on the information of the first set.
   c. In one example, a default value may be utilized to mark whether a sample/M×K sub-region belonging to the second set.
      i. In one example, the default value may be set equal to (max_subpics_minus1+K) wherein K is an integer greater than 1.
      ii. The default value may be assigned to subpic_grid_idx[i][j] to indicate that grid belongs to the second set.
20. It is proposed that the syntax element subpic_grid_idx[i][j] cannot be larger than max_subpics_minus1.
   a. For example, it is constrained that in a conformance bit-stream, subpic_grid_idx[i][j] cannot be larger than max_subpics_minus1.
   b. For example, the codeword to code subpic_grid_idx[i][j] cannot be larger than max_subpics_minus1.
21. It is proposed that, any integer number from 0 to max_subpics_minus1 must be equal to at least one subpic_grid_idx[i][j].
22. IBC virtual buffer may be reset before decoding a new sub-picture in one picture.
   a. In one example, all the samples in the IBC virtual buffer may be reset to −1.
23. Palette entry list may be reset before decoding a new sub-picture in one picture.
   a. In one example, PredictorPaletteSize may be set equal to 0 before decoding a new sub-picture in one picture.
24. Whether to signal the information of slices (e.g. number of slices and/or ranges of slices) may depend on the number of tiles and/or the number of bricks.
   a. In one example, if the number of bricks in a picture is one, num_slices_in_pic_minus1 is not signaled and inferred to be 0.
   b. In one example, if the number of bricks in a picture is one, the information of slices (e.g. number of slices and/or ranges of slices) may not be signaled.
   c. In one example, if the number of bricks in a picture is one, the number of slices may be inferred to be one. And the slice covers the whole picture. In one example, if the number of bricks in a picture is one, single_brick_per_slice_flag is not signaled and inferred to be one.
      i. Alternatively, if the number of bricks in a picture is one, single_brick_per_slice_flag must be one.
   d. An exemplary syntax design is as below:

|  | Descriptor |
|---|---|
| pic_parameter_set_rbsp( ) { | |
| ... | |
| *if(NumBricksInPic>1){* | |
|   single_brick_per_slice_flag | u(1) |
|   if( !single_brick_per_slice_flag ) | |
|     rect_slice_flag | u(1) |
|   if( rect_slice_flag && !single_brick_per_slice_flag ) { | |
|     num_slices_in_pic_minus1 | ue(v) |
|     bottom_right_brick_idx_length_minus1 | ue(v) |
|     for( i = 0; i < num_slices_in_pic_minus1; i++ ) { | |
|       bottom_right_brick_idx_delta[ i ] | u(v) |
|       brick_idx_delta_sign_flag[ i ] | u(1) |
|     } | |
|   } | |
| *}* | |
|   loop_filter_across_bricks_enabled_flag | u(1) |
|   if( loop_filter_across_bricks_enabled_flag ) | |
|     loop_filter_across_slices_enabled_flag | u(1) |
| } | |
| ... | |

25. Whether to signal slice_address may be decoupled from whether slices are signaled to be rectangles (e.g. whether rect_slice_flag is equal to 0 or 1).
   a. An exemplary syntax design is as below:

| | |
|---|---|
| if( [[rect_slice_flag \| \|]] NumBricksInPic > 1 ) | |
|   slice_address | u(v) |

26. Whether to signal slice_address may depend on the number of slices when slices are signaled to be rectangles.

| | |
|---|---|
| *if((rect_slice_flat && num_slices_in_pic_minus>0)* \| *(!rect_slice_flag && NumBricksInpic>1))* | |
|   slice_address | u(v) |

27. Whether to signal num_bricks_in_slice_minus1 may depend on the slice address and/or the number of bricks in the picture.
   a. An exemplary syntax design is as below:

| | |
|---|---|
| if( !rect_slice_flag && !single_brick_per_slice_flag *&& slice_addres<NumBricksInPic-1)* | |
|   num_bricks_in_slice_minus1 | ue(v) |

28. Whether to signal loop_filter_across_bricks _enabled_ flag may depend on the number of tiles and/or the number of bricks.
   a. In one example, loop_filter_across_bricks _enabled_ flag is not signaled if the number of bricks is less than 2.
   b. An exemplary syntax design is as below:

| | Descriptor |
|---|---|
| pic_parameter_set_rbsp( ) { | |
| ... | |
| if(NumBricksInPic > 1) | |
|     loop_filter_across_bricks_enabled_flag | u(1) |
|     if( loop_filter_across_bricks_enabled_flag ) | |
|         loop_filter_across_slices_enabled_flag | u(1) |
| ... | |

29. It is a requirement of bitstream conformance that all the slices of a picture must cover the whole picture.
   a. The requirement must be satisfied when slices are signaled to be rectangles (e.g rect_slice_flag is equal to 1).
30. It is a requirement of bitstream conformance that all the slices of a sub-picture must cover the whole sub-picture.
   a. The requirement must be satisfied when slices are signaled to be rectangles (e.g rect_slice_flag is equal to 1).
31. It is a requirement of bitstream conformance that a slice cannot be overlapped with more than one sub-picture.
32. It is a requirement of bitstream conformance that a tile cannot be overlapped with more than one sub-picture.
33. It is a requirement of bitstream conformance that a brick cannot b e overlapped with more than one sub-picture.
   In the following discussion, a basic unit block (BUB) with dimensions CW×CH is a rectangle region. For example, a BUB may be a Coding Tree Block (CTB).
34. In one example, the number of sub-pictures (denoted as N) may be signaled.
   a. It may be required on a conformance bit-stream that there are at least two sub-pictures in a picture if sub-pictures are used (e.g. subpics_present_flag is equal to 1).
   b. Alternatively, N minus d (i.e., N−d) may be signaled, where d is an integer such as 0, 1, or 2.
   c. For example, N−d may be coded with fixed length coding e.g. u(x).
      i. In one example, x may be a fixed number such as 8.
      ii. In one example, x or x-dx may be signaled before N-d is signaled, where dx is an integer such as 0, 1 or 2. The signaled x may not be larger than a maximum value in a conformance bitstream.
      iii. In one example, x may be derived on-the-fly.
         1) For example, x may be derived as a function of the total number (denoted as M) of BUBs in the picture. E.g., x=Ceil(log 2(M+d0))+d1, where d0 and d1 are two integers, such as −2, −1, 0, 1, 2, etc. Here, Ceil( ) function returns the smallest integer value that is bigger than or equal to the input value.
         2) M may be derived as M=Ceiling(W/CW)×Ceiling(H/CH), where W and H represent the width and height of the picture, and CW and CH represent the width and height of a BUB.
   d. For example, N−d may be coded with a unary code or a truncated unary code.
   e. In one example, the allowed maximum value of N−d may be a fixed number.
      i. Alternatively, the allowed maximum value of N−d may be derived as a function of the total number (denoted as M) of BUBs in the picture. E.g, x=Ceil(log 2(M+d0))+d1, where d0 and d1 are two integers, such as −2, −1, 0, 1, 2, etc. Here, Ceil( ) function returns the smallest integer value that is bigger than or equal to the input value.
35. In one example, a sub-picture may be signaled by indications of one or multiple its selected positions (e.g., top-left/top-right/bottom-left/bottom-right position) and/or its width and/or its height.
   a. In one example, the top-left position of a sub-picture may be signaled in the granularity of a basic unit block (BUB) with dimensions CW×CH.
      i. For example, the column index (denoted as Col) in terms of BUBs of the top-left BUB of the sub-picture may be signaled.
         1) For example, Col−d may be signaled, where d is an integer such as 0, 1, or 2.
            a) Alternatively, d may be equal to Col of a sub-picture previously coded, added by d1, where d1 is an integer such as −1, 0, or 1.
            b) The sign of Col−d may be signaled.
      ii. For example, the row index (denoted as Row) in term of BUBs of the top-left BUB of the sub-picture may be signaled.
         1) For example, Row−d may be signaled, where d is an integer such as 0, 1, or 2.
            a) Alternatively, d may be equal to Row of a sub-picture previously coded, added by d1, where d1 is an integer such as −1, 0, or 1.
            b) The sign of Row −d may be signaled.
      iii. The row/column index (denoted as Row) mentioned above may be represented in the Coding Tree Block (CTB) unit, e.g., the x or y coordinate relative to the top-left position of a picture may be divided by CTB size and signaled.
      iv. In one example, whether to signal the position of a sub-picture may depend on the sub-picture index.
         1) In one example, for the first sub-picture within a picture, the top-left position may be not signaled.
            a) Alternatively, furthermore, the top-left position may be inferred, e.g., to be (0, 0).
         2) In one example, for the last sub-picture within a picture, the top-left position may be not signaled.
            a) The top-left position may be inferred depending on information of sub-pictures previously signaled.
   b. In one example, indications of the width/height/a selected position of a sub-picture may be signaled with truncated unary/truncated binary/unary/fixed length/K-th EG coding (e.g., K=0, 1, 2, 3).
   c. In one example, the width of a sub-picture may be signaled in the granularity of a BUB with dimensions CW×CH.
      i. For example, the number of columns of BUBs in the sub-picture (denoted as W) may be signaled.
      ii. For example, W−d may be signaled, where d is an integer such as 0, 1, or 2.
         1) Alternatively, d may be equal to W of a sub-picture previously coded, added by d1, where d1 is an integer such as −1, 0, or 1.
         2) The sign of W-d may be signaled.

d. In one example, the height of a sub-picture may be signaled in the granularity of a BUB with dimensions CW×CH.
   i. For example, the number of rows of BUBs in the sub-picture (denoted as H) may be signaled.
   ii. For example, H−d may be signaled, where d is an integer such as 0, 1, or 2.
      1) Alternatively, d may be equal to H of a sub-picture previously coded, added by d1, where d1 is an integer such as −1, 0, or 1.
      2) The sign of H−d may be signaled.
e. In one example, Col−d may be coded with fixed length coding e.g. u(x).
   i. In one example, x may be a fixed number such as 8.
   ii. In on example, x or x−dx may be signaled before Col−d is signaled, where dx is an integer such as 0, 1 or 2. The signaled x may not be larger than a maximum value in a conformance bitstream.
   iii. In one example, x may be derived on-the-fly.
      1) For example, x may be derived as a function of the total number (denoted as M) of BUB columns in the picture. E.g., x=Ceil(log 2(M+d0))+d1, where d0 and d1 are two integers, such as −2, −1, 0, 1, 2, etc. Here, Ceil( ) function returns the smallest integer value that is bigger than or equal to the input value.
      2) M may be derived as M=Ceiling(W/CW), where W represents the width of the picture, and CW represents the width of a BUB.
f. In one example, Row−d may be coded with fixed length coding e.g. u(x).
   i. In one example, x may be a fixed number such as 8.
   ii. In one example, x or x−dx may be signaled before Row−d is signaled, where dx is an integer such as 0, 1 or 2. The signaled x may not be larger than a maximum value in a conformance bitstream.
   iii. In one example, x may be derived on-the-fly.
      1) For example, x may be derived as a function of the total number (denoted as M) of BUB rows in the picture. E.g., x=Ceil(log 2(M+d0))+d1, where d0 and d1 are two integers, such as −2, −1, 0, 1, 2, etc. Here, Ceil( ) function returns the smallest integer value that is bigger than or equal to the input value.
      2) M may be derived as M=Ceiling(H/CH), where H represents the height of the picture, and CH represents the height of a BUB.
g. In one example, W−d may be coded with fixed length coding e.g. u(x).
   i. In one example, x may be a fixed number such as 8.
   ii. In on example, x or x−dx may be signaled before W−d is signaled, where dx is an integer such as 0, 1 or 2. The signaled x may not be larger than a maximum value in a conformance bitstream.
   iii. In one example, x may be derived on-the-fly.
      1) For example, x may be derived as a function of the total number (denoted as M) of BUB columns in the picture. E.g., x=Ceil(log 2(M+d0))+d1, where d0 and d1 are two integers, such as −2, −1, 0, 1, 2, etc. Here, Ceil( ) function returns the smallest integer value that is bigger than or equal to the input value.
      2) M may be derived as M=Ceiling(W/CW), where W represents the width of the picture, and CW represents the width of a BUB.
h. In one example, H−d may be coded with fixed length coding e.g. u(x).
   i. In one example, x may be a fixed number such as 8.
   ii. In one example, x or x−dx may be signaled before H−d is signaled, where dx is an integer such as 0, 1 or 2. The signaled x may not be larger than a maximum value in a conformance bitstream.
   iii. In one example, x may be derived on-the-fly.
      1) For example, x may be derived as a function of the total number (denoted as M) of BUB rows in the picture. E.g., x=Ceil(log 2(M+d0))+d1, where d0 and d1 are two integers, such as −2, −1, 0, 1, 2, etc. Here, Ceil( ) function returns the smallest integer value that is bigger than or equal to the input value.
      2) M may be derived as M=Ceiling(H/CH), where H represents the height of the picture, and CH represents the height of a BUB.
i. Col−d and/or Row−d may be signaled for all sub-pictures.
   i. Alternatively, Col−d and/or Row−d may not be signaled for all sub-pictures.
      1) Col−d and/or Row−d may not be signaled if the number of sub-pictures are less than 2. (equal to 1).
      2) For example, Col−d and/or Row−d may not be signaled for the first sub-picture (e.g. with the sub-picture index (or sub-picture ID) equal to 0).
         a) When they are not signaled, they may be inferred to be 0.
      3) For example, Col−d and/or Row−d may not be signaled for the last sub-picture (e.g. with the sub-picture index (or sub-picture ID) equal to NumSubPics−1).
         a) When they are not signaled, they may be inferred depending on the positions and dimensions of sub-pictures already signaled.
j. W−d and/or H−d may be signaled for all sub-pictures.
   i. Alternatively, W−d and/or H−d may not be signaled for all sub-pictures.
      1) W−d and/or H−d may not be signaled if the number of sub-pictures are less than 2. (equal to 1).
      2) For example, W−d and/or H−d may not be signaled for the last sub-picture (e.g. with the sub-picture index (or sub-picture ID) equal to NumSubPics−1).
         a) When they are not signaled, they may be inferred depending on the positions and dimensions of sub-pictures already signaled.
k. In the above bullets, a BUB may be a Coding Tree Block (CTB).
36. In one example, the information of sub-pictures should be signaled after information of the CTB size (e.g. log 2_ctu_size_minus5) has already been signaled.
37. subpic_treated_as _pic_flag[i] may not be signaled for each sub-pictures. Instead, one subpic_treated_as _pic_flag is signaled to control whether a sub-picture is treated as a picture for all sub-pictures.
38. loop_filter_across_subpic_enabled_flag[i] may not be signaled for each sub-pictures. Instead, one loop_filter_across_subpic_enabled_flag is signaled to control whether loop filters can be applied across sub-pictures for all sub-pictures.
39. subpic_treated_as _pic_flag[i] (subpic_treated_aspic_flag) and/or loop_filter_across_subpic_enabled_flag[i] (loop_filter_across_subpic_enabled_flag) may be signaled conditionally.

a. In one example, subpic_treated_aspic_flag[i] and/or loop_filter_across_subpic_enabled_flag[i] may not be signaled if the number of sub-pictures are less than 2. (equal to 1).
40. RPR may be applied when sub-pictures are used.
   a. In one example, the scaling ratio in RPR may be constrained to be a limited set when sub-pictures are used, such as {1:1, 1:2 and/or 2:1}, or {1:1, 1:2 and/or 2:1, 1:4 and/or 4:1}, {1:1, 1:2 and/or 2:1, 1:4 and/or 4:1, 1:8 and/or 8:1}.
   b. In one example, the CTB size of a picture A and the CTB size of a picture B may be different if the resolution of picture A and picture B are different.
   c. In one example, suppose a sub-picture SA with dimensions SAW×SAH is in picture A and a sub-picture SB with dimensions SBW×SBH is in picture B, SA corresponds to SB, and the scaling ratios between picture A and picture B are Rw and Rh along the horizontal and vertical directions, then
      i. SAW/SBW or SBW/SAW should be equal to Rw.
      ii. SAH/SBH or SBH/SAH should be equal to Rh.
41. When sub-pictures are used (e.g. sub_pics_present_flag is true), a subpiccutre index (or sub-picture ID) may be signaled in the slice header, and the slice address is interrupted as the address in a sub-picture instead of the whole picture.
42. It is required that the subpicture ID of a first subpicture must be different to the subpicture ID of a second subpicture, if the first subpicture and the second subpicture are not the same sub-picture.
   a. In one example, it is a requirement in a conformance bitstream that sps_subpic_id[i] must be different from sps_subpic_id[j], if i is not equal to j.
   b. In one example, it is a requirement in a conformance bitstream that pps_subpic_id[i] must be different from pps_subpic_id[j], if i is not equal to j.
   c. In one example, it is a requirement in a conformance bitstream that ph_subpic_id[i] must be different from ph_subpic_id[j], if i is not equal to j.
   d. In one example, it is a requirement in a conformance bitstream that SubpicIdList[i] must be different from SubpicIdList[j], if i is not equal to j.
   e. In one example, a difference denoted as D[i] equal to X_subpic_id[i]−X_subpic_id[i−P] may be signaled.
      i. For example, X may be sps, pps or ph.
      ii. For example, P is equal to 1.
      iii. For example, i>P.
      iv. For example, D[i] must be larger than 0.
      v. For example, D[i]−1 may be signaled.
43. It is proposed that the length of a syntax element specifying the horizontal or vertical position of top left CTU (e.g. subpic_ctu_top_left_x or subpic_ctu_top_left_y) may be derived to be Ceil(Log 2(SS)) bits, wherein SS must be larger than 0. Here, Ceil( ) function returns the smallest integer value that is bigger than or equal to the input value.
   a. In one example, SS=(pic_width_max_in_luma_samples+RR)/CtbSizeY when the syntax element specifies the horizontal position of top left CTU (e.g subpic_ctu_top_left_x).
   b. In one example, SS=(pic_height_max_in_luma_samples+RR)/CtbSizeY when the syntax element specifies the vertical position of top left CTU (e.g subpic_ctu_top_left_y).
   c. In one example, RR is a non-zero integer such as CtbSizeY−1.
44. It is proposed that the length of a syntax element specifying the horizontal or vertical position of top left CTU of a subpicture (e.g. subpic_ctu_top_left_x or subpic_ctu_top_left_y) may be derived to be Ceil(Log 2(SS)) bits, wherein SS must be larger than 0. Here, Ceil( ) function returns the smallest integer value that is bigger than or equal to the input value.
   a. In one example, SS=(pic_width_max_in_luma _samples+RR)/CtbSizeY when the syntax element specifies the horizontal position of top left CTU of a subpicture (e.g. subpic_ctu_top_left_x).
   b. In one example, SS=(pic_height_max _in_luma _samples+RR)/CtbSizeY when the syntax element specifies the vertical position of top left CTU of a subpicture (e.g. subpic_ctu_top_left_y).
   c. In one example, RR is a non-zero integer such as CtbSizeY−1.
45. It is proposed that the default value of the length of a syntax element (which may plus an offset P such as 1) specifying the width or height of a subpicture (e.g subpic_width_minus1 or subpic_height_minus1) may be derived to be Ceil(Log 2(SS))−P, wherein SS must be larger than 0. Here, Ceil( ) function returns the smallest integer value that is bigger than or equal to the input value.
   a. In one example, SS=(pic_width_max_in_luma_samples+RR)/CtbSizeY when the syntax element specifies the default width (which may plus an offset P) of a subpicture (e.g. subpic_width_minus1).
   b. In one example, SS=(pic_height_max _in_luma _samples+RR)/CtbSizeY when the syntax element specifies the default height (which may plus an offset P) of a subpicture (e.g. subpic_height_minus1).
   c. In one example, RR is a non-zero integer such as CtbSizeY−1.
46. It is proposed that, the information of IDs of sub-pictures should be signaled at least in one of SPS, PPS, and the picture header if it is determined that the information should be signaled.
   a. In one example, it is a requirement in a conformance bitstream that at least one of sps_subpic_id _signalling_present_flag pps_subpic_id _signalling_present_flag and ph_subpic_id _signalling_present_flag should be equal to 1 if sps_subpic_id _present_flag is equal to 1.
47. It is proposed that, if the information of IDs of sub-pictures is not signaled in any one of SPS, PPS, and the picture header, but it is determined that the information should be signaled. default IDs should be assigned.
   a. In one example, if sps_subpic_id _signalling_present_flag pps_subpic_id _signalling_present_flag and ph_subpic_id _signalling_present_flag are all equal to 0 and sps_subpic_id _present_flag is equal to 1, SubpicIdList[i] should be set equal to i+P, where P is an offset such as 0. An exemplary description is as below: for (i=0; i<=sps_num_subpics_minus1; i++) SubpicIdList[i]=sps_subpic_idpresent_flag?
   (sps_subpic_id _signalling_present_flag?sps_subpic_id[i]:
   (ph_subpic_id _signalling_present_flag?ph_subpic_id[i]:

*(pps_subpic_id_signalling_present_flag ? pps_subpic_id[ i ]: i )* )):i

48. It is proposed that the information of sub-picture IDs are not signaled in a picture header if they are signaled in the corresponding PPS.
   a. An exemplary syntax design is as below,

| | Descriptor |
|---|---|
| picture_header_rbsp( ) { | |
|   non_reference_picture_flag | u(1) |
|   gdr_pic_flag | u(1) |
|   no_output_of_prior_pics_flag | u(1) |
|   if( gdr_pic_flag ) | |
|     recovery_poc_cnt | ue (v) |
|   ph_pic_parameter_set_id | ue (v) |
|   if( sps_subpic_id_present_flag && !sps_subpic_id_signalling_flag && !pps_subpic_id_signalling_flag) { | |
|     ph_subpic_id_signalling_present_flag | u(1) |
|     if( ph_subpics_id_signalling_present_flag ) { | |
|       ph_subpic_id_len_minus1 | ue (v) |
|       for( i = 0; i <= sps_num_subpics_minus1; i++ ) | |
|         ph_subpic_id[ i ] | u(v) |
|     } | |
|   } | |
| ... | | b. In one example, the sub-picture IDs are set according to the information of sub-picture IDs signaled in SPS if they are signaled in SPS; Otherwise, the sub-picture IDs are set according to the information of sub-picture IDs signaled in PPS if they are signaled in PPS, Otherwise, the sub-picture IDs are set according to the information of sub-picture IDs signaled in the the picture header if they are signaled in the picture header. An exemplary description is as below,
   for (i=0; i<=sps_num_subpics_minus1; i++)
     SubpicIdList[i]=sps_subpic_id _present_flag?
       (sps_subpic_id _signalling_present_flag?sps_subpic_id[i]:
       (pps_subpic_id _signalling_present_flag?pps_subpic_id[i]:
   (ph_subpic_id _signalling_present_flag?ph_subpic_id[i]: i))):i
   c. In one example, the sub-picture IDs are set according to the information of sub-picture IDs signaled in the picture header if they are signaled in the picture header; Otherwise, the sub-picture IDs are set according to the information of sub-picture IDs signaled in PPS if they are signaled in PPS, Otherwise, the sub-picture IDs are set according to the information of sub-picture IDs signaled in the SPS if they are signaled in SPS. An exemplary description is as below,
   for (i=0; i<=sps_num_subpics_minus1; i++)
     SubpicIdList[i]=sps_subpic_id _present_flag?
       (ph_subpic_id _signalling_present_flag?ph_subpic_id[i]:
       (pps_subpic_id _signalling_present_flag?pps_subpic_id[i]:
   (sps_subpic_id _signalling_present_flag?sps_subpic_id[i]: i))):i 49. It is proposed that the deblocking process on an edge E should depend on the determination of whether loop-filtering is allowed across the subpicture boundaries (e.g determined by loop_filter_across_subpic _enabled_flag) on both sides (denoted as P-side and Q-side) of the edge. P-side represents the side in the current block, and Q-side represents the side in the neighbouring block, which may belong to a different sub-picture. In the following discussion, it is assumed that P-side and Q-side belongs two different sub-pictures. loop_filter_across_subpic _enabled_flag[P]=0/1 means that loop-filtering is disallowed/allowed across the subpicture boundaries of the subpicture containing P-side. loop_filter_across_subpic _enabled_flag[Q]=0/1 means that loop-filtering is disallowed/allowed across the subpicture boundaries of the subpicture containing Q-side.
   a. In one example, E is not filtered if loop_filter_across_subpic _enabled_flag[P] is equal to 0 or loop_filter_across_subpic _enabled_flag[Q] is equal to 0.
   b. In one example, E is not filtered if loop_filter_across_subpic _enabled_flag[P] is equal to 0 and loop_filter_across_subpic _enabled_flag[Q] is equal to 0.
   c. In one example, whether to filter the two sides of E are controlled separately.
      i. For example, P-side of E is filtered if and only if loop_filter_across_subpic _enabled_flag[P] is equal 1.
      ii. For example, Q-side of E is filtered if and only if loop_filter_across_subpic _enabled_flag[Q] is equal 1.

50. It is proposed that, the signaling/parsing of a syntax element SE in PPS specifying the maximum block size used for transform skip (such as log 2_transform_skip_max _size_minus2) should be decoupled from any syntax element in SPS (such as sps_transform_skip_enabled _flag).
   a. An exemplary syntax change is as below:

| pic_parameter_set_rbsp( ) { | |
|---|---|
| ... | |
|   [[if( sps_transform_skip_enabled_flag )]] | |
|     log2_transform_skip_max_size_minus2 | ue (v) |
| ... | | b. Alternatively, SE may be signaled in SPS, such as:

| seq_parameter_set_rbsp( ) { | |
|---|---|
| ... | |
|   if( sps_transform_skip_enabled_flag ) | |
|     log2_transform_skip_max_size_minus2 | ue(v) |
| ... | | c. Alternatively, SE may be signaled in the picture header, such as:

```
picture_header_rbsp( ) {
    ...
    if( sps_transform_skip_enabled_flag )
        log2_transform_skip_max_ size_minus2       ue (v)
    ...
```

51. Whether to and/or how to update the HMVP table (or named as list/storage/map etc.) after decoding a first block may depend on whether the first block is coded with GEO.
   a. In one example, the HMVP table may not be updated after decoding the first block if the first block is coded with GEO.
   b. In one example, the HMVP table may be updated after decoding the first block if the first block is coded with GEO.
      i. In one example, the HMVP table may be updated with the motion information of one partition divided by GEO.
      ii. In one example, the HMVP table may be updated with the motion information of multiple partitions divided by GEO
52. In CC-ALF, luma samples out of the current processing unit (e.g., ALF processing unit bounded by two ALF virtual boundaries) is excluded from filtering on chroma samples in the corresponding processing unit.
   a. Padded luma samples out of the current processing unit may be used to filter the chroma samples in the corresponding processing unit.
      i. Any padding method disclosed in this document may be used to pad the luma samples.
   b. Alternatively, luma samples out of the current processing unit may be used to filter chroma samples in the corresponding processing unit.

5. Embodiments

In the following embodiments, the newly added texts are bold italicized and the deleted texts are marked by "[[ ]]".

5.1 Embodiment 1: Sub-Picture Constraint on Affine Constructed Merge Candidates 8.5.5.6 Derivation Process for Constructed Affine Control Point Motion Vector Merging Candidates Inputs to this process are:
a luma location (xCb, yCb) specifying the top-left sample of the current luma coding block relative to the top-left luma sample of the current picture,
two variables cbWidth and cbHeight specifying the width and the height of the current luma coding block,
the availability flags available $A_0$, availableA$_1$, availableA$_2$, availableB$_0$, availableB$_1$, availableB$_2$, availableB$_3$,
the sample locations (xNbA$_0$, yNbA$_0$), (xNbA$_1$, yNbA$_1$), (xNbA$_2$, yNbA$_2$ (xNbB$_0$, yNbB$_0$), (xNbB$_1$, yNbB$_1$), (xNbB$_2$, yNbB$_2$) and (xNbB$_3$, yNbH$_3$).
Output of this process are:
the availability flag of the constructed affine control point motion vector merging candidates availableFlagConstK, with K=1 . . . 6,
the reference indices refIdxLXConstK, with K=1 . . . 6, X being 0 or 1,
the prediction list utilization flags predFlagLXConstK, with K=1 . . . 6, X being 0 or 1,
the affine motion model indices motion ModelIdcConstK, with K=1 . . . 6,
the bi-prediction weight indices bcwIdxConstK, with K=1 . . . 6,
the constructed affine control point motion vectors cpMvLXConstK[cpIdx] with cpIdx=0 . . . 2, K=1 . . . 6 and X being 0 or 1.

. . .

The fourth (collocated bottom-right) control point motion vector cpMvLXCorner[3], reference index refIdxLXCorner [3], prediction list utilization flag predFlagLXCorner[3] and the availability flag availableFlagCorner[3] with X being 0 and 1 are derived as follows:

The reference indices for the temporal merging candidate, refIdxLXCorner[3], with X being 0 or 1, are set equal to 0.
The variables mvLXCol and availableFlagLXCol, with X being 0 or 1, are derived as follows:
If slice_temporal_mvp_enabled_flag is equal to 0, both components of mvLXCol are set equal to 0 and availableFlagLXCol is set equal to 0.
Otherwise (slice_temporal_mvp_enabled_flag is equal to 1), the following applies:

$$xColBr=xCb+cbWidth \quad (8\text{-}601)$$

$$yColBr=yCb+cbHeight \quad (8\text{-}602)$$

*rightBoundaryPos = subpic_treated_as_pic_flag[SubPicIdx] ? SubPicRightBoundaryPos : pic_width_in_luma_samples − 1*

*botBoundaryPos = subpic_treated_as_pic_flag[SubPicIdx] ? SubPicBotBoundaryPos : pic_height_in_luma_samples − 1*

If yCb>>Ctb Log 2SizeY is equal to yColBr>>Ctb Log 2SizeY, *yColBr is less than or equal to botBoundaryPos and xColBr is less than or equal to rightBoundaryPos, the following applies:*

The variable colCb specifies the luma coding block covering the modified location given by ((xColBr>>3)<<3, (yColBr>>3)<<3) inside the collocated picture specified by ColPic.
The luma location (xColCb, yColCb) is set equal to the top-left sample of the collocated puna coding block specified by colCb relative to the top-left luma sample of the collocated picture specified by ColPic.
The derivation process for collocated motion vectors as specified in clause 8.5.2.12 is invoked with currCb, colCb, (xColCb, yColCb), refIdxLXCorner[3] and sbFlag set equal to 0 as inputs, and the output is assigned to mvLXCol and availableFlagLXCol.
Otherwise, both components of mvLXCol are set equal to 0 and availableFlagLXCol is set equal to 0.

5.2 Embodiment 2: Sub-Picture Constraint on Affine Constructed Merge Candidates 8.5.5.6 Derivation Process for Constructed Affine Control Point Motion Vector Merging Candidates Inputs to this process are:
a luma location (xCb, yCb) specifying the top-left sample of the current luma coding block relative to the top-left luma sample of the current picture,
two variables cbWidth and cbHeight specifyingthe width and the height of the current luma coding block,
the availability flags availableA$_0$, availableA$_1$, availableA$_2$, availableB$_0$, availableB$_1$, availableB$_2$, availableB$_3$,
the sample locations (xNbA$_0$, yNbA$_0$ (xNbA$_1$, yNbA$_1$), (xNbA$_2$, yNbA$_2$), (xNbB$_0$, yNbB$_0$), (xNbB$_1$, yNbB$_1$), (xNbB$_2$, yNbB$_2$) and (xNbB$_3$, yNbB$_3$).

Output of this process are:
the availability flag of the constructed affine control point motion vector merging candidates availableFlagConstK, with K=1 . . . 6,
the reference indices refIdxLXConstK, with K=1 . . . 6, X being 0 or 1,
the prediction list utilization flags predFlagLXConstK, with K=1 . . . 6, X being 0 or 1,
the affine motion model indices motion ModelIdcConstK, with K=1 . . . 6,
the bi-prediction weight indices bcwIdxConstK, with K=1 . . . 6,
the constructed affine control point motion vectors cpMvLXConstK[cpIdx] with cpIdx=0 . . . 2, K=1 . . . 6 and X being 0 or 1.

. . .

The fourth (collocated bottom-right) control point motion vector cpMvLXCorner[3], reference index refIdxLXCorner[3], prediction list utilization flag predFlagLXCorner[3] and the availability flag availableFlagCorner[3] with X being 0 and 1 are derived as follows:

The reference indices for the temporal merging candidate, refIdxLXCorner[3], with X being 0 or 1, are set equal to 0.

The variables mvLXCol and available FlagLXCol, with X being 0 or 1, are derived as follows:
If slice_temporal_mvp_enabled_flag is equal to 0, both components of mvLXCol are set equal to 0 and availableFlagLXCol is set equal to 0.
Otherwise (slice_temporal_mvp_enabled_flag is equal to 1), the following applies:

xColBr=xCb+cbWidth (8-601)

yColBr=yCb+cbHeight (8-602)

*rightBoundaryPos = subpic treated as pic flag[ SubPicIdx ] ? SubPicRightBoundaryPos : pic_width_in_luma_samples - 1*
*botBoundaryPos = subpic treated as pic flag[ SubPicIdx ] ? SubPicBotBoundaryPos : pic_height_in_luma_samples - 1*
*xColBr = Min (rightBoundaryPos, xColBr)*
*yColBr = Min (botBoundaryPos, yColBr)*

If yCb>>Ctb Log 2SizeY is equal to yColBr>>Ctb Log 2SizeY, [[yColBr is less than pic_height_in_luma_samples and xColBr is less than pic_width_in_luma_samples, the following applies]]:

The variable colCb specifies the luma coding block covering the modified location given by ((xColBr>>3)<<3, (yColBr>>3)<<3) inside the collocated picture specified by ColPic.
The luma location (xColCb, yColCb) is set equal to the top-left sample of the collocated luma coding block specified by colCb relative to the top-left luma sample of the collocated picture specified by ColPic.
The derivation process for collocated motion vectors as specified in clause 8.5.2.12 is invoked with currCb, colCb, (xColCb, yColCb), refIdxLXCorner[3] and sbFlag set equal to 0 as inputs, and the output is assigned to mvLXCol and availableFlagLXCol.
Otherwise, both components of mvLXCol are set equal to 0 and availableFlagLXCol is set equal to 0.

5.3 Embodiment 3: Fetching Integer Samples Under the Sub-Picture Constraint 8.5.6.3.3 Luma Integer Sample Fetching Process Inputs to this process are:
a luma location in full-sample units (xInt$_L$, yInt$_L$),
the luma reference sample array refPicLX$_L$, Output of this process is a predicted luma sample value predSampleLX$_L$ The variable shift is set equal to Max(2, 14−BitDepth$_Y$).
The variable picW is set equal to pic_width_in_luma_samples and the variable picH is set equal to pic_height_in_luma_samples.
The luma locations in full-sample units (xInt, yInt) are derived as follows:

- *If subpic treated as pic flag[ SubPicIdx ] is equal to 1, the following applies:*
  *xInt = Clip3( SubPicLeftBoundaryPos, SubPicRightBoundaryPos, xInt)*
  *yInt = Clip3( SubPicTopBoundaryPos, SubPicBotBoundaryPos, yInt)*
  *Otherwise:* xInt=Clip3(0,picW−1,sps_ref_wraparound_enabled_flag? (8-782)

ClipH((sps_ref_wraparound_offset_minus1+1)*MinCbSizeY,picW,xInt$_L$):xInt$_L$)

yInt=Clip3(0,picH−1,yInt$_L$) (8-783)

The predicted luma sample value predSampleLX$_L$ is derived as follows:

predSampleLX$_L$=refPicLX$_L$[xInt][yInt]<<shift3 (8-784)

5.4 Embodiment 4: Deriving the Variable InvAvgLuma in Chroma Residual Scaling of LMCS 8.7.5.3 Picture Reconstruction with Luma Dependent Chroma Residual Scaling Process for Chroma Samples Inputs to this process are:
a chroma location (xCurr, yCurr) of the top-left chroma sample of the current chroma transform block rehtive to the top-left chroma sample of the current picture,
a variable nCurrSw specifying the chroma transform block width,
a variable nCurrSh specifyingthe chroma transform block height,
a variable tuCbfChroma specifying the coded block flag of the current chroma transform block, an (nCurrSw)×(nCurrSh) array predSamples specifying the chroma prediction samples of the current block, an (nCurrSw)×(nCurrSh) array resSamples specifying the chroma residual samples of the current block, Output of this process is a reconstructed chroma picture sample array recSamples.

The variable sizeY is set equal to Min(CtbSizeY, 64).

The reconstructed chroma picture sample rec Sample s is derived as follows for i=0 . . . nCurrSw−1, j=0 . . . nCurrSh−1:
. . .

Otherwise, the following applies:
. . .

The variable currPic specifies the array of reconstructed luma samples in the current picture.

For the derivation of the variable varScale the following ordered steps apply:

1. The variable inv AvgLuma is derived as follows:
   The array recLuma[i] with i=0 . . . (2*sizeY−1) and the variable cnt are derived as follows:
   The variable cnt is set equal to 0.
   *The variable rightBoundaryPos and botBoundaryPos are derived as follows:*
   *rightBoundaryPos = subpic_treated_as_pic_flag[ SubPicIdx ]?*
   *SubPicRightBoundaryPos*
   *: pic_width_in_luma_samples − 1*
   *botBoundaryPos = subpic_treated_as_pic_flag[ SubPicIdx ]?*
   *SubPicBotBoundaryPos : pic_*
   *height_in_luma_samples − 1*

When availL is equal to TRUE, the array recLuma[i] with i=0 . . . sizeY−1 is set equal to currPic[xCuCb−1][Min(yCuCb+[[pic_height_in_luma_samples−1]] *botBoundaryPos* ] with i=0 . . . sizeY−1, and cnt is set equal to sizeY When availT is equal to TRUE, the array recLuma[cnt+i] with i=0 . . . sizeY−1 is set equal to currPic[Min(xCuCb+i, [[pic_width_in_luma_samples−1]] *rightBoundaryPos* )][yCuCb−1] with i=0 . . . sizeY−1, and cnt is set equal to (cnt+sizeY)

The variable invAvgLuma is derived as follows:
   If cnt is greater than 0, the following applies:

invAvgLuma=Clip1$_Y$(($\Sigma_{k=0}^{cnt-1}$recLuma[k]+(cnt>>1))>>Log 2(cnt))    (8-1013)

Otherwise (cnt is equal to 0), the following applies:

invAvgLuma=1<<(BitDepth$_Y$−1)    (8-1014)

5.5 Embodiment 5: An Example of Defining the Sub-Picture Element in Unit of N (Such as N=8 or 32) Other than 4 Samples 7.4.3.3 Sequence Parameter Set RB SP Semantics
subpic_grid_col_width_minus1 plus 1 specifies the width of each element of the sub-picture identifier grid in units of *4 N* samples. The length of the syntax element is Ceil(Log 2(pic_width_max_in_luma_samples/*4 N* )) bits. The variable NumSubPicGridCols is derived as follows:

Num SubPicGridCols=(pic_width_max_in_luma_samples+subpic_grid_col_width_minus1*[[4+3]] *N + N-1*

*+N-1* )/(subpic_grid_col_width_minus 1*[[4+3]] *N*    (7-5)

subpic_grid_row_height_minus1 plus 1 specifies the height of each element of the sub-picture identifier grid in units of 4 samples. The length of the syntax element is Ceil(Log 2(pic_height_max_in_luma_samples/*4 N* )) bits. The variable NumSubPicGridRows is derived as follows:

NumSubPicGridRows=(pic_height_max_in_luma_samples+subpic_grid_row_height_minus1* *4 N + N-1* /(subpic_grid_row_height_minus1*[[4+3]] *N + N-1* )

7.4.7.1 General Slice Header Semantics
The variables SubPicIdx, Sub PicLeftBoundaryPos, SubPicTopBoundaryPos, SubPicRightBoundaryPos, and SubPicBotBoundaryPos are derived as follows:

SubPicIdx=CtbToSubPicIdx[CtbAddrBsToRs[FirstCtbAddrBs[SliceBrickIdx[0]]]]

if(subpic_treated_as_pic_flag[SubPicIdx]{

SubPicLeftBoundaryPos=SubPicLeft[SubPicIdx]*(subpic_grid_col_width_minus1+1)* *4 N*

SubPicRightBoundaryPos=(SubPicLeft[SubPicIdx]+SubPicWidth[SubPicIdx])*(subpic_grid_col_width_minus1+1)* *4 N*    (7-93)

SubPicTopBoundaryPos=SubPicTop[SubPicIdx]*(subpic_grid_row_height_minus1+1)* *4 N*

SubPicBotBoundary Pos=(SubPicTop[SubPicIdx]+SubPicHeight[SubPicIdx])*(subpic_grid_row_height_minus1+1)* *4N*

}

5.6 Embodiment 6: Restrict the Picture Width and the Picture Height to be Equal or Larger than 8

7.4.3.3 Sequence Parameter Set RBSP Semantics
pic_width_max_in_luma samples specifies the maximum width, in units of luma samples, of each decoded picture referring to the SPS. pic_width_max_in_luma samples shall not be equal to 0 and shall be an integer multiple of [[MinCbSizeY]] *Max(8,MinCbSizeY)*.

pic_height_max_in_luma_samples specifies the maximum height, in units of luma samples, of each decoded picture referring to the SPS. pic_height_max_in_luma_samples shall not be equal to 0 and shall be an integer multiple of [[MinCbSizeY]] *Max(8,MinCbSizeY)*.

5.7 Embodiment 7: Sub-Picture Boundary Check for BT/TT/QT Splitting, BT/TT/QT Depth Derivation, and/or the Signaling of CU Split Flag 6.4.2 Allowed Binary Split Process
The variable allowBtSplit is derived as follows:
. . .
Otherwise, if all of the following conditions are true, allowBtSplit is set equal to FALSE
btSplit is equal to SPLIT_BT_VER
y0+cbHeight is greater than [[pic_height_in_luma_samples]]

*subpic_treated_as_pic_flag[ SubPicIdx ] ?*

*SubPicBotBoundaryPos + 1 : pic_height_in_luma_samples*.

Otherwise, if all of the following conditions are true,
allowBtSplit is set equal to FALSE
btSplit is equal to SPLIT_BT_VER
cbHeight is greater than MaxTbSizeY
x0+cbWidth is greater than [[pic_width_in_luma_samples]] *SubPicRightBoundaryPos + 1*

*SubPicRightBoundaryPos + 1*

*: pic_width_in_luma_samples*

Otherwise, if all of the following conditions are true,
allowBtSplit is set equal to FALSE
btSplit is equal to SPLIT_BT_HOR
cbWidth is greater than MaxTbSizeY
y0+cb Height is greater than [[pic_height_in_luma_samples]]

*subpic_treated_as_pic_flag[SubPicIdx]?*

*SubPicBotBoundaryPos + 1*

*: pic_height_in_luma_samples.*

Otherwise, if all of the following conditions are true,
allowBtSplit is set equal to FALSE
x0+cbWidth is greater than [[pic_width_ini_uma_samples]]
*subpic_treated_as_pic_flag[ SubPicIdx ] ?*

*SubPicRightBoundaryPos + 1 : pic_width_in_luma_samples*
y0+cbHeight is greater than [[pic_height_in_luma_samples]]
*subpic_treated_as_pic_flag[ SubPicIdx ] ?*
*SubPicBotBoundaryPos + 1 : pic_height_in_luma_samples.* cbWidth is greater than m inQtSize
Otherwise, if all of the following conditions are true,
allowBtSplit is set equal to FALSE
btSplit is equal to SPLIT_BT_HOR
x0+cbWidth is greater than [[pic_width_in_luma_samples]]
*subpic_treated_as_pic_flag[ SubPicIdx ] ?*
*SubPicRightBoundaryPos + 1*
*: pic_width_in_luma_samples*
y0+cbHeight is less than or equal to *: pic_width_in_luma_samples*
*subpic_treated_as_pic_flag[ SubPicIdx ] ? SubPicBotBoundaryPos + 1*
*: pic_height_in_luma_samples.*

6.4.2 Allowed Ternary Split Process
The variable allowTtSplit is derived as follows:
If one or more of the following conditions are true, allowTtSplit is set equal to FALSE:
cb Size is less than or equal to 2*MinTtSizeY
cbWidth is greater than Min(MaxTbSizeY, maxTtSize)
cbHeight is greater than Min(MaxTbSizeY, maxTtSize)
mttDepth is greater than or equal to maxMaDepth
x0+cbWidth is greater than [[pic_width_in_luma_samples]]
*subpic_treated_as_pic_flag[ SubPicIdx ] ?*
*SubPicRightBoundaryPos + 1*
*: pic_width_in_luma_samples*
y0+cbHeight is greater than [[pic_height_in_luma_samples]]
*subpic_treated_as_pic_flag[ SubPicIdx ] ?*
*SubPicBotBoundaryPos + 1*
*: pic_height_in_luma_samples*.
tree Type is equal to DUAL_TREE_CHROMA and (cbWidth/SubWidthC)*(cbHeight/SubHeightC) is less than or equal to 32
tree Type is equal to DUAL_TREE_CHROMA and modeType is equal to MODE_TYPE_INTRA
Otherwise, allowTtSplit is set equal to TRUE.
7.3.8.2 Coding Tree Unit Syntax

| | Descriptor |
|---|---|
| dual_tree_implicit_qt_split( x0, y0, cbSize, cqtDepth ) { ...   if( x1 < [[pic_width_in_luma_samples]] *(subpic_treated_as_pic_flag[SubPicIdx]?* *SubPicRightBoundaryPos+1: pic_width_in_luma_samples))*     dual_tree_implicit_qt_split( x1 , y0, cbSize / 2, cqtDepth + 1 )   if( y1 < [[pic_height_in_luma_samples]] *(subpic_treated_as_pic_flag[SubPicIdx]?* *SubPicBotboundaryPos+1: pic_height_in_luma_samples))*     dual_tree_implicit_qt_split( x0, y1, cbSize / 2, cqtDepth + 1 )   if( x1 < [[pic_width_in_luma_samples]] *(subpic_treated_as_pic_flag[SubPicIdx]?* *SubPicRightBoundaryPos+1: pic_width_in_luma_samples) &&* $y1 <$ [[pic_height_in_luma_samples]] *(subpic_treated_as_pic_flag[SubPicIdx]?* *SubPicBotBoundaryPos+1: pic_height_in_luma_samples))*     dual_tree_implicit_qt_split( x1, y1, cbSize / 2, cqtDepth + 1 )   } else { ... } *}* | |

7.3.8.4 Coding Tree Syntax

| | Descriptor |
|---|---|
| coding_tree( x0, y0, cbWidth, cbHeight, qgOnY, qgOnC, cbSubdiv, cqtDepth, mttDepth, depthOffset,<br>        partIdx, treeTypeCurr, modeTypeCurr ) {<br>  if( ( allowSplitBtVer \|\| allowSplitBtHor \|\| allowSplitTtVer \|\| allowSplitTtHor \|\| allowSplitQT<br>)<br>    &&( x0 + cbWidth <= [[pic_width_in_luma_samples]]<br>(*subpic_treated_as_pic_flag[SubPicIdx]?SubPicRightBoundaryPos + 1 :<br>pic_width_in_luma_samples*))<br>    && (y0 + cbHeight <= [[pic_height_in_luma_samples]]<br>*subpic_treated_as_pic_flag[SubPicIdx]?SubPicBotBoundaryPos+<br>1: pic_height_in_luma_samples*))) | |
|     split_cu_flag | ae(v) |
|   if( cu_qp_delta_enabled_flag && qgOnY && cbSubdiv <= cu_qp_delta_subdiv ) {<br>...<br>    depthOffset += ( y0 + cbHeight > [[pic_height_in_luma_samples]]<br>*subpic_treated_as_pic_flag[SubPicIdx]?SubPicBotBoundaryPos+<br>1: pic_height_in_luma_samples*)) ? 1 : 0<br>    y1 = y0 + ( cbHeight / 2 )<br>    coding_tree( x0, y0, cbWidth, cbHeight / 2, qgOnY, qgOnC, cbSubdiv + 1,<br>        cqtDepth, mttDepth + 1, depthOffset, 0, treeType, modeType )<br>    if( y1 < [[pic_height_in_luma_samples]]*(subpic_treated_as_pic_flag[ SubPicIdx]?<br>    SubPicBotBoundaryPos + 1:pic_height_in_luma_samples*))<br>        coding_tree( x0, y1, cbWidth, cbHeight / 2, qgOnY, qgOnC, cbSubdiv + 1,<br>            cqtDepth, mttDepth+1, depthOffset, 1, treeType, modeType )<br>...<br>    if( x1 < [[pic_width_in_luma_samples]]*(subpic_treated_as_pic_flag[SubPicIdx]?<br>    SubpicRightBoundaryPos + 1:pic_width_in_luma_samples*))<br>        coding_tree( x1 , y0, cbWidth / 2, cbHeight / 2, qgOnY, qgOnC, cbSubdiv + 2,<br>            cqtDepth+ 1, 0, 0, 1, treeType, modeType )<br>    if( y1 < [[pic_height_in_luma_samples]]*(subpic_treated_as_pic_flag[SubPicIdx]?<br>    SubPicBotBoundaryPos + 1:pic_height_in_luma_samples*))<br>        coding_tree( x0, y1, cbWidth / 2, cbHeight / 2, qgOnY, qgOnC, cbSubdiv + 2,<br>            cqtDepth+ 1, 0, 0, 2, treeType, modeType )<br>    if( y1 < [[pic_height_in_luma_samples]]*(subpic_treated_as_pic_flag[SubPicIdx]?<br>SubPicBotBoundaryPos + 1:pic_height_in_luma_samples) &&* x1 <<br>[[pic_width_in_luma_samples]]*(subpic_treated_as_pic_flag[SubPicIdx]?<br>SubPicRightBoundaryPos + 1:pic_width_in_luma_samples*))<br>        coding_tree( x1, y1, cbWidth / 2, cbHeight / 2, qgOnY, qgOnC, cbSubdiv + 2,<br>            cqtDepth+ 1, 0, 0, 3, treeType, modeType ) | |

5.8 Embodiment 8: An Example of Defining the Sub-Pictures

| | Descriptor |
|---|---|
| seq_parameter_set_rbsp( ) { | |
|   sps_decoding_parameter_set_id | u(4) |
| ... | |
|   pic_width_max_in_luma_samples | ue(v) |
|   pic_height_max_in_luma_samples | ue(v) |
|   [[subpics_present_flag | u(1) |
|   if( subpics_present_flag ) { | |
|     max_subpics_minus1 | u(8) |
|     subpic_grid_col_width_minus1 | u(v) |
|     subpic_grid_row_height_minus1 | u(v) |
|     for( i = 0; i < NumSubPicGridRows; i++ ) | |
|       for( j = 0; j < NumSubPicGridCols; j++ ) | |
|         subpic_grid_idx[ i ][j ] | u(v) |
|     for( i = 0; i <= NumSubPics; i++ ) { | |
|       subpic_treated_as_pic_flag[ i ] | u(1) |
|       loop_filter_across_subpic_enabled_flag[ i ] | u(1) |
|     } | |
| }]] | |

-continued

| | Descriptor |
|---|---|
| bit_depth_luma_minus8 | ue(v) |
| ... | |
| log2_ctu_size_minus5 | u(2) |
| ... | |
| *subpics_present_flag* | *u(1)* |
| *if( subpics_present_flag ) {* | |
|   *num_subpics_minus1* | *u(8)* |
|   *For( i = 0; i <= num_subpics_minus1 ; i++ ) {* | |
|     *subpic_ctb_addr_x[i]* | *u(8)* |
|     *subpic_ctb_addr_y[i]* | *u(8)* |
|     *subpic_ctb_width_minus1 [i]* | *u(8)* |
|     *subpic_ctb_height_minus1 [i]* | *u(8)* |
|     *subpic_treated_as_pic_flag[i]* | *u(1)* |
|     *loop_filter_across_subpic_enabled_flag[i]* | *u(1)* |
|   *}* | |
| ... | |

5.9 Embodiment 9: An Example of Defining the Sub-Pictures

|  | Descriptor |
|---|---|
| seq_parameter_set_rbsp( ) { | |
|   sps_decoding_parameter_set_id | u(4) |
| ... | |
|   pic_width_max_in_luma_samples | ue(v) |
|   pic_height_max_in_luma_samples | ue(v) |
|   [[subpics_present_flag | u(1) |
|   if( subpics_present_flag) { | |
|     max_subpics_minus1 | u(8) |
|     subpic_grid_col_width_minus1 | u(v) |
|     subpic_grid_row_height_minus1 | u(v) |
|     for( i = 0; i < NumSubPicGridRows; i++ ) | |
|       for( j = 0; j < NumSubPicGridCols; j++ ) | |
|         subpic_grid_idx[ i ][ j ] | u(v) |
|     for( i = 0; i <= NumSubPics; i++ ) { | |
|       subpic_treated_as_pic_flag[ i ] | u(1) |
|       loop_filter_across_subpic_enabled_flag[ i ] | u(1) |
|     } | |
|   }]] | |
|   bit_depth_luma_minus8 | ue(v) |
| ... | |
|   log2_ctu_size_minus5 | u(2) |
| ... | |
|   *subpics_present_flag* | *u(1)* |
|   *if( subpics_present_flag ) {* | |
|     *num_subpics_minus1* | *ue(1)* |
|     *for( i = 0; i <= num_subpics_minus1 ; i++) {* | |
|       *subpic_ctb_addr_x[i]* | *u(8)* |
|       *subpic_ctb_addr_y[i]* | *u(8)* |
|       *subpic_ctb_width_minus1[i]* | *u(8)* |
|       *subpic_ctb_height_minus1[i]* | *u(8)* |
|       *subpic_treated_as_pic_flag[i]* | *u(1)* |
|       *loop_filter_across_subpic_enabled_flag[ i ]* | *u(1)* |
|     } | |
| ... | |

5.10 Embodiment 10: An Example of Defining the Sub-Pictures

|  | Descriptor |
|---|---|
| seq_parameter_set_rbsp( ) { | |
|   sps_decoding_parameter_set_id | u(4) |
| ... | |
|   pic_width_max_in_luma_samples | ue(v) |
|   pic_height_max_in_luma_samples | ue(v) |
|   [[subpics_present_flag | u(1) |
|   if( subpics_present_flag ) { | |
|     max_subpics_minus1 | u(8) |
|     subpic_grid_col_width_minus1 | u(v) |
|     subpic_grid_row_height_minus1 | u(v) |
|     for( i = 0; i < NumSubPicGridRows; i++ ) | |
|       for( j = 0; j < NumSubPicGridCols; j++ ) | |
|         subpic_grid_idx[ i ][ j ] | u(v) |
|     for( i = 0; i <= NumSubPics; i++ ) { | |
|       subpic_treated_as_pic_flag[ i ] | u(1) |
|       loop_filter_across_subpic_enabled_flag[ i ] | u(1) |
|     } | |
|   }]] | |
| ... | |
|   log2_ctu_size_minus5 | u(2) |
| ... | |
|   *subpics_present_flag* | *u(1)* |
|   *if( subpic_present_flag) {* | |
|     *num_subpics_minus2* | *u(v)* |
|     subpic_addr_x_length_minus1 | *ue(v)* |
|     subpic_addr_y_length_minus1 | *ue(v)* |
|     *for( i = 0; i < NumSubPics; i++) {* | |

| | Descriptor |
|---|---|
| subpic_ctb_addr_x[i] | u(v) |
| subpic_ctb_addr_y[i] | u(v) |
| subpic_ctb_width_minus1[i] | u(v) |
| subpic_ctb_height_minus1[i] | u(v) |
| subpic_treated_as_pic_flag[ i ] | u(1) |
| loop_filter_across_subpic_enabled_flag[ i ] | u(1) |
| } | |
| ... | |

5.11 Embodiment 11: An Example of Defining the Sub-Pictures

| | Descriptor |
|---|---|
| seq_parameter_set_rbsp( ) { | |
|   sps_decoding_parameter_set_id | u(4) |
| ... | |
|   pic_width_max_in_luma_samples | ue(v) |
|   pic_height_max_in_luma_samples | ue(v) |
|   [[subpics_present_flag | u(1) |
|   if( subpics_present_flag ) { | |
|     max_subpics_minus1 | u(8) |
|     subpic_grid_col_width_minus1 | u(v) |
|     subpic_grid_row_height_minus1 | u(v) |
|     for( i = 0; i < NumSubPicGridRows; i++ ) | |
|       for( j = 0; j < NumSubPicGridCols; j++ ) | |
|         subpic_grid_idx[ i ][ j ] | u(v) |
|     for( i = 0; i <= NumSubPics; i++ ) { | |
|       subpic_treated_as_pic_flag[ i ] | u(1) |
|       loop_filter_across_subpic_enabled_flag[ i ] | u(1) |
|     } | |
|   }]] | |
| ... | |
|   log2_ctu_size_minus5 | u(2) |
| ... | |
|   <u>subpic_present_flag</u> | <u>u(1)</u> |
|   <u>if(subpics_present_flag){</u> | |
|     <u>num_subpics_minus2</u> | <u>u(v)</u> |
|     <u>subpic_addr_x_length_minus1</u> | <u>ue(v)</u> |
|     <u>subpic_addr_y_length_minus1</u> | <u>ue(v)</u> |
|     <u>*for(i=0; i < NumSubPics;i++){*</u> | |
|       <u>if(i < NumSubPics -1){</u> | |
|         <u>subpic_ctb_addr_x[i]</u> | <u>u(v)</u> |
|         <u>subpic_ctb_addr_y[i]</u> | <u>u(v)</u> |
|         <u>subpic_ctb_width_minus1[i]</u> | <u>u(v)</u> |
|         <u>subpic_ctb_height_minus1[i]</u> | <u>u(v)</u> |
|       <u>*}*</u> | |
|       <u>subpic_treated_as_pic_flag[i]</u> | <u>u(1)</u> |
|       <u>loop_filter_across_subpic_enabled_flag[i]</u> | <u>u(1)</u> |
|     } | |
| ... | |

NumSubPics=Num_Subpics_Minus2+2.

5.12 Embodiment: Deblocking Considering Sub-Pictures

Deblocking Filter Process
General

Inputs to this process are the reconstructed picture prior to deblocking, i.e., the array recPicture$_L$ and, when ChromaArrayType is not equal to 0, the arrays recPicture$_{Cb}$ and recPicture$_{Cr}$.

Outputs of this process are the modified reconstructed picture after deblocking, i.e., the array recPicture$_L$ and, when ChromaArrayType is not equal to 0, the arrays recPicture$_{Cb}$ and recPicture$_{Cr}$.

The vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

NOTE Although the filtering process is specified on a picture basis in this Specification, the filtering process can be implemented on a coding unit basis with an equivalent result, provided the decoder properly accounts for the processing dependency order so as to produce the same output values.

The deblocking filter process is applied to all coding subblock edges and transform block edges of a picture, except the following types of edges:

Edges that are at the boundary of the picture,

[[Edges that coincide with the boundaries of a subpicture for which loop_filter_across_subpic_enabled_flag [SubPicIdx] is equal to 0,]]

Edges that coincide with the virtual boundaries of the picture when pps_loop_filter_across_virtual_boundaries_disabled_flag is equal to 1, Edges that coincide with tile boundaries when loop_filter_across_tiles_enabled_flag is equal to 0, Edges that coincide with slice boundaries when loop_filter_across_slices_enabled_flag is equal to 0, Edges that coincide with upper or left boundaries of slices with slice_deblocking_filter_disabled_flag equal to 1, Edges within slices with slice_deblocking_filter_disabled_flag equal to 1, Edges that do not correspond to 4×4 sample grid boundaries of the luma component, Edges that do not correspond to 8×8 sample grid boundaries of the chroma component, Edges within the luma component for which both sides of the edge have intra_bdpcm_luma_flag equal to 1, Edges within the chroma components for which both sides of the edge have intra_bdpcm_chroma_flag equal to 1, Edges of chroma subblocks that are not edges of the associatedtransform unit.
. . .
Deblocking Filter Process for One Direction
Inputs to this process are:
the variable tree Type specifying whether the luma (DUAL_TREE_LUMA) or chroma components (DUAL_TREE_CHROMA) are currently processed,
when tree Type is equal to DUAL_TREE_LUMA, the reconstructed picture prior to deblocking, i.e., the array recPicture$_L$,
when ChromaArrayType is not equal to 0 and tree Type is equal to DUAL_TREE_CHROMA, the arrays recPicture$_{Cb}$ and recPicture$_{Cr}$,
a variable edge Type specifying whether a vertical (EDGE_VER) or a horizontal (EDGE_HOR) edge is filtered.
Outputs of this process are the m odified reconstructed picture after deblo eking, i.e:
when tree Type is equal to DUAL_TREE_LUMA, the array recPicture$_L$,
when ChromaArrayType is not equal to 0 and tree Type is equal to DUAL_TREE_CHROMA, the arrays recPicture$_{Cb}$ and recPicture$_{Cr}$.
The variables firstCompIdx and lastCompIdx are derived as follows:

$$\text{firstCompIdx} = (\text{treeType}==\text{DUAL\_TREE\_CHROMA})?1:0 \quad (8\text{-}1010)$$

$$\text{lastCompIdx} = (\text{treeType}==\text{DUAL\_TREE\_LUMA}||\text{ChromaArrayType}==0)?0:2 \quad (8\text{-}1011)$$

For each coding unit and each coding blockper colour component of a coding unit indicated by the colour component index cIdx ranging from firstCompIdx to lastCompIdx, inclusive, with coding block width nCbW, coding block heightnCbH and location of top-left sample of the coding block (xCb, yCb), when cIdx is equal to 0, or when cIdx is not equal to 0 and edge Type is equal to EDGE_VER and xCb % 8 is equal 0, or when cIdx is not equal to 0 and edge Type is equal to EDGE_HOR and yCb % 8 is equal to 0, the edges are filtered by the following ordered steps:
2. The variable filter Edge Flag is derived as follows:
If edge Type is equal to EDGE_VER and one or more of the following conditions are true, filter Edge Flag is set equal to 0:
The left boundary of the current coding block is the left boundary of the picture.
[[The left boundary of the current coding block is the left or right boundary of the subpicture and loop_filter_acro ss_subpic_enabledflag[Sub Pic Idx] is equal to 0.]]
The left boundary of the current coding block is the left boundary of the tile and loop_filter_across_tiles_enabledflag is equal to 0.
The left boundary of the current coding block is the left boundary of the slice and loop_filter_across_slices_enabled_flag is equal to 0.
The left boundary of the current coding block is one of the vertical virtual boundaries of the picture and VirtualBoundariesDisabledFlag is equal to 1.
Otherwise, if edge Type is equal to EDGE_HOR and one or more of the following conditions are true, the variable filter EdgeFlag is set equal to 0:
The top boundary of the current luma coding block is the top boundary of the picture.
[[The top boundary of the current coding block is the top or bottom boundary of the subpicture and loop_filter_across_subpic_enabled_flag[SubPicIdx] is equal to 0.]]
The top boundary of the current coding block is the top boundary of the tile and loop_filter_acro ss_tiles_enabled_flag is equal to 0.
The top boundary of the current coding block is the top boundary of the slice and loop_filter_across_slices_enabled_flag is equal to 0.
The top boundary of the current coding block is one of the horizontal virtual boundaries of the picture and VirtualBoundariesDisabledFlag is equal to 1.
Otherwise, filter EdgeFlag is set equal to 1.
. . .
Filtering Process for a Luma Sample Using Short Filters
Inputs to this process are:
the sample values $p_i$ and $q_i$ with i=0 . . . 3,
the locations of $p_i$ and $(xP_i, yP_i)$ and $(xQ_i, yQ_i)$ with i=0 . . . 2,
a variable dE,
the variables dEp and dEq containing decisions to filter samples p1 and q1, respectively,
a variable $t_C$.
Outputs of this process are:
the number of filtered samples nDp and nDq,
the filtered sample values $p_i'$ and $q_j'$ with i=0 . . . nDp−1, j=0 . . . nDq−1.
Depending on the value of dE, the following applies:
If the variable dE is equal to 2, nDp and nDq are both set equal to 3 and the following strong filtering applies:

$$p_0'=\text{Clip3}(p_{0-3}*t_C,p_{0+3}*t_C,(p_{2+2}*p_{1+2}*p_{0+2}*q_0+q_{1+4})>>3) \quad (8\text{-}1150)$$

$$p_1'=\text{Clip3}(p_{1-2}*t_C,p_{1+2}*t_C,(p_2+p_1+p_0+q_{0+2}))>>2) \quad (8\text{-}1151)$$

$$p_2'=\text{Clip3}(p_{2-1}*t_C,p_{2+1}*t_C,(2*p_{3+3}*p_2+p_1+p_0+q_{0+4})>>3) \quad (8\text{-}1152)$$

$$q_0'=\text{Clip3}(g0-3*t_C,+3*t_C,(p_1+2*p_0+2*q_0+2*q_1+q_2+4)>>3) \quad (8\text{-}1153)$$

$$q_1'=\text{Clip3}(q_1-2*t_C,q_1+2*t_C,(P0+g0+q_1+q_{2+2})>>2) \quad (8\text{-}1154)$$

$$q_2'=\text{Clip3}(q_{2-1}*t_C,q_{2+1}*t_C,(p_0+q_0++3*q_{2+2}*q_{3+4})>>3) \quad (8\text{-}1155)$$

Otherwise, nDp and nDq are set both equal to 0 and the following weak filtering applies:
The following applies:

$$\Delta=(9*(q_0-p_0)-3*(q_1-p_1)+8)>>4 \quad (8\text{-}1156)$$

When Abs(Δ) is less than$_C$*10, the following ordered steps apply:
The filtered sample values $p_0'$ and $q_0'$ are specified as follows:

$$\Delta=\text{Clip3}(-t_C,t_C,\Delta) \quad (8\text{-}1157)$$

$$p_0'=\text{Clip1}(p_0+\Delta) \quad (8\text{-}1158)$$

$$q_0'=\text{Clip1}(q_0-\Delta) \quad (8\text{-}1159)$$

When dEp is equal to 1, the filtered sample value $p_1'$ is specified as follows:

$$\Delta p=\text{Clip3}(-(t_C>>1),t_C>>1,(((p_2+p_0+1)>>1)-p_1+\Delta)>>1) \quad (8\text{-}1160)$$

$$p_1'=\text{Clip1}(p_1+\Delta p) \quad (8\text{-}1161)$$

When dEq is equal to 1, the filtered sample value $q_1'$ is specified as follows:

$$\Delta q = \text{Clip3}((t_C \gg 1), t_C \gg 1, (((q_2+q_0+1) \gg 1) - q_1 - \Delta) \gg 1) \quad (8\text{-}1162)$$

$$q_1' = \text{Clip1}(q_1 + \Delta q) \quad (8\text{-}1163)$$

nDp is set equal to dEp+1 and nDq is set equal to dEq+1.
When nDp is greater than 0 and pred_mode_plt_flag of the coding unit that includes the coding block containing the sample $p_0$ is equal to 1, nDp is set equal to 0
When nDq is greater than 0 and pred_mode_plt_flag of the coding unit that includes the coding block containing the sample $q_0$ is equal to 1, nDq is set equal to 0

<u>When nDp is greater than 0 and loop_filter_across_subpic_enabled_flag[ subPicIdxP ] is equal to 0, nDp is set equal to 0, wherein subPicIdxP is the subpicture index of the subpicture containing the sample $p_0$.</u>

<u>When nDq is greater than 0 and loop_filter_across_subpic_enabled_flag[ subPicIdxQ ] is equal to 0, nDq is set equal to 0, wherein subPicIdxQ is the subpicture index of the subpicture containing the sample $q_0$.</u>

Filtering Process for a Luma Sample Using Long Filters
Inputs to this process are:
the variables maxFilterLengthP and maxFilterLengthQ,
the sample values $p_i$ and $q_j$ with i=0 . . . maxFilterLengthP and j=0 . . . maxFilterLengthQ,
the locations of $p_i$ and $q_j$, $(xP_i, yP_i)$ and $(xQ_j, yQ_j)$ with i=0 . . . maxFilterLengthP-1 and j=0 . . . maxFilterLengthQ-1,
a variable $t_C$.
Outputs of this process are:
the filtered sample values $p_i'$ and $q_j'$ with i=0 . . . maxFilterLengthP-1, j=0 . . . maxFilterLenghtQ-1.
The variable refMiddle is derived as follows:
If maxFilterLengthP is equal to maxFilterLengthQ and maxFilterLengthP is equal to 5, the following applies:

$$\text{refMiddle}=(p_4+p_3+2*(p_2+p_1+p_0+q_0+q_1+q_2)+q_3+q_4+8) \gg 4 \quad (8\text{-}1164)$$

Otherwise, if maxFilterLengthP is equal to maxFilterLengthQ and maxFilterLengthP is not equal to 5, the following applies:

$$\text{refMiddle}=(p_6+p_5+p_4+p_3+p_2+p_1+2*(p_0+q_0)+q_1+q_2+q_3+q_4+q_5+q_6+8) \gg 4 \quad (8\text{-}1165)$$

Otherwise, if one of the following conditions are true,
maxFilterLengthQ is equal to 7 and maxFilterLengthP is equal to 5,
maxFilterLengthQ is equal to 5 and maxFilterLengthP is equal to 7, the following applies:

$$\text{refMiddle}=(p_5+p_4+p_3+p_2+2*(p_1+p_0+q_0+q_1)+q_2+q_3+q_4+q_5+8) \gg 4 \quad (8\text{-}1166)$$

Otherwise, if one of the following conditions are true, maxFilterLengthQ is equal to 5 and maxFilterLengthP is equal to 3, maxFilterLengthQ is equal to 3 and maxFilterLengthP is equal to 5, the following applies:

$$\text{refMiddle}=(p_3+p_2+p_1+p_0+q_0++q_2+q_3+4) \gg 3 \quad (8\text{-}1167)$$

Otherwise, if maxFilterLengthQ is equal to 7 and maxFilterLengthP is equal to 3, the following applies:

$$\text{refMiddle}=(2*(p_2+p_1+p_0+g_0)+p_0+p_1++q_2+q_3+q_4+q_5+q_{6+8}) \gg 4 \quad (8\text{-}1168)$$

Otherwise, the following applies:

$$\text{refMiddle}=(p_6+p_5+p_4+p_3+p_2+p_1+2*(q_2+q_1+q_0+p_0)+q_0+q_1+8) \gg 4 \quad (8\text{-}1169)$$

The variables refP and refQ are derived as follows:

$$\text{refP}=(p_{maxFilterLengthP}+p_{maxFilterLengthP-1}+1) \gg 1 \quad (8\text{-}1179)$$

$$\text{refQ}=(q_{maxFilterLengthQ}+q_{maxFilterLengthQ-1}+1) \gg 1 \quad (8\text{-}1171)$$

The variables $f_i$ and $t_C PD_i$ are defined as follows:
If maxFilterLengthP is equal to 7, the following applies:

$$f_{0\ldots 6}=\{59,50,41,32,23,14,5\} \quad (8\text{-}1172)$$

$$t_C PD_{0\ldots 6}=\{6,5,4,3,2,1,1\} \quad (8\text{-}1173)$$

Otherwise, if maxFilterLengthP is equal to 5, the following applies:

$$f_{0\ldots 4}=\{58,45,32,19,6\} \quad (8\text{-}1174)$$

$$t_C PD_{0\ldots 4}=\{6,5,4,3,2\} \quad (8\text{-}1175)$$

Otherwise, the following applies:

$$f_{0\ldots 2}=\{53,32,11\} \quad (8\text{-}1176)$$

$$t_C PD_{0\ldots 2}=\{6,4,2\} \quad (8\text{-}1177)$$

The variables $g_j$ and $t_C QD_j$ are defined as follows:
If maxFilterLengthQ is equal to 7, the following applies:

$$g_{0\ldots 6}=\{59,50,41,32,23,14,5\} \quad (8\text{-}1178)$$

$$t_C QD_{0\ldots 6}=\{6,5,4,3,2,1,1\} \quad (8\text{-}1179)$$

Otherwise, if maxFilterLengthQ is equal to 5, the following applies:

$$g_{0\ldots 4}=\{58,45,32,19,6\} \quad (8\text{-}1180)$$

$$t_C QD_{0\ldots 4}=\{6,5,4,3,2\} \quad (8\text{-}1181)$$

Otherwise, the following applies:

$$g_{0\ldots 2}=\{53,32,11\} \quad (8\text{-}1182)$$

$$t_C QD_{0\ldots 2}=\{6,4,2\} \quad (8\text{-}1183)$$

The filtered sample values $p_i'$ and $q_j'$ with i=0 . . . maxFilterLengthP-1 and j=0 . . . maxFilterLengthQ-1 are derived as follows:

$$p_i'=\text{Clip3}(p_i-(t_C*t_C PD_i) \gg 1, p_i+(t_C*t_C PD_i) \gg 1, (\text{refMiddle}*f_i+\text{refP}*(64-f_i)+32) \gg 6) \quad (8\text{-}1184)$$

$$q_j'=\text{Clip3}(q_j-(t_C*t_C QD_j) \gg 1, q_j+(t_C*t_C QD_j) \gg 1, (\text{refMiddle}*g_j+\text{refQ}*(64-g_j)+32) \gg 6) \quad (8\text{-}1185)$$

When pred_mode_plt_flag of the coding unit that includes the coding block containing the sample $p_i$ is equal to 1, the filtered sample value, $p_i'$ is substituted by the corresponding input sample value $p_i$ with i=0 . . . maxFilterLengthP-1.
When pred_mode_plt_flag of the coding unit that includes the coding block containing the sample $q_i$ is equal to 1, the filtered sample value, $q_i'$ is substituted by the corresponding input sample value $q_j$ with j=0 . . . maxFilterLengthQ-1.

*When loop_filter_across_subpic_enabled_flag[subPicIdxP] is equal to 0, wherein subPicIdxP is the subpicture index of the subpicture containing the sample $p_0$, the filtered sample value, $p_i'$ is substituted by the corresponding input sample value $p_i$ with $i = 0..maxFilterLengthP - 1$.*

*When loop_filter_across_subpic_enabled_flag[subPicIdxQ] is equal to 0, wherein subPicIdxQ is the subpicture index of the subpicture $q_j$ with $j = 0..maxFilterLengthQ - 1$. sample value, $q_i'$ is substituted by the corresponding input sample value containing the sample $q_0$, the filtered*

Filtering Process for a Chroma Sample

This process is only invoked when ChromaArrayType is not equal to 0.

Inputs to this process are:
the variable maxFilterLength,
the chroma sample values $p_i$ and $q_i$ with $i=0 \ldots$ maxFilterLengthCbCr,
the chroma locations of $p_i$ and $q_i$, ($xP_i$, $yP_i$) and ($xQ_i$, $yQ_i$) with $i=0 \ldots$ maxFilterLengthCbCr−1,
a variable $t_C$.

Outputs of this process are the filtered sample values $p_i'$ and $q_i'$ with $i=0 \ldots$ maxFilterLengthCbCr−1.

The filtered sample values $p_i'$ and $q_i'$ with $i=0 \ldots$ maxFilterLengthCbCr−1 are derived as follows:

If maxFilterLengthCbCr is equal to 3, the following strong filtering applies:

$$p_0'=\text{Clip3}(p_0-t_C,p_0+t_C,(p_3+p_2+p_{1+2}*p_0+g0+q_1+q_{2+4})>>3) \quad (8\text{-}1186)$$

$$p_1'=\text{Clip3}(p_1-t_C,p_1+t_C,(2*p_3+p_{2+2}*p_1+p_0+q_0+q_1+4)>>3) \quad (8\text{-}1187)$$

$$p_2'=\text{Clip3}(p_2-t_C,p_2+t_C,(3*p_{3+2}*p_2+p_1+p_0+q_0+4)>>3) \quad (8\text{-}1188)$$

$$q_0'=\text{Clip3}(q_0-t_C,q_0+t_C,(p_2+p_1+p_0+2*q_0+q_1+q_2+q_{3+4})>>3) \quad (8\text{-}1189)$$

$$q_1'=\text{Clip3}(q_1-t_C,q_1+t_C,(p_1+p_0+q_0+2*q_1+q_{2+2}*q_{3+4})>>3)(8\text{-}1190)$$

$$q_2'=\text{Clip3}(q_2-t_C,q_2+t_C,(p_0+g0+q_1+2*q_{2+3}*q_{3+4})>>3) \quad (8\text{-}1191)$$

Otherwise, the following weak filtering applies:

$$\Delta=\text{Clip3}(t_C,t_C,((((g_0-p_0)<<2)+p_1-q_1+4)>>3)) \quad (8\text{-}1192)$$

$$p_0'=\text{Clip1}(p_0+\Delta) \quad (8\text{-}1193)$$

$$q_0'=\text{Clip1}(q_0-\Delta) \quad (8\text{-}1194)$$

When pred_mode_plt_flag of the coding unit that includes the coding block containing the sample $p_i$ is equal to 1, the filtered sample value, $p_i'$ is substituted by the corresponding input sample value $p_i$ with $i=0 \ldots$ maxFilterLengthCbCr−1.

When pred_mode_plt_flag of the coding unit that includes the coding block containing the sample $q_i$ is equal to 1, the filtered sample value, $q_i'$ is substituted by the corresponding input sample value $q_i$ with $i=0 \ldots$ maxFilterLengthCbCr−1:

*When loop_filter_across_subpic_enabled_flag[subPicIdxP] is equal to 0, wherein subPicIdxP is the subpicture index of the subpicture containing the sample $p_0$, the filtered sample value, $p_i'$ is substituted by the corresponding input sample value $p_i$ with $i = 0.. maxFilterLengthCbCr - 1$.*

*When loop_filter_across_subpic_enabled_flag[subPicIdxQ] is equal to 0, wherein subPicIdxQ is the subpicture index of the subpicture containing the sample $q_0$, the filtered sample value, $q_i'$ is substituted by the corresponding input sample value $q_i$ with $i = 0..maxFilterLengthCbCr - 1$:*

Figure 3:
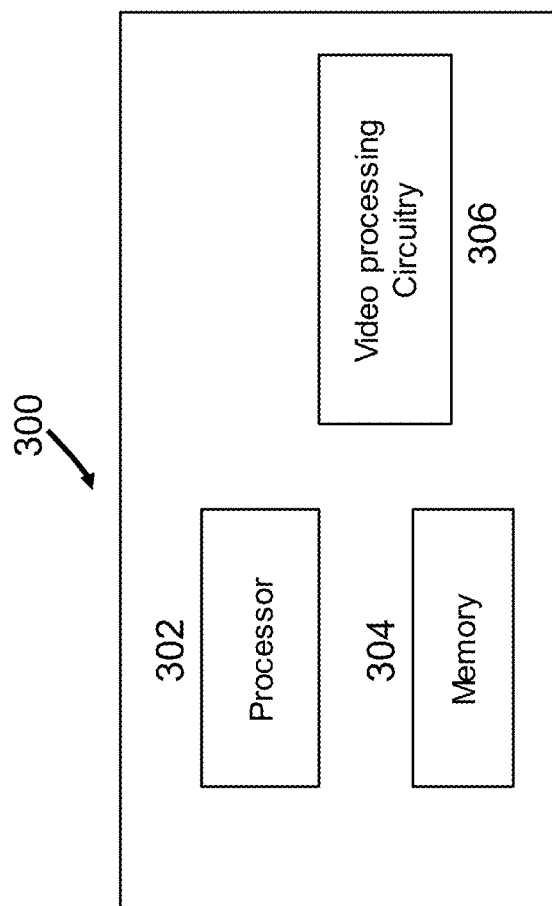
FIG. 3 is a block diagram of an example of a hardware platform used for implementing techniques described in the present document.

FIG. 3 is a block diagram of a video processing apparatus 300. The apparatus 300 may be used to implement one or more of the methods described herein. The apparatus 300 may be embodied in a smartphone, tablet, computer, Internet of Things (IoT) receiver, and so on. The apparatus 300 may include one or more processors 312, one or more memories 314 and video processing hardware 316. The processor(s) 312 may be configured to implement one or more methods described in the present document. The memory (memories) 314 may be used for storing data and code used for implementing the methods and techniques described herein. The video processing hardware 316 may be used to implement, in hardware circuitry, some techniques described in the present document.

Figure 4:
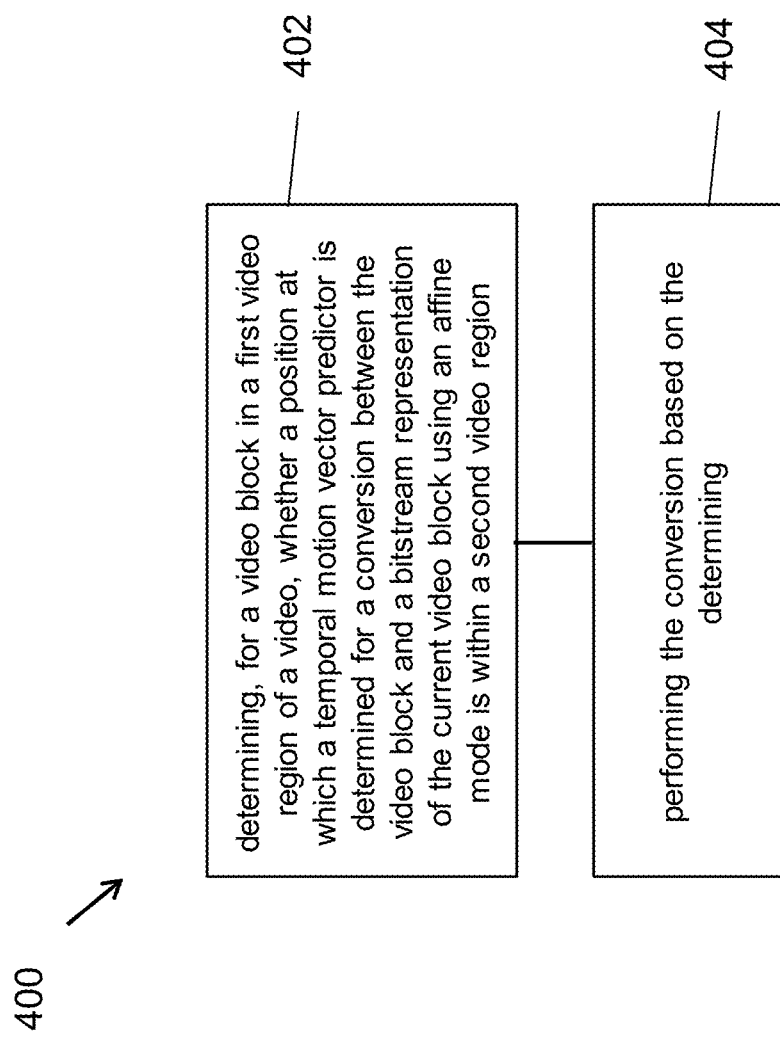
FIG. 4 is a flowchart for an example method of video processing.

FIG. 4 is a flowchart for a method 400 of processing a video. The method 400 includes determining (402), for a video block in a first video region of a video, whether a position at which a temporal motion vector predictor is determined for a conversion between the video block and a bitstream representation of the current video block using an affine mode is within a second video region, and performing (404) the conversion based on the determining.

The following solutions may be implemented as preferred solutions in some embodiments.

The following solutions may be implemented together with additional techniques described in items listed in the previous section (e.g., item 1).

1. A method of video processing, comprising: determining, for a video block in a first video region of a video, whether a position at which a temporal motion vector predictor is determined for a conversion between the video block and a bitstream representation of the current video block using an affine mode is within a second video region; and performing the conversion based on the determining.

2. The method of solution 1, wherein the video block is covered by the first region and the second region.

3. The method of any of solutions 1-2, wherein, in case that the position of the temporal motion vector predictor is outside of the second video region, then the temporal motion vector predictor is marked as unavailable and is unused in the conversion.

The following solutions may be implemented together with additional techniques described in items listed in the previous section (e.g., item 2).

4. A method of video processing, comprising: determining, for a video block in a first video region of a video, whether a position at which an integer sample in a reference picture is fetched for a conversion between the video block and a bitstream representation of the current video block is within a second video region, wherein the reference picture is not used in an interpolation process during the conversion; and performing the conversion based on the determining.

5. The method of solution 4, wherein the video block is covered by the first region and the second region.

6. The method of any of solutions 4-5, wherein, in case that the position of the sample is outside of the second video region, then the sample is marked as unavailable and is unused in the conversion.

The following solutions may be implemented together with additional techniques described in items listed in the previous section (e.g., item 3).

7. A method of video processing, comprising: determining, for a video block in a first video region of a video, whether a position at which a reconstructed luma sample value is fetched for a conversion between the video block and a bitstream representation of the current video block is within a second video region; and performing the conversion based on the determining.

8. The method of solution 7, wherein the luma sample is covered by the first region and the second region.

9. The method of any of solutions 7-8, wherein, in case that the position of the luma sample is outside of the second video region, then the luma sample is marked as unavailable and is unused in the conversion.

The following solutions may be implemented together with additional techniques described in items listed in the previous section (e.g., item 4).

10. A method of video processing, comprising: determining, for a video block in a first video region of a video, whether a position at which a check regarding splitting, depth derivation or split flag signaling for the video block is performed during a conversion between the video block and a bitstream representation of the current video block is within a second video region; and performing the conversion based on the determining.

11. The method of solution 10, wherein the position is covered by the first region and the second region.

12. The method of any of solutions 10-11, wherein, in case that the position is outside of the second video region, then the luma sample is marked as unavailable and is unused in the conversion.

The following solutions may be implemented together with additional techniques described in items listed in the previous section (e.g., item 8).

13. A method of video processing, comprising: performing a conversion between a video comprising one or more video pictures comprising one or more video blocks, and a coded representation of the video, wherein the coded representation complies with a coding syntax requirement that the conversion is not to use sub-picture coding/decoding and a dynamic resolution conversion coding/decoding tool or a reference picture resampling tool within a video unit.

14. The method of solution 13, wherein the video unit corresponds to a sequence of the one or more video pictures.

15. The method of any of solutions 13-14, wherein the dynamic resolution conversion coding/decoding tool comprises an adaptive resolution conversion coding/decoding tool.

16. The method of any of solutions 13-14, wherein the dynamic resolution conversion coding/decoding tool comprises a dynamic resolution conversion coding/decoding tool.

17. The method of any of solutions 13-16, wherein the coded representation indicates that the video unit complies with the coding syntax requirement.

18. The method of solution 17, wherein the coded representation indicates that the video unit uses sub-picture coding.

19. The method of solution 17, wherein the coded representation indicates that the video unit uses the dynamic resolution conversion coding/decoding tool or the reference picture resampling tool.

The following solutions may be implemented together with additional techniques described in items listed in the previous section (e.g., item 10).

20. The method of any of solutions 1-19, wherein the second video region comprises a video sub-picture and wherein boundaries of the second video region and another video region is also a boundary between two coding tree units.

21. The method of any of solutions 1-19, wherein the second video region comprises a video sub-picture and wherein boundaries of the second video region and another video region is also a boundary between two coding tree units.

The following solutions may be implemented together with additional techniques described in items listed in the previous section (e.g., item 11).

22. The method of any of solutions 1-21, wherein the first video region and the second video region have rectangular shapes.

The following solutions may be implemented together with additional techniques described in items listed in the previous section (e.g., item 12).

23. The method of any of solutions 1-22, wherein the first video region and the second video region are non-overlapping.

The following solutions may be implemented together with additional techniques described in items listed in the previous section (e.g., item 13).

24. The method of any of solutions 1-23, wherein the video picture is divided into video regions such that a pixel in the video picture is covered by one and only one video region.

The following solutions may be implemented together with additional techniques described in items listed in the previous section (e.g., item 15).

25. The method of any of solutions 1-24, wherein the video picture is split into the first video region and the second video region due to the video picture being in a specific layer of the video sequence.

The following solutions may be implemented together with additional techniques described in items listed in the previous section (e.g., item 10).

26. A method of video processing, comprising: performing a conversion between a video comprising one or more video pictures comprising one or more video blocks, and a coded representation of the video, wherein the coded representation complies with a coding syntax requirement that a first syntax element subpic_grid_idx[i][j] is not larger than a second syntax element max_subpics_minus1.

27. The method of solution 26, wherein a codeword representing the first syntax element is not larger than a codeword representing the second syntax element.

28. The method of any of solutions 1-27, wherein the first video region comprises a video sub-picture.

29. The method of any of solutions 1-28, wherein the second video region comprises a video sub-picture.

30. The method of any of solutions 1 to 29, wherein the conversion comprises encoding the video into the coded representation.

31. The method of any of solutions 1 to 29, wherein the conversion comprises decoding the coded representation to generate pixel values of the video.

32. A video decoding apparatus comprising a processor configured to implement a method recited in one or more of solutions 1 to 31.

33. A video encoding apparatus comprising a processor configured to implement a method recited in one or more of solutions 1 to 31.

34. A computer program product having computer code stored thereon, the code, when executed by a processor, causes the processor to implement a method recited in any of solutions 1 to 31.

35. A method, apparatus or system described in the present document.

Figure 8:
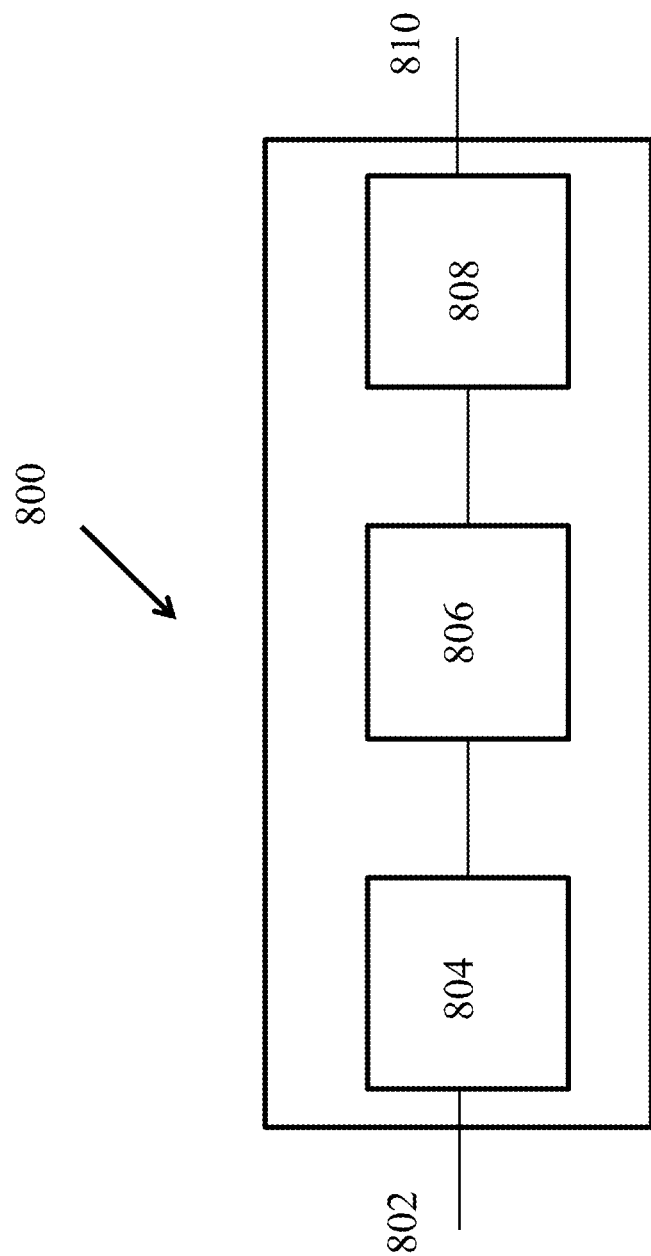
FIG. 8 is a block diagram showing an example video processing system in which various techniques disclosed herein may be implemented.

FIG. 8 is a block diagram showing an example video processing system 800 in which various techniques disclosed herein may be implemented. Various implementations may include some or all of the components of the system 800. The system 800 may include input 802 for receiving video content. The video content may be received in a raw or uncompressed format, e.g., 8 or 10 bit multi-component pixel values, or may be in a compressed or encoded format. The input 802 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 800 may include a coding component 804 that may implement the various coding or encoding methods described in the present document. The coding component 804 may reduce the average bitrate of video from the input 802 to the output of the coding component 804 to produce a coded representation of the video. The coding techniques are therefore sometimes called video compression or video transcoding techniques. The output of the coding component 804 may be either stored, or transmitted via a communication connected, as represented by the component 806. The stored or communicated bitstream (or coded) representation of the video received at the input 802 may be used by the component 808 for generating pixel values or displayable video that is sent to a display interface 810. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 9:
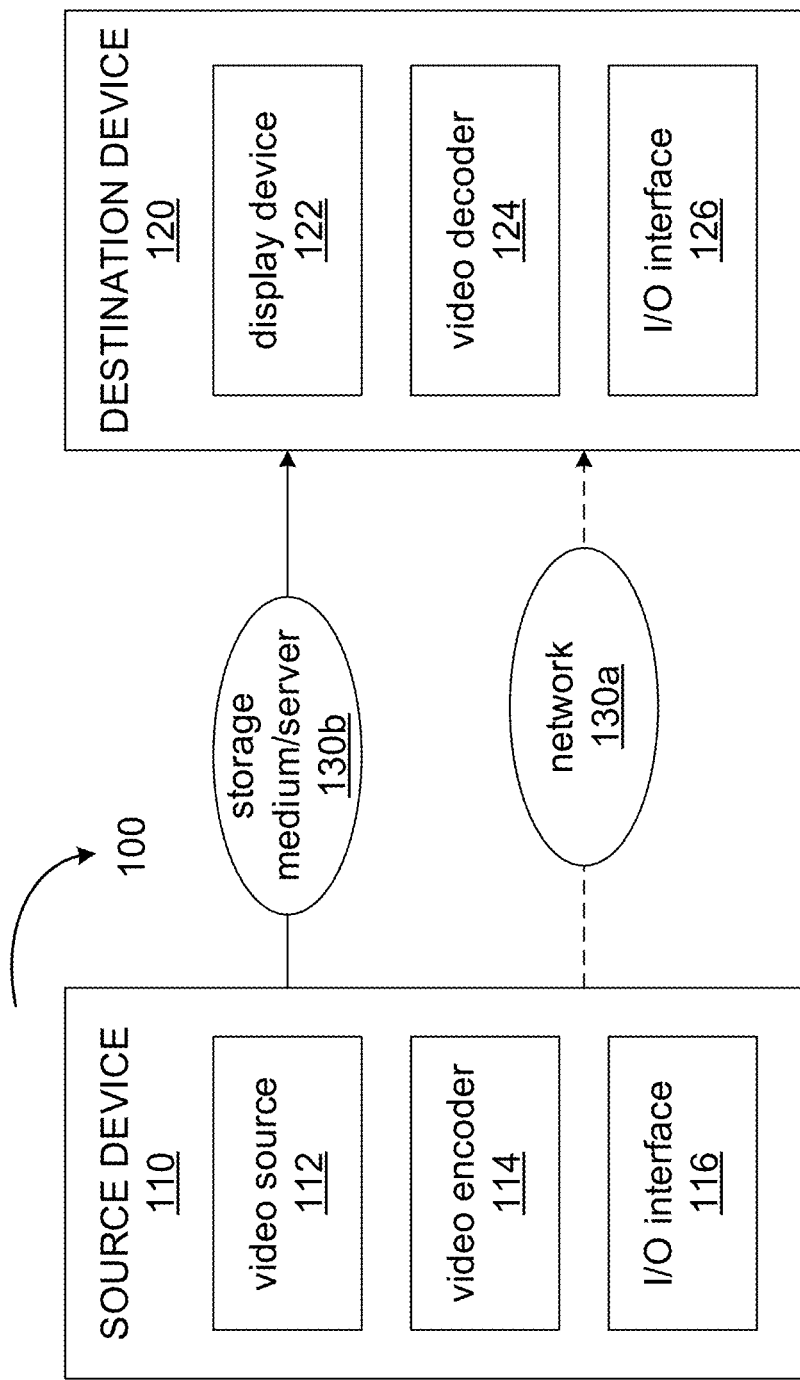
FIG. 9 is a block diagram that illustrates an example video coding system.

FIG. 9 is a block diagram that illustrates an example video coding system 100 that may utilize the techniques of this disclosure.

As shown in FIG. 9, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 10:
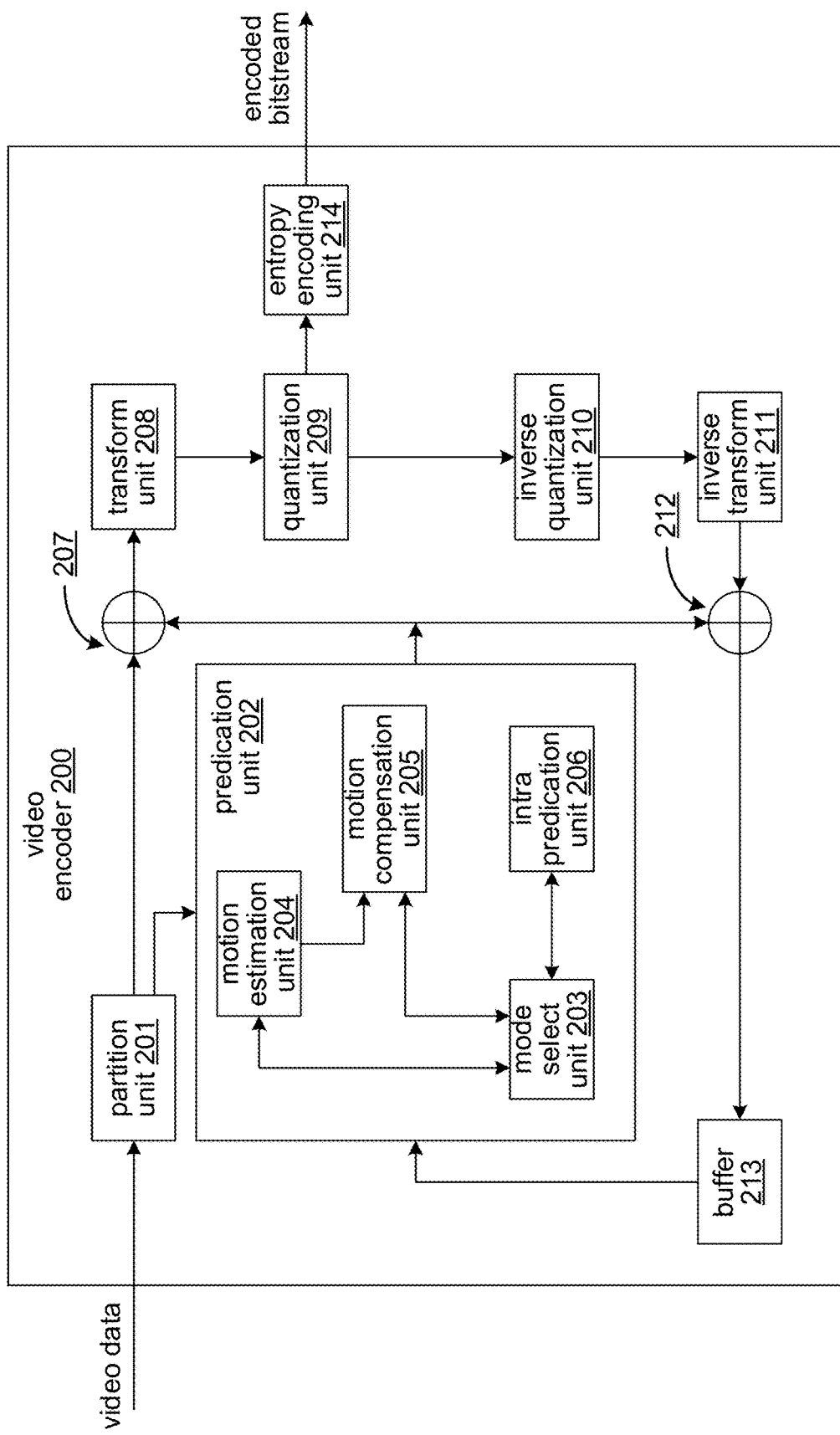
FIG. 10 is a block diagram that illustrates an encoder in accordance with some embodiments of the present disclosure.

FIG. 10 is a block diagram illustrating an example of video encoder 200, which may be video encoder 114 in the system 100 illustrated in FIG. 9.

Video encoder 200 may be configured to perform any or all of the techniques of this disclosure. In the example of FIG. 10, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 5 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 11:
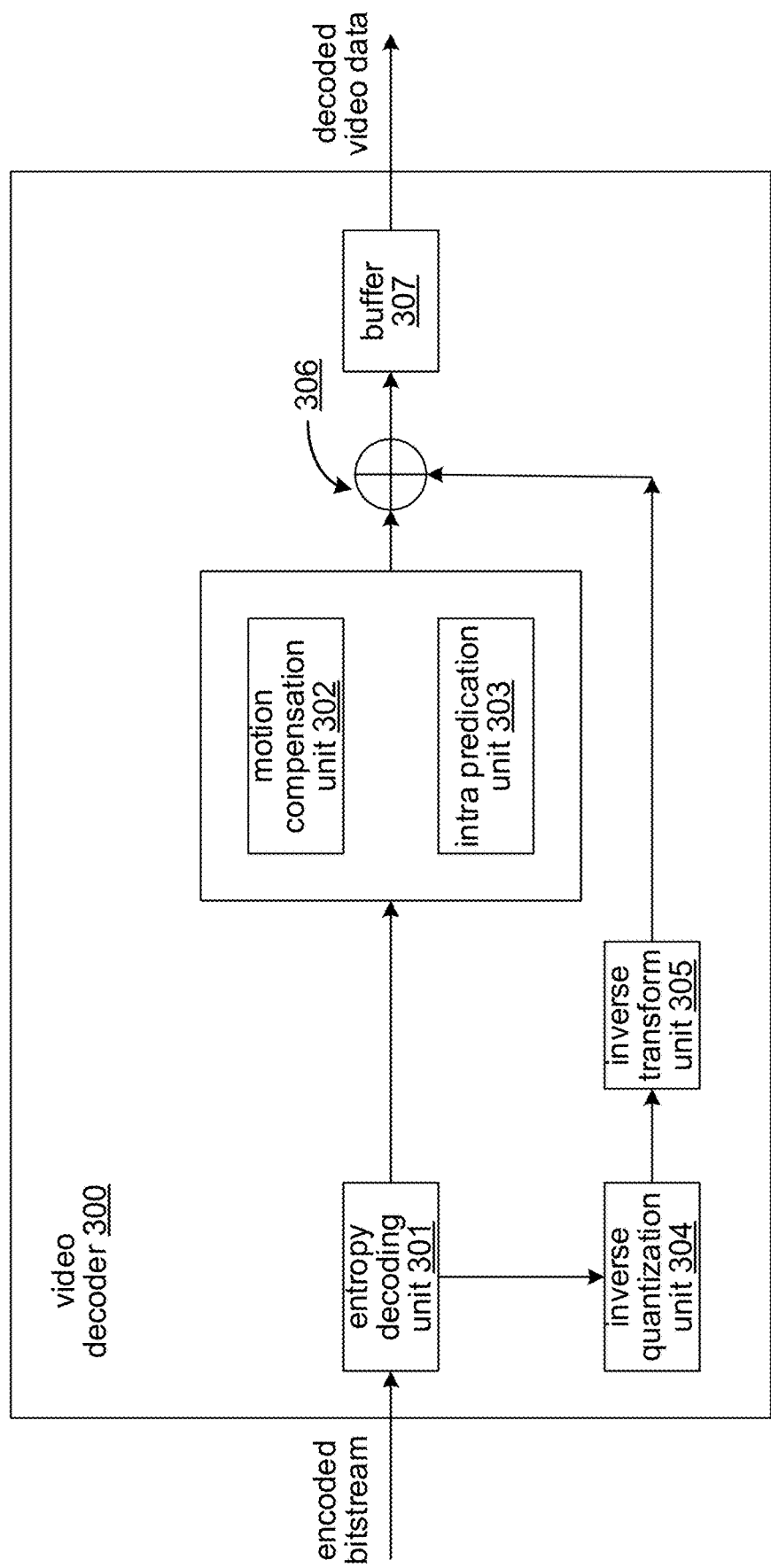
FIG. 11 is a block diagram that illustrates a decoder in accordance with some embodiments of the present disclosure.

FIG. 11 is a block diagram illustrating an example of video decoder 300 which may be video decoder 114 in the system 100 illustrated in FIG. 9.

The video decoder 300 may be configured to perform any or all of the techniques of this disclosure. In the example of FIG. 11, the video decoder 300 includes a plurality of functional components. The techniques described in this disclosure may be shared among the various components of the video decoder 300. In some examples, a processor may be configured to perform any or all of the techniques described in this disclosure.

In the example of FIG. 11, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (e.g., FIG. 10).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

Figure 12:
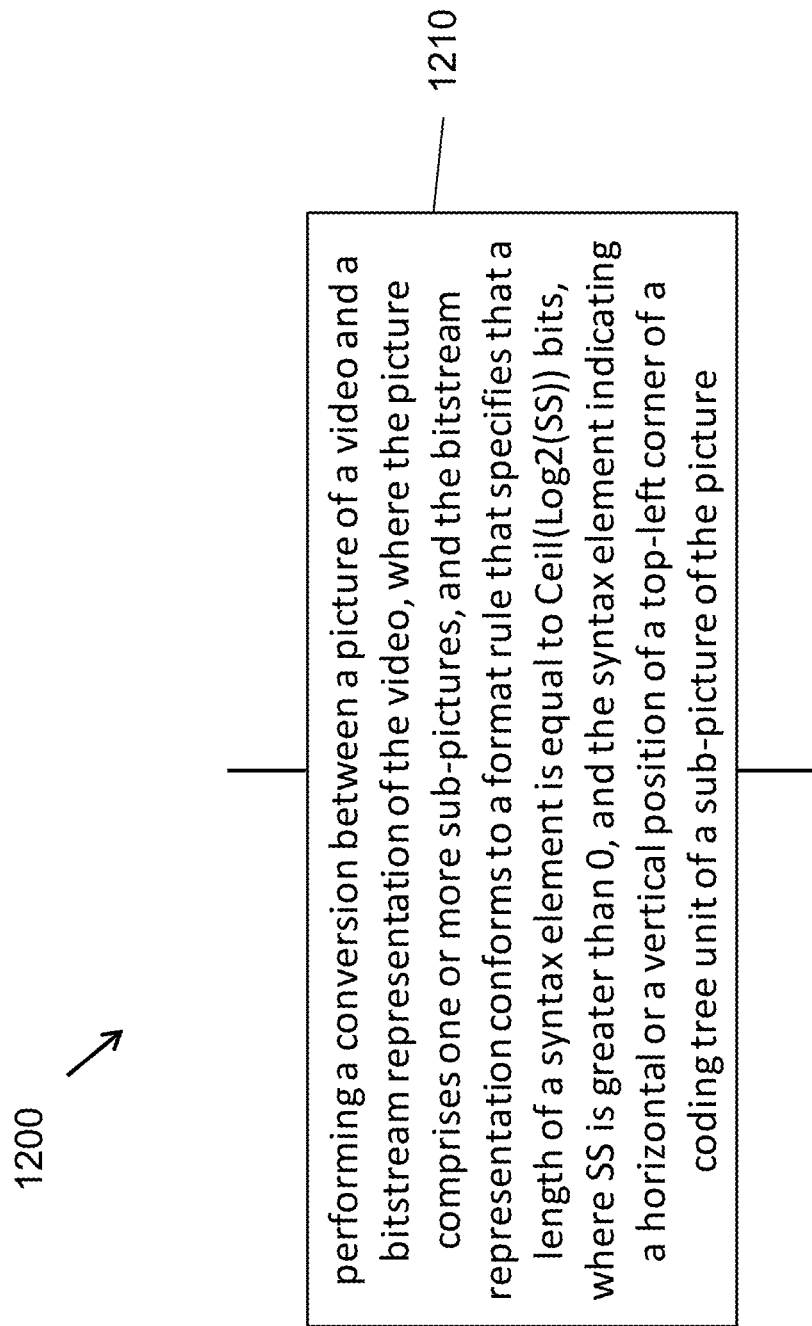
FIG. 12 is a flowchart representation of a method for video processing in accordance with the present technology.

FIG. 12 is a flowchart representation of a method for video processing in accordance with the present technology. The method 1200 includes, at operation 1210, performing a conversion between a picture of a video and a bitstream representation of the video. The picture comprises one or more sub-pictures, and the bitstream representation conforms to a format rule that specifies that a length of a syntax element is equal to Ceil(Log 2(SS)) bits. SS is greater than 0, and the syntax element indicating a horizontal or a vertical position of a top-left corner of a coding tree unit of a sub-picture of the picture.

In some embodiments, the format rule further specifies that a default value of a length of a second syntax element is equal to Ceil(Log 2(SS))−P, where SS is greater than 0. The second syntax element indicating a default width or a default height of a sub-picture of the picture. In some embodiments, a maximum picture width in luma samples is represented as pic_width_max_in_luma _samples and a dimension of a coding tree block is represented as CtbSizeY. SS is equal to (pic_width_max_in_luma _samples+RR)/CtbSizeY in case the syntax element specifies the horizontal position of the top-left corner of the coding tree unit or the default width of the sub-picture, RR being a non-zero integer. In some embodiments, a maximum picture height in luma samples is represented as pic_height_max _in_ luma _samples and a dimension of a coding tree block is represented as CtbSizeY. SS is equal to (pic_height_ max _in_luma _samples+RR)/CtbSizeY in case the syntax element specifies the vertical position of the top-left corner of the coding tree unit or the default height of the sub-picture, RR being a non-zero integer. In some embodiments, RR=Ctb SizeY−1.

Figure 13:
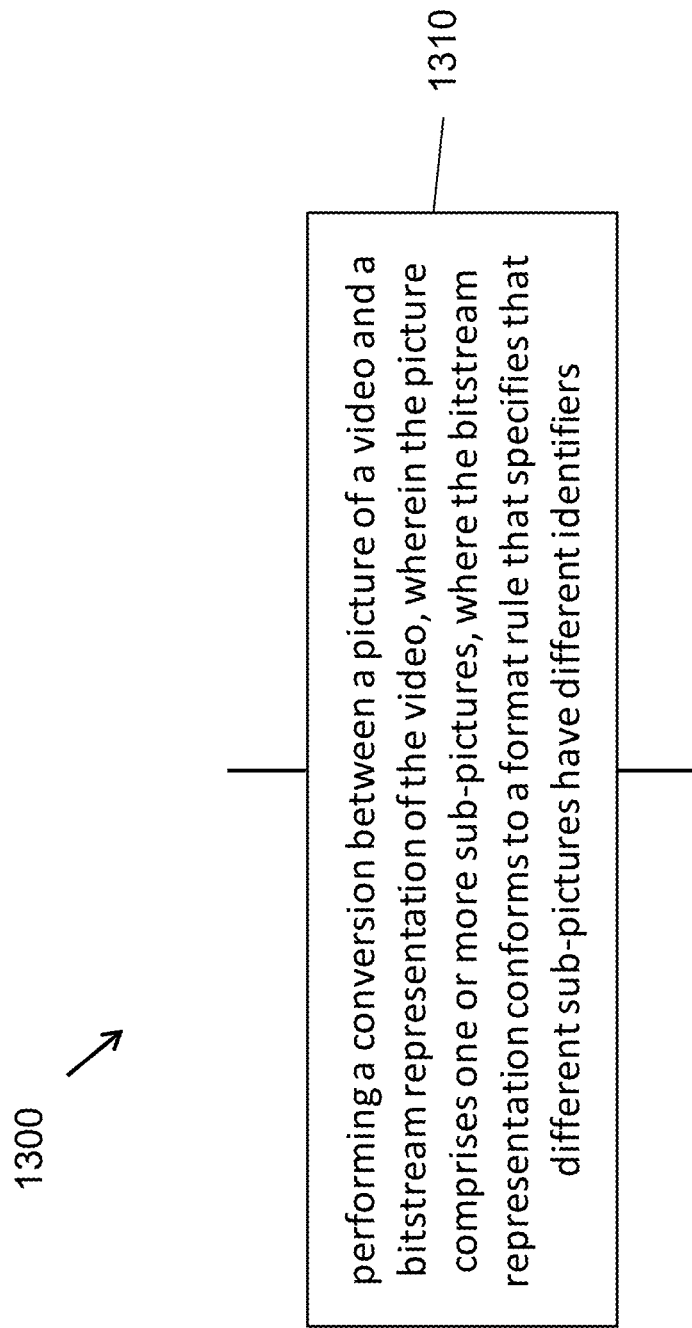
FIG. 13 is a flowchart representation of another method for video processing in accordance with the present technology.

FIG. 13 is a flowchart representation of a method for video processing in accordance with the present technology. The method 1300 includes, at operation 1310, performing a conversion between a picture of a video and a bitstream representation of the video, wherein the picture comprises one or more sub-pictures. The bitstream representation conforms to a format rule that specifies that different sub-pictures have different identifiers.

In some embodiments, the format rule specifies that identifiers of one or more sub-pictures are included at a video unit level, the video unit comprising a sequence parameter set, a picture parameter set, or a picture header. In some embodiments, a first syntax flag at the sequence parameter set indicates whether signaling of the identifiers of the one or more sub-pictures is present at the sequence parameter set level, a second syntax flag at the picture parameter set indicates whether signaling of the identifiers of the one or more sub-pictures is present at the picture parameter set level, and a third syntax flag at the picture header indicates whether signaling of the identifiers of the one or more sub-pictures is present at the picture header level. At least one of the first syntax flag, the second syntax flag, or the third syntax flag is equal to 1. In some embodiments, signaling of the identifiers of the one or more sub-pictures is omitted at the picture header level in case the first syntax flag indicates that signaling of the identifiers of the one or more sub-pictures is present at the sequence parameter set level.

In some embodiments, the format rule specifies that identifiers of one or more sub-pictures are included in a list of sub-picture identifiers. In some embodiments, the identifier of a first sub-picture in the list is denoted as SubpicIdList[i] and the identifier of a second sub-picture is denoted as SubpicIdList[j], where j=i−P. The format rule specifies that a difference D[i] between SubpicIdList[i] and SubpicIdList[j] is indicated in the bitstream representation. In some embodiments, P is equal to 1. In some embodiments, i>P. In some embodiments, D[i] is greater than 0. In some embodiments, D[i]−1 is included in the bitstream representation.

In some embodiments, the list of sub-picture identifiers is determined based on an order that the sequence parameter set is considered first, the picture parameter set is considered next, and the picture header is considered last. In some embodiments, the list of sub-picture identifiers is determined based on an order that the picture head is considered first, the picture parameter set is considered next, and the sequence parameter set is considered last.

In some embodiments, the format rule specifies that, in case identifiers of one or more sub-pictures are omitted at one or more video unit levels, default values are assigned to the identifiers in a list of sub-picture identifiers. The one or more video units comprise at least a sequence parameter set, a picture parameter set, or a picture header. In some embodiments, an identifier of a sub-picture in the list is denoted as SubpicIdList[i], and a default value for SubpicIdList[i] is i+P, P being an offset value.

Figure 14:
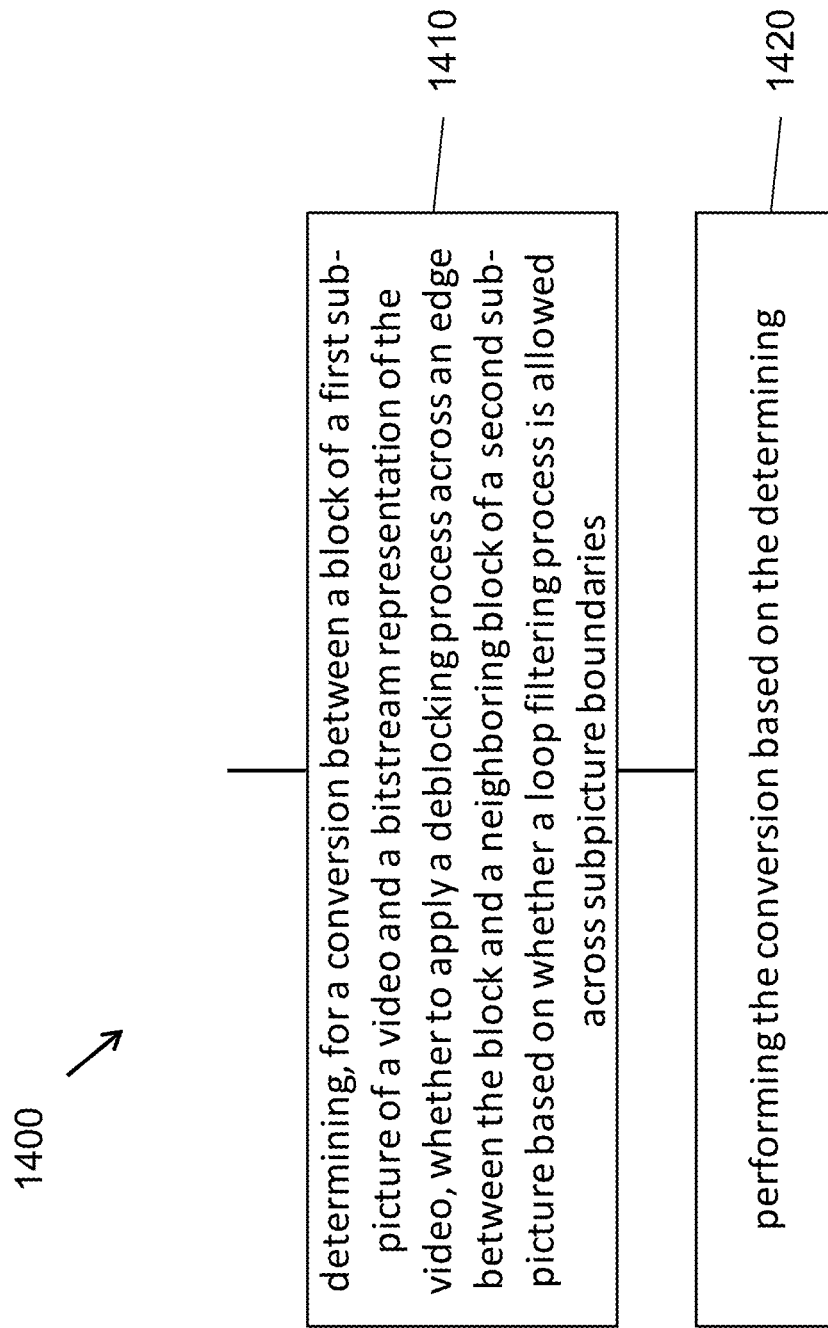
FIG. 14 is a flowchart representation of another method for video processing in accordance with the present technology.

FIG. 14 is a flowchart representation of a method for video processing in accordance with the present technology. The method 1400 includes, at operation 1410, determining, for a conversion between a block of a first sub-picture of a video and a bitstream representation of the video, whether to apply a deblocking process across an edge between the block and a neighboring block of a second sub-picture based on whether a loop filtering process is allowed across sub-picture boundaries. The method 1400 also includes, at operation 1420, performing the conversion based on the determining.

In some embodiments, a first syntax flag indicates whether the loop filtering process is allowed to access samples across boundaries for the first side of the edge and a second syntax flag indicates whether the loop filtering process is allowed to access samples across boundaries for the second side of the edge. The edge is not filtered in case at least one of the first syntax flag or the second syntax flag indicates that the loop filtering process is disallowed. In some embodiments, the first syntax flag indicates that the loop filtering process is allowed to access samples across boundaries for the first side of the edge, and the edge is not filtered due to the second syntax flag indicating that the loop filtering process is disallowed to access samples across boundaries for the second side of the edge.

In some embodiments, the first side of the edge is filtered and whether the second side of the edge is filtered are determined separately from each other. In some embodiments, samples on the first side of the edge are filtered due to the first syntax flag being 1. In some embodiments, samples on the second side of the edge are filtered due to the second syntax flag being 1. In some embodiments, the first side of the edge is in the first sub-picture, and the second side of the edge is in the second sub-picture.

Figure 15:
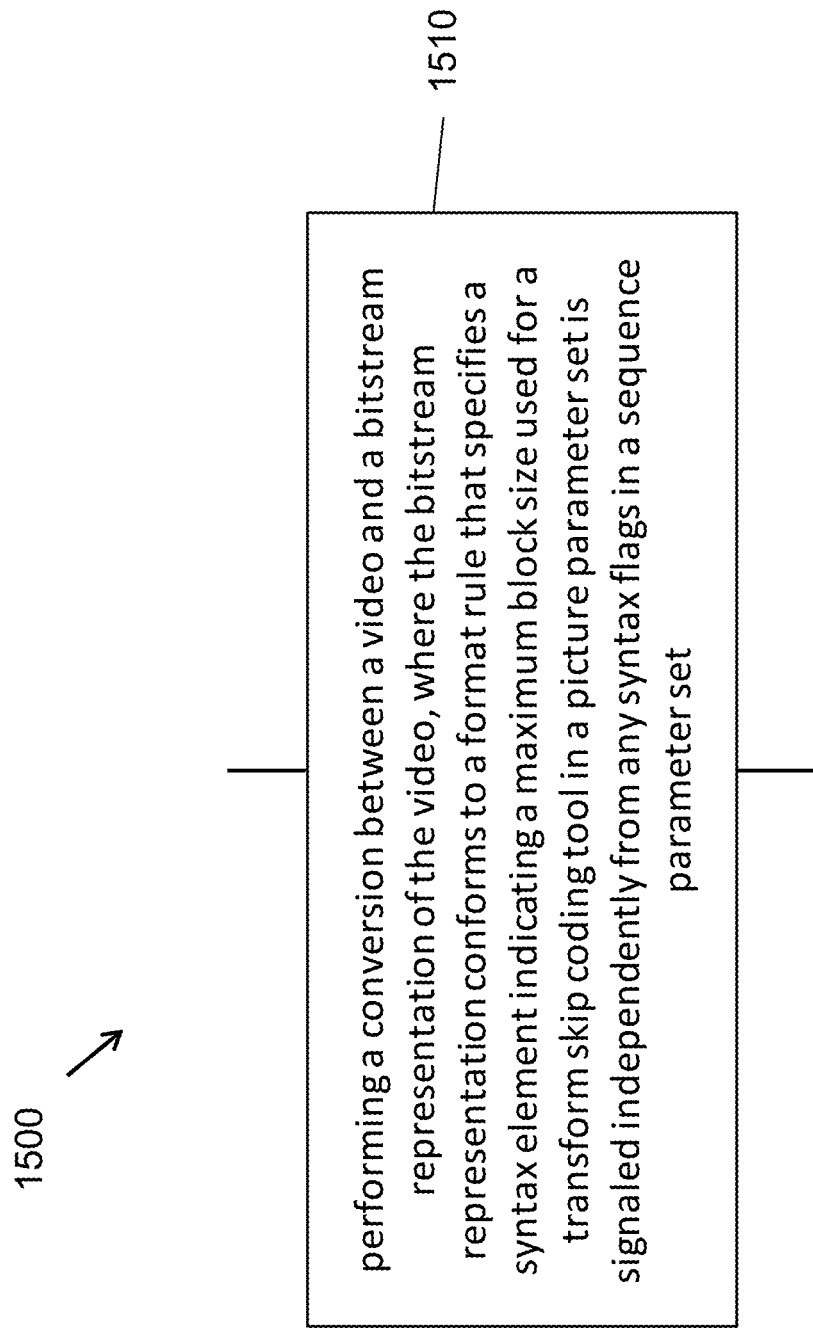
FIG. 15 is a flowchart representation of another method for video processing in accordance with the present technology.

FIG. 15 is a flowchart representation of a method for video processing in accordance with the present technology. The method 1500 includes, at operation 1510, performing a conversion between a video and a bitstream representation of the video. The bitstream representation conforms to a format rule that specifies a syntax element indicating a maximum block size used for a transform skip coding tool in a picture parameter set is signaled independently from any syntax flags in a sequence parameter set.

Figure 16:
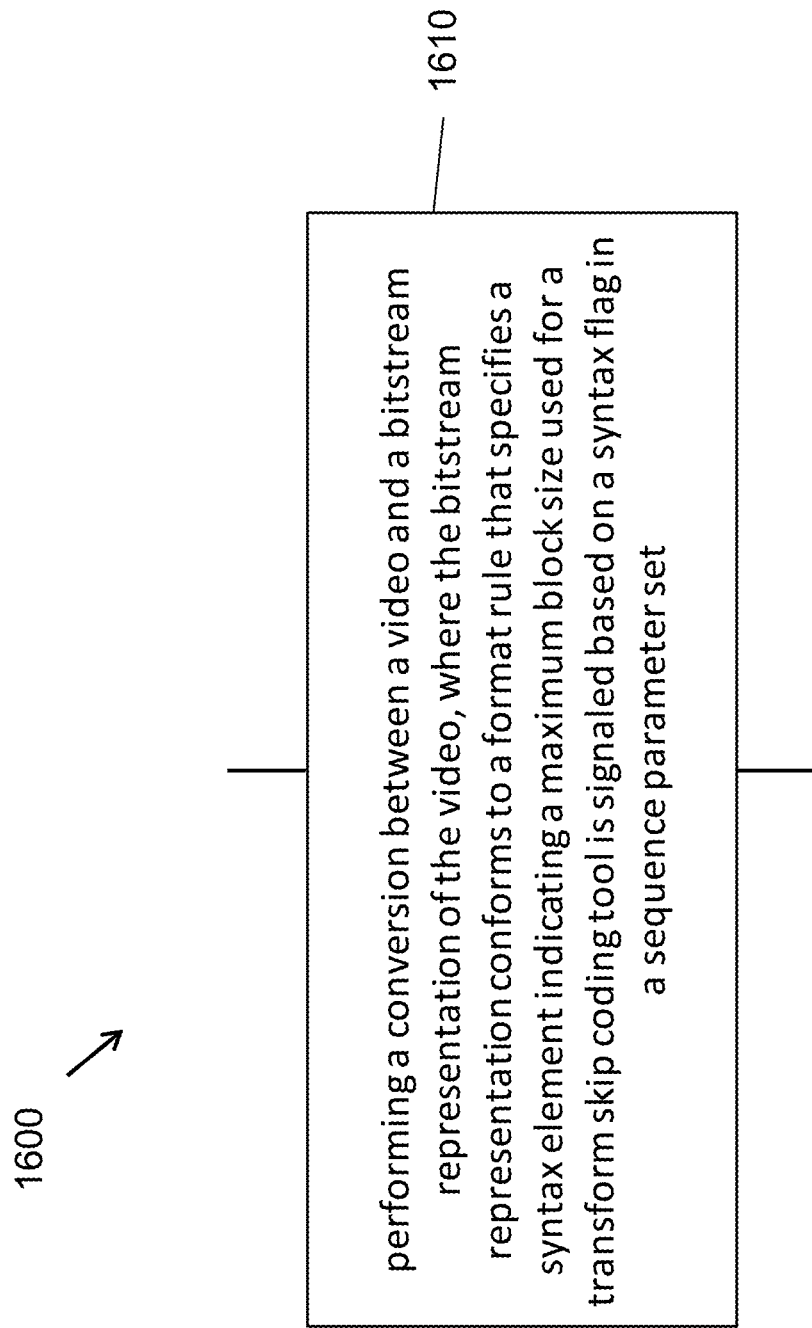
FIG. 16 is a flowchart representation of another method for video processing in accordance with the present technology.

FIG. 16 is a flowchart representation of a method for video processing in accordance with the present technology. The method 1600 includes, at operation 1610, performing a conversion between a video and a bitstream representation of the video. The bitstream representation conforms to a format rule that specifies a syntax element indicating a maximum block size used for a transform skip coding tool is signaled based on a syntax flag in a sequence parameter set.

In some embodiments, the syntax element is included in a sequence parameter set or a picture header. In some embodiments, the syntax element comprises log 2_transform_skip _max _size_minus2. In some embodiments, the syntax flag in the sequence parameter set comprises sps_transform _skip_enabled _flag.

Figure 17:
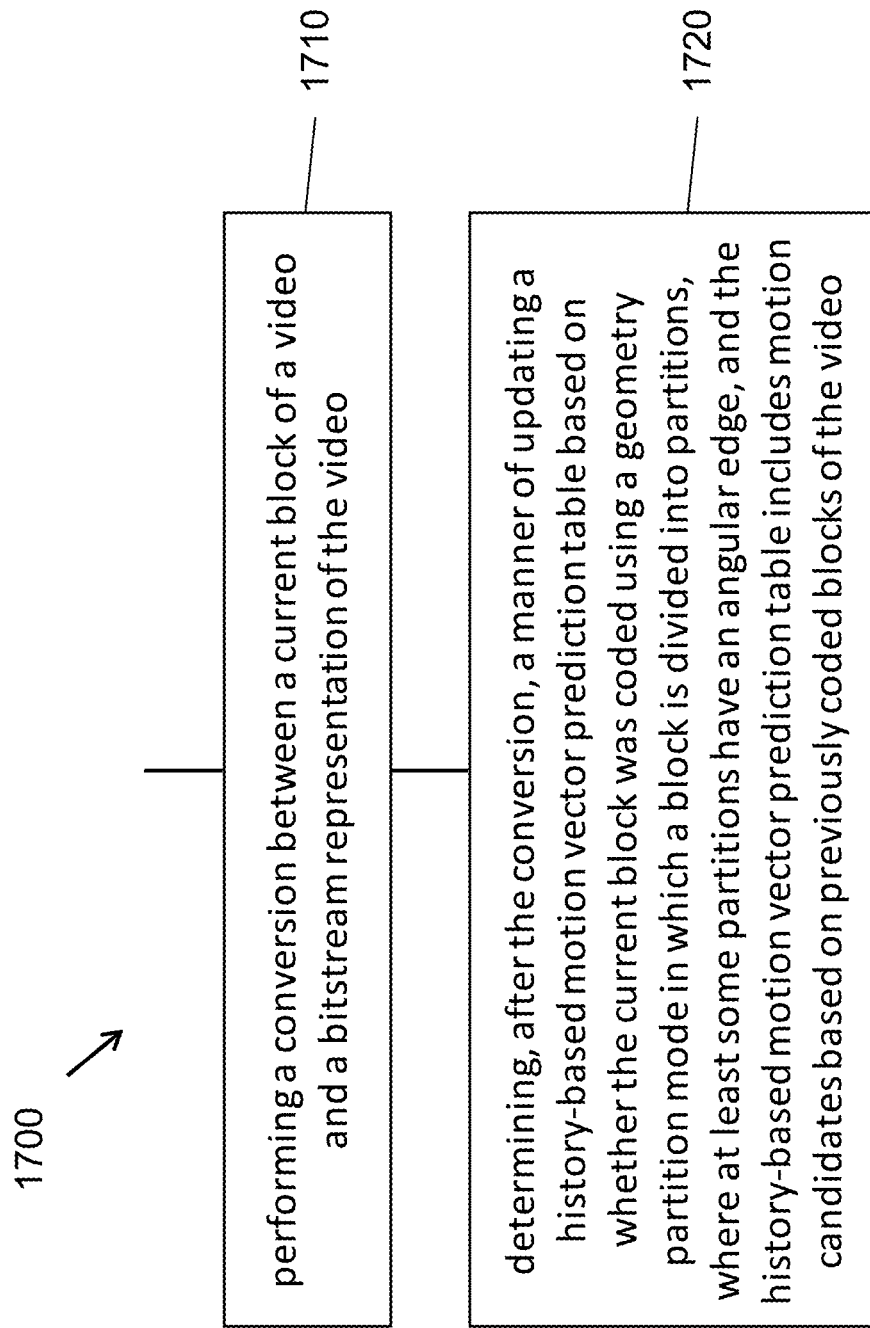
FIG. 17 is a flowchart representation of another method for video processing in accordance with the present technology.

FIG. 17 is a flowchart representation of a method for video processing in accordance with the present technology. The method 1700 includes, at operation 1710, performing a conversion between a current block of a video and a bitstream representation of the video. The method 1700 also includes, at operation 1720, determining, after the conversion, a manner of updating a hi story-based motion vector prediction table based on whether the current block was coded using a geometry partition mode in which a block is predicted by a weighted sum of at least two predictions. Weights for the weighted sum are generated for at least two partitions. At least some partitions have an angular edge, and wherein the history-based motion vector prediction table includes motion candidates based on previously coded blocks of the video.

In some embodiments, the history-based motion vector prediction table is not updated in case the current block is coded using the geometry partition mode. In some embodiments, the history-based motion vector prediction table is updated in case the current block is coded using the geometry partition mode. In some embodiments, the history-based motion vector prediction table is updated using motion information of one prediction of the current block. In some embodiments, the history-based motion vector prediction table is updated using motion information of multiple predictions of the current block.

Figure 18:
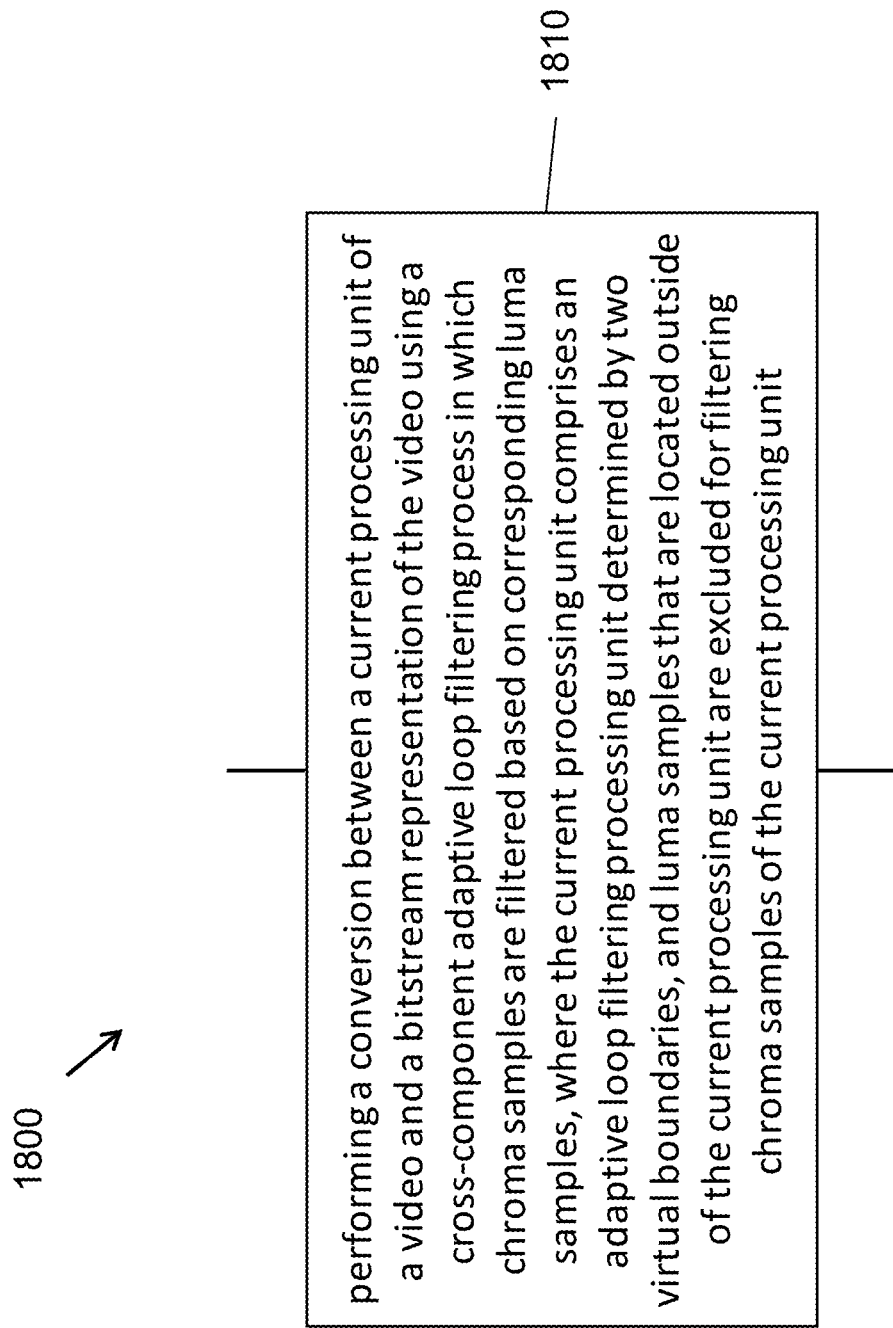
FIG. 18 is a flowchart representation of another method for video processing in accordance with the present technology.

FIG. 18 is a flowchart representation of a method for video processing in accordance with the present technology. The method 1800 includes, at operation 1810, performing a conversion between a current processing unit of a video and a bitstream representation of the video using a cross-component adaptive loop filtering process in which chroma samples are filtered based on corresponding luma samples. The current processing unit comprises an adaptive loop filtering processing unit determined by two virtual boundaries. Luma samples that are located outside of the current processing unit are excluded for filtering chroma samples of the current processing unit.

In some embodiments, the luma samples that are located outside of the current processing unit are padded, and the padded luma samples are used for filtering the chroma samples of the current processing unit.

Figure 19:
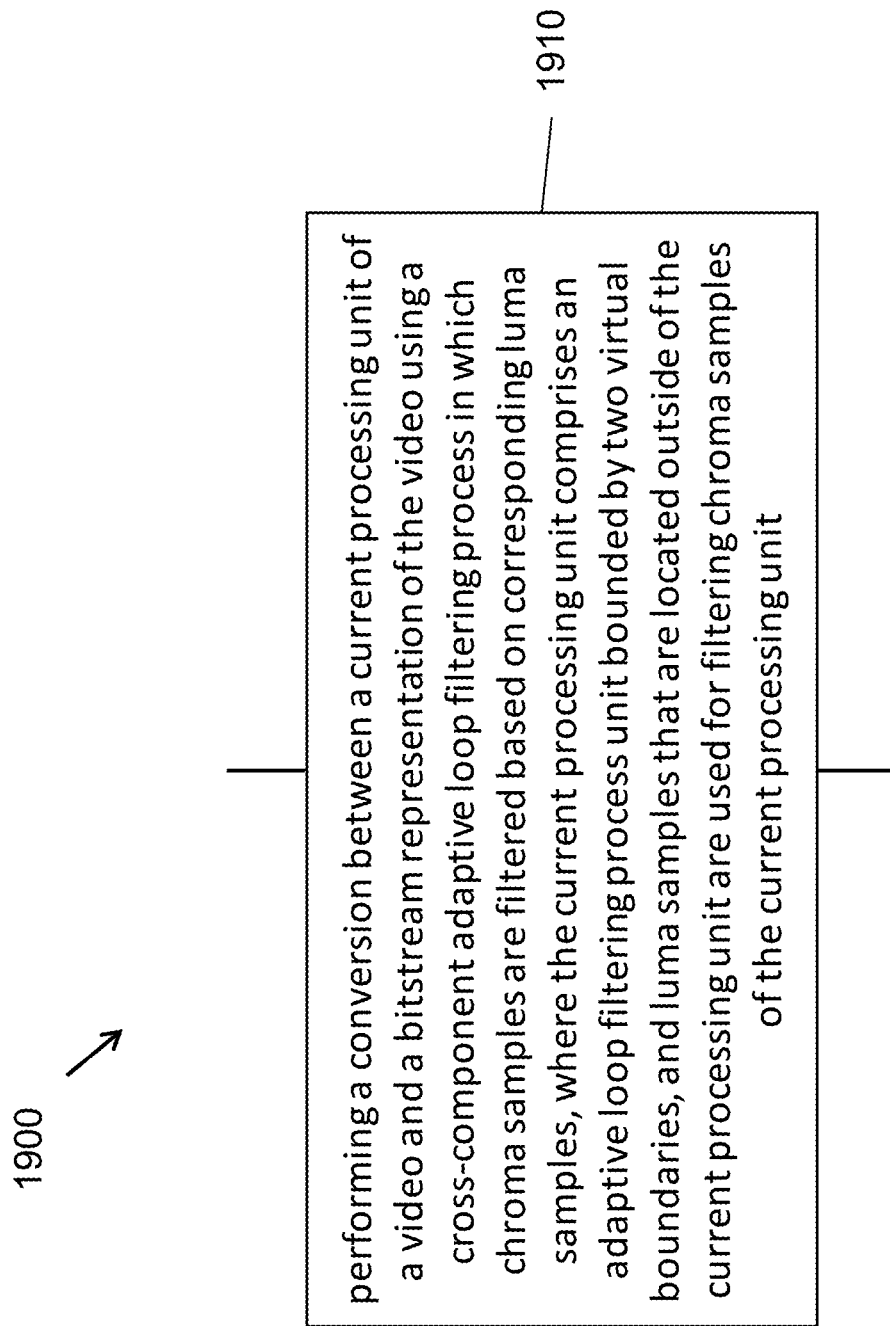
FIG. 19 is a flowchart representation of yet another method for video processing in accordance with the present technology.

FIG. 19 is a flowchart representation of a method for video processing in accordance with the present technology. The method 1900 includes, at operation 1910, performing a conversion between a current processing unit of a video and a bitstream representation of the video using a cross-component adaptive loop filtering process in which chroma samples are filtered based on corresponding luma samples. The current processing unit comprises an adaptive loop filtering process unit bounded by two virtual boundaries. Luma samples that are located outside of the current processing unit are used for filtering chroma samples of the current processing unit.

In some embodiments, the conversion generates the video from the bitstream representation. In some embodiments, the conversion generates the bitstream representation from the video.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
   determining, for a conversion between a video comprising a picture which is divided into one or more subpictures and a bitstream of the video, a position of a subpicture of the one or more subpictures based on a first syntax element and a second syntax element included in the bitstream; and
   performing the conversion based on the determining,
   wherein the first syntax element indicates a horizontal position of a top-left coding tree unit of the subpicture in unit of CtbSizeY and a length of the first syntax element is derived to be Ceil(Log 2(S1)) bits,
   wherein the second syntax element indicates a vertical position of the top-left coding tree unit of the subpicture in unit of CtbSizeY and a length of the second syntax element is derived to be Ceil(Log 2(S2)) bits,
   wherein S1 and S2 are greater than 0, and CtbSizeY denotes a size of a coding tree block, and
   wherein S1 is equal to (S3+CtbSizeY−1)/CtbSizeY, and S2 is equal to (S4+CtbSizeY−1)/CtbSizeY, wherein S3 is a value of a syntax element included in a sequence parameter set and specifying a maximum width of a decoded picture referring to the sequence parameter set in units of luma samples, and wherein S4 is a value of a syntax element included in the sequence parameter set and specifying a maximum height of a decoded picture referring to the sequence parameter set in units of luma samples.

2. The method of claim 1, wherein a third syntax element is included in the bitstream to specify a width of the subpicture in unit of CtbSizeY and a length of the third syntax element is derived to be Ceil(Log 2(S1)) bits, and
   wherein a fourth syntax element is included in the bitstream to specify a height of the subpicture in unit of CtbSizeY and a length of the fourth syntax element is derived to be Ceil(Log 2(S2)) bits.

3. The method of claim 1, wherein S3 and S4 are an integer multiple of Max(8, MinCbSizeY), respectively.

4. The method of claim 1, wherein the bitstream conforms to a format rule which specifies that different subpictures have different subpicture ID values.

5. The method of claim 4, wherein when a value of one or more syntax elements is equal to 0, a default value is assigned to the subpicture ID value of the subpicture,
   wherein, when the value of the one or more syntax elements is equal to 0, a subpicture ID mapping is not explicitly signaled, neither in the sequence parameter set nor in the picture parameter set.

6. The method of claim 5, wherein when the value of the one or more syntax elements is equal to 0, a fifth syntax element specifying ID of the subpicture is not included in a picture parameter set and a sixth syntax element specifying ID of the subpicture is not included in a sequence parameter set.

7. The method of claim 5, wherein the subpicture is an i-th subpicture in the picture and the default value is equal to i, and wherein i is an integer smaller than a number of subpictures in the picture.

8. The method of claim 1, wherein the conversion includes encoding the picture into the bitstream.

9. The method of claim 1, wherein the conversion includes decoding the picture from the bitstream.

10. An apparatus for processing video data comprising a processor and a non-transitory memory with instructions thereon, wherein the instructions upon execution by the processor, cause the processor to:
    determine, for a conversion between a video comprising a picture which is divided into one or more subpictures and a bitstream of the video, a position of a subpicture of the one or more subpictures based on a first syntax element and a second syntax element included in the bitstream; and
    perform the conversion based on the determining,
    wherein the first syntax element indicates a horizontal position of a top-left coding tree unit of the subpicture in unit of CtbSizeY and a length of the first syntax element is derived to be Ceil(Log 2(S1)) bits,
    wherein the second syntax element indicates a vertical position of the top-left coding tree unit of the subpicture in unit of CtbSizeY and a length of the second syntax element is derived to be Ceil(Log 2(S2)) bits,
    wherein S1 and S2 are greater than 0, and CtbSizeY denotes a size of a coding tree block, and
    wherein S1 is equal to (S3+CtbSizeY−1)/CtbSizeY, and S2 is equal to (S4+CtbSizeY−1)/CtbSizeY, wherein S3 is a value of a syntax element included in a sequence parameter set and specifying a maximum width of a decoded picture referring to the sequence parameter set in units of luma samples, and wherein S4 is a value of a syntax element included in the sequence parameter set and specifying a maximum height of a decoded picture referring to the sequence parameter set in units of luma samples.

11. The apparatus of claim 10, wherein a third syntax element is included in the bitstream to specify a width of the subpicture in unit of CtbSizeY and a length of the third syntax element is derived to be Ceil(Log 2(S1)) bits, and
    wherein a fourth syntax element is included in the bitstream to specify a height of the subpicture in unit of CtbSizeY and a length of the fourth syntax element is derived to be Ceil(Log 2(S2)) bits.

12. The apparatus of claim 10, wherein S3 and S4 are an integer multiple of Max(8, MinCbSizeY), respectively.

13. The apparatus of claim 10, wherein the bitstream conforms to a format rule which specifies that different subpictures have different subpicture ID values.

14. The apparatus of claim 13, wherein when a value of one or more syntax elements is equal to 0, a default value is assigned to the subpicture ID value of the subpicture, wherein when the value of the one or more syntax elements is equal to 0, a subpicture ID mapping is not explicitly signalled, neither in the sequence parameter set nor in the picture parameter set.

15. A non-transitory computer-readable storage medium storing instructions that cause a processor to:

determine, for a conversion between a video comprising a picture which is divided into one or more subpictures and a bitstream of the video, a position of a subpicture of the one or more subpictures based on a first syntax element and a second syntax element included in the bitstream; and perform the conversion based on the determining, wherein the first syntax element indicates a horizontal position of a top-left coding tree unit of the subpicture in unit of CtbSizeY and a length of the first syntax element is derived to be Ceil(Log 2(S1)) bits, wherein the second syntax element indicates a vertical position of the top-left coding tree unit of the subpicture in unit of CtbSizeY and a length of the second syntax element is derived to be Ceil(Log 2(S2)) bits, wherein S1 and S2 are greater than 0, and CtbSizeY denotes a size of a coding tree block, and wherein S1 is equal to (S3+CtbSizeY−1)/CtbSizeY, and S2 is equal to (S4+CtbSizeY−1)/CtbSizeY, wherein S3 is a value of a syntax element included in a sequence parameter set and specifying a maximum width of a decoded picture referring to the sequence parameter set in units of luma samples, and wherein S4 is a value of a syntax element included in the sequence parameter set and specifying a maximum height of a decoded picture referring to the sequence parameter set in units of luma samples.

16. The non-transitory computer-readable storage medium of claim 15, wherein a third syntax element is included in the bitstream to specify a width of the subpicture in unit of CtbSizeY and a length of the third syntax element is derived to be Ceil(Log 2(S1)) bits, and wherein a fourth syntax element is included in the bitstream to specify a height of the subpicture in unit of CtbSizeY and a length of the fourth syntax element is derived to be Ceil(Log 2(S2)) bits.

17. A non-transitory computer-readable recording medium storing a bitstream of a video which is generated by a method performed by a video processing apparatus, wherein the method comprises:

determining, for a video comprising a picture which is divided into one or more subpictures, a position of a subpicture of the one or more subpictures based on a first syntax element and a second syntax element included in the bitstream; and generating the bitstream based on the determining, wherein the first syntax element indicates a horizontal position of a top-left coding tree unit of the subpicture in unit of CtbSizeY and a length of the first syntax element is derived to be Ceil(Log 2(S1)) bits, wherein the second syntax element indicates a vertical position of the top-left coding tree unit of the subpicture in unit of CtbSizeY and a length of the second syntax element is derived to be Ceil(Log 2(S2)) bits, wherein S1 and S2 are greater than 0, and CtbSizeY denotes a size of a coding tree block, and wherein S1 is equal to (S3+CtbSizeY−1)/CtbSizeY, and S2 is equal to (S4+CtbSizeY−1)/CtbSizeY, wherein S3 is a value of a syntax element included in a sequence parameter set and specifying a maximum width of a decoded picture referring to the sequence parameter set in units of luma samples, and wherein S4 is the value of a syntax element included in the sequence parameter set and specifying a maximum height of a decoded picture referring to the sequence parameter set in units of luma samples.

18. The non-transitory computer-readable recording medium of claim 17, wherein a third syntax element is included in the bitstream to specify a width of the subpicture in unit of CtbSizeY and a length of the third syntax element is derived to be Ceil(Log 2(S1)) bits, and wherein a fourth syntax element is included in the bitstream to specify a height of the subpicture in unit of CtbSizeY and a length of the fourth syntax element is derived to be Ceil(Log 2(S2)) bits.

* * * * *